United States Patent
Kawasaki et al.

(10) Patent No.: US 11,284,312 B2
(45) Date of Patent: Mar. 22, 2022

(54) USER EQUIPMENT AND COMMUNICATION CONTROL METHOD PERFORMED BY USER EQUIPMENT

(71) Applicants: SHARP KABUSHIKI KAISHA, Sakai (JP); FG Innovation Company Limited, Tuen Mun (HK)

(72) Inventors: Yudai Kawasaki, Osaka (JP); Masafumi Aramoto, Osaka (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/961,635

(22) PCT Filed: Jan. 10, 2019

(86) PCT No.: PCT/JP2019/000557
§ 371 (c)(1),
(2) Date: Jul. 10, 2020

(87) PCT Pub. No.: WO2019/139090
PCT Pub. Date: Jul. 18, 2019

(65) Prior Publication Data
US 2020/0344648 A1 Oct. 29, 2020

(30) Foreign Application Priority Data
Jan. 12, 2018 (JP) .............................. JP2018-003299

(51) Int. Cl.
*H04W 36/00* (2009.01)
*H04W 4/70* (2018.01)
(Continued)

(52) U.S. Cl.
CPC ......... *H04W 36/0022* (2013.01); *H04W 4/70* (2018.02); *H04W 36/0033* (2013.01); *H04W 76/10* (2018.02); *H04W 88/06* (2013.01)

(58) Field of Classification Search
CPC . H04W 36/14; H04W 36/0022; H04W 76/10; H04W 8/02; H04W 36/0066;
(Continued)

(56) References Cited

U.S. PATENT DOCUMENTS 10,848,957 B2 * 11/2020 Jain ....................... H04W 28/02
2019/0104455 A1 * 4/2019 Park .................. H04W 36/0022
(Continued)

OTHER PUBLICATIONS

"3rd Generation Partnership Project; Technical Specification Group Services and System Aspects; System Architecture for the 5G System; Stage 2(Release 15)", 3GPP TS 23.501 V15.0.0 (Dec. 2017).
(Continued)

*Primary Examiner* — Allahyar Kasraian
(74) *Attorney, Agent, or Firm* — ScienBiziP, P.C.

(57) ABSTRACT

A communication unit for implementing an operation for CIoT in 5GS and a communication unit for mapping a connection associated with the function for CIoT to an appropriate connection in a handover between the 5GS and EPS are provided. Even in the 5GS supporting a network slice, a communication unit for allowing the operation for CIoT to be used is provided. Furthermore, a communication unit for mapping a PDN connection associated with the operation for CIoT and established in the EPS to an appropriate PDU session in a handover of user equipment from the EPS to the 5GS is provided. Furthermore, a communication unit for mapping a PDU session established in the 5GS to an appropriate PDN connection in the handover of the user equipment from the 5GS to the EPS is provided.

2 Claims, 11 Drawing Sheets

(51) Int. Cl.
*H04W 76/10* (2018.01)
*H04W 88/06* (2009.01)

(58) Field of Classification Search
CPC ............ H04W 36/18; H04W 36/0011; H04W 36/0033; H04W 36/0016; H04W 92/02; H04W 36/0044; H04W 88/06; H04W 76/16; H04W 36/12; H04W 36/08; H04W 36/125; H04W 76/27
See application file for complete search history.

(56) References Cited

U.S. PATENT DOCUMENTS

| | | | | |
|---|---|---|---|---|
| 2019/0141563 A1* | 5/2019 | Ianev | ............. | H04W 24/08 |
| 2019/0357295 A1* | 11/2019 | Kim | ............. | H04L 5/0053 |
| 2020/0037203 A1* | 1/2020 | Ianev | ............. | H04W 28/06 |
| 2020/0077356 A1* | 3/2020 | Youn | ............. | H04W 8/065 |
| 2020/0267617 A1* | 8/2020 | Larsen | ............. | H04W 36/30 |
| 2021/0195490 A1* | 6/2021 | Rommer | ............. | H04W 36/14 |

OTHER PUBLICATIONS

"3rd Generation Partnership Project; Technical Specification Group Services and System Aspects; Procedures for the 5G System; Stage 2(Release 15)", 3GPP TS 23.502 V15.0.0 (Dec. 2017).

NTT Docomo, "Harmonizing the Network's No-Nx Procedures for SR and DR UEs", S2-175292, SA WG2 Meeting #122, Jun. 26-30, 2017, San Jose Del Cabo, Mexico.

SA WG2, "New SID on Cellular IoT support and evolution for the 5G System", SP-170742, SA WG2 Meeting #1223GPP TSG SA Meeting #77, Sep. 13-15, 2017, Sapporo, Japan.

"3rd Generation Partnership Project; Technical Specification Group Services and System Aspects; General Packet Radio Service (GPRS) enhancements for Evolved Universal Terrestrial Radio Access Network (E-UTRAN) access (Release 15)", 3GPP TS 23.401 V15.2.0 (Dec. 2017).

* cited by examiner

USER EQUIPMENT AND COMMUNICATION CONTROL METHOD PERFORMED BY USER EQUIPMENT

TECHNICAL FIELD

The present invention relates to a user equipment.

This application claims priority based on Japanese Patent Application No. 2018-3299 filed on Jan. 12, 2018, the contents of which are incorporated herein by reference.

BACKGROUND ART

The 3rd Generation Partnership Project (3GPP) has formulated specifications for a system architecture of the Evolved Packet System (EPS), which is a fourth-generation (4G) communication system. A core network constituting the EPS is called an Evolved Packet Core (EPC).

Also, the 3GPP has started reviewing a system architecture of the 5G System (5GS), which is the next generation, i.e., the fifth generation (5G) mobile communication system, and discussing, as one of many topics, interworking between a Network Slice and the 5GS and the EPS (see NPL 1 and NPL 2). The 3GPP further has started discussing supporting, in the 5GS, functions for Cellular IoT (CIoT) that have been supported in the EPS (such as efficient control signals, and signaling optimization for efficient communication of user data such as small data and SMS).

CITATION LIST

Non Patent Literature

Non Patent Literature 1: 3GPP TS 23.501 v15.0.0 (2017-12); Technical Specification Group Services and System Aspects; System Architecture for the 5G System; Stage 2 (Release 15) Non Patent Literature 2: 3GPP TS 23.502 v15.0.0 (2017-12); Technical Specification Group Services and System Aspects; Procedures for the 5G System; Stage 2 (Release 15)

SUMMARY OF INVENTION

Technical Problem

In the 5G System (5GS), use of Network Slices has been studied to provide a wide variety of services. Furthermore, the functions for Cellular IoT (CIoT) that have been supported in the Evolved Packet System (EPS) (such as efficient control signals, and signaling optimization for efficient communication of user data such as small data and SMS) have started to be studied.

However, it is not clear how to implement the functions for CIoT in the 5GS in a case that the 5GS supports network slices. Furthermore, it is not clear, in a handover of user equipment from the EPS to the 5GS, how a PDN connection associated with the functions for CIoT established in the EPS is to be mapped to a PDU session in the 5GS. Furthermore, it is not clear, in a handover of user equipment from the 5GS to the EPS, how a PDU session associated with the functions for CIoT established in the 5GS is to be mapped to a PDN connection in the EPS.

One aspect of the present invention has been made in view of the above circumstances, and an objective thereof is to provide a method for realizing the functions for CIoT in the 5GS and a method for mapping connections associated with the functions for CIoT in a handover made between the 5GS and the EPS in a case that the 5GS supports network slices.

Solution to Problem

A user equipment according to an embodiment of the present invention includes a controller, a transmission and/or reception unit, and a storage unit, wherein the transmission and/or reception unit receives a first accept message including information A from a first core network, the controller establishes a first communication path with the first core network after the first accept message is received, in a handover from the first core network to a second core network performed after the first accept message is received, the transmission and/or reception unit receives a second accept message including information B from the second core network, the controller establishes a second communication path with the second core network, the storage unit maps the first communication path to the second communication path, the information A is information indicating support for communication of user data via a control plane, the information B is information indicating support for communication of user data via a control plane, the first communication path is a communication path supporting the communication indicated by the information A, and the second communication path is a communication path supporting the communication indicated by the information B.

Advantageous Effects of Invention

According to one aspect of the present invention, the functions for CIoT can be used in the 5GS even in a case that the 5GS supports network slices. Furthermore, according to one aspect of the present invention, in a handover of user equipment between the 5GS and the EPS, a connection associated with the functions for CIoT can be mapped to an appropriate connection.

DESCRIPTION OF EMBODIMENTS

A preferred embodiment for carrying out the present invention will be described below with reference to the drawings.

1. System Overview

Figure 1:
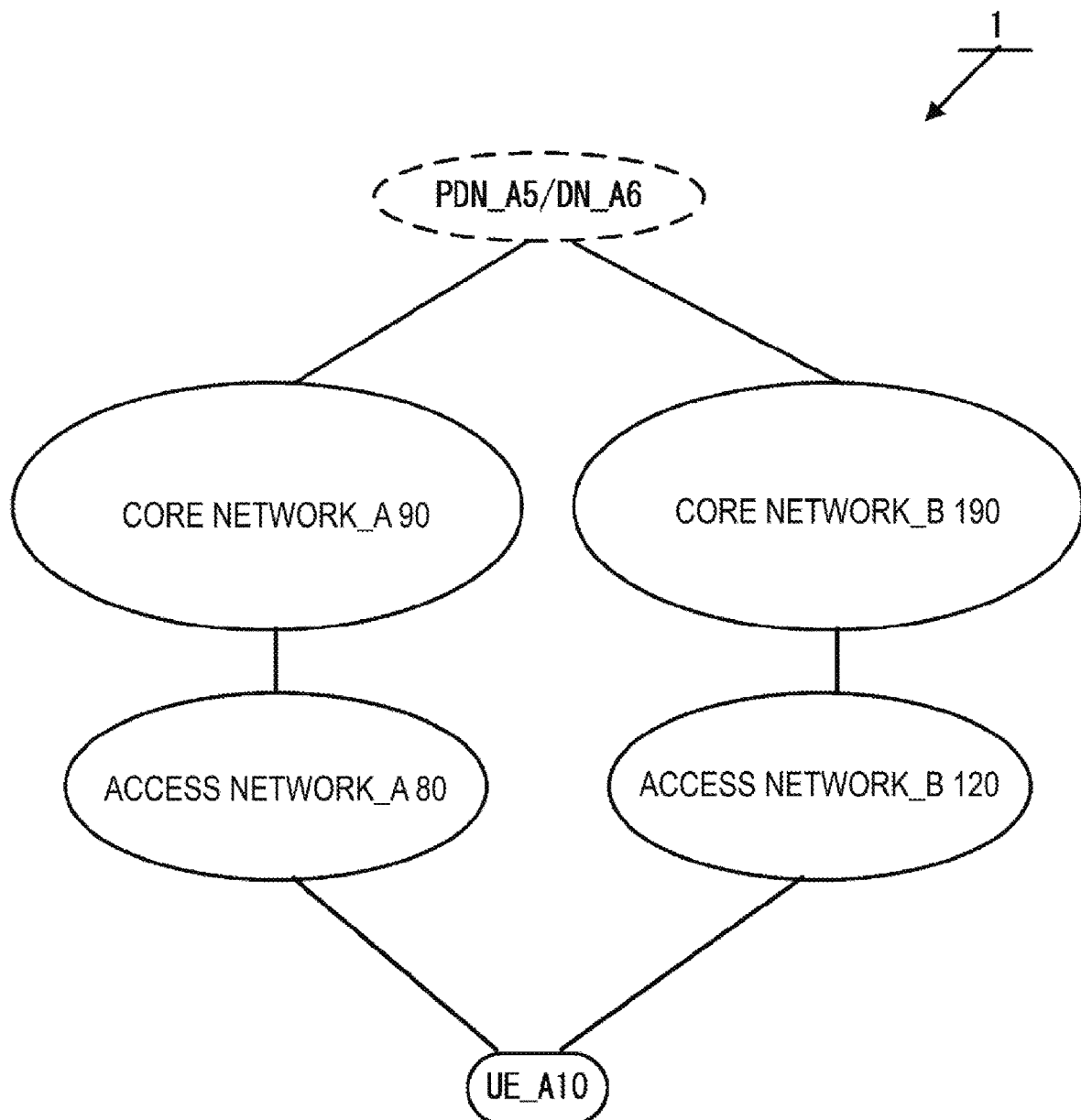
FIG. 1 is a diagram illustrating an overview of a mobile communication system (EPS/5GS).
Figure 2:
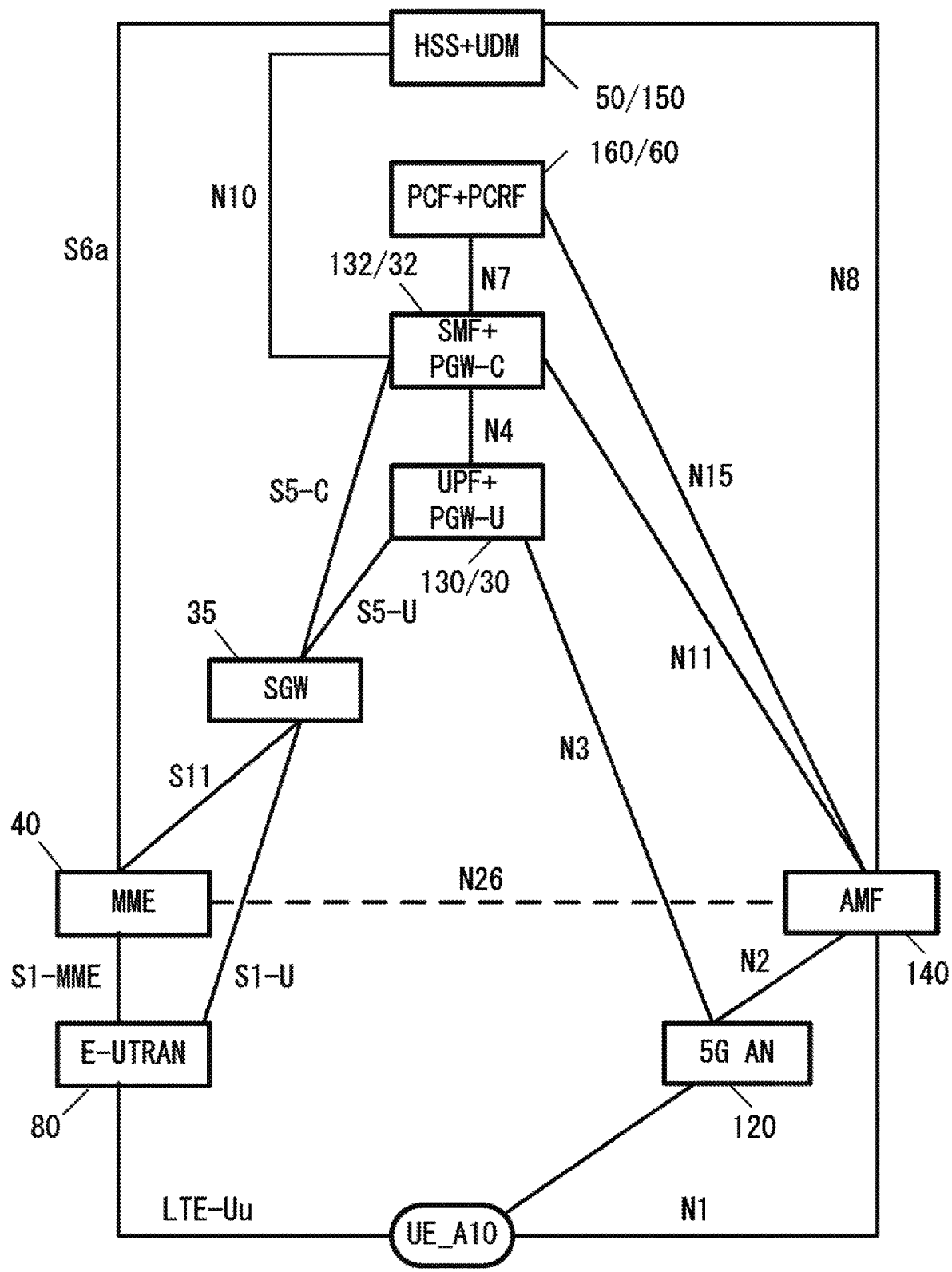
FIG. 2 is a diagram illustrating a detailed configuration of a mobile communication system (EPS/5GS).

First, FIG. 1 is a diagram illustrating an overview of a mobile communication system 1 used in each embodiment, and FIG. 2 is a diagram illustrating a detailed configuration of the mobile communication system 1.

In FIG. 1, the mobile communication system 1 includes UE_A 10, an access network_A 80, a core network_A 90, a Packet Data Network (PDN)_A 5, an access network_B 120, a core network_B 190, and a Data Network (DN)_A 6.

In the following, the apparatuses and functions may be described with the reference numerals omitted such as UE, access network_A, core network_A, PDN, access network_B, core network_B, DN, and the like.

In addition, in FIG. 2, apparatuses and functions such as the UE_A 10, an E-UTRAN 80, an MME 40, an SGW 35, a PGW-U 30, a PGW-C 32, a PCRF 60, an HSS 50, a 5G AN 120, an AMF 140, a UPF 130, an SMF 132, a PCF 160, a UDM 150, and the like, and interfaces that connect these apparatuses and functions to one another are described.

In the following, these apparatuses and functions may be described with symbols omitted, such as UE, E-UTRAN, MME, SGW, PGW-U, PGW-C, PCRF, HSS, 5G AN, AMF, UPF, SMF, PCF, UDM, and the like.

Note that, although an EPS, which is a 4G system, is configured to include the access network_A and the core network_A, it may further include the UE and/or the PDN. In addition, although a 5GS, which is a 5G system, is configured to include the UE, the access network_B, and the core network_B, it may further include the DN.

Here, the UE is an apparatus that can be connected to a network service via a 3GPP access (also referred to as 3GPP access network or a 3GPP AN) and/or non-3GPP access (also referred to as a non-3GPP access network or a non-3GPP AN). The UE may be a terminal apparatus capable of performing wireless communication, such as a mobile phone, a smartphone, or the like, and may be a terminal apparatus capable of connecting to both the EPS and the 5GS. The UE_may also include a Universal Integrated Circuit Card (UICC) or an embedded UICC (eUICC). Note that the UE may be expressed as a user equipment or may be expressed as a terminal apparatus.

In addition, the access network_A corresponds to an Evolved Universal Terrestrial Radio Access Network (E-UTRAN) and/or a wireless LAN access network. In the E-UTRAN, one or more evolved Node B (eNB) 45 are deployed. Note that, hereinafter, the eNB 45 may be described as eNB with the reference numeral omitted. Furthermore, in a case that there are a plurality of eNBs, each of the eNB is connected to each other through, for example, an X2 interface. Further, one or more access points are deployed in the wireless LAN access network.

In addition, the access network_B corresponds to a 5G access network (5G AN). The 5G AN includes an NG Radio Access Network (NG-RAN) and/or a non-3GPP access network. One or more NR Node B (gNB) 122 are deployed in the NG-RAN. Note that, hereinafter, the gNB 122 may be described as eNB with the reference numerals omitted. The gNB is a node that provides the UE with a New Radio (NR) user plane and a control plane, and is a node that enables a connection to a 5GC via an NG interface (including the N2 interface or N3 interface). That is, the gNB is a base station apparatus newly designed for the 5GS, and has a different function from that of a base station apparatus (eNB) used in the EPS which is a 4G system. In addition, in a case that there are a plurality of gNBs, each gNB is connected to each other through, for example, an Xn interface.

Additionally, in the following, an E-UTRAN or an NG-RAN may be referred to as a 3GPP access. Moreover, a wireless LAN access network or a non-3GPP AN may be referred to as a non-3GPP access. In addition, nodes deployed in the access network_B may also be collectively referred to as a NG-RAN node.

Also below, the access network_A and/or the access network_B and/or an apparatus included in the access network_A and/or an apparatus included in the access network_B may be referred to as an access network or an access network apparatus.

In addition, the core network_A corresponds to an Evolved Packet Core (EPC). In the EPC, for example, a Mobility Management Entity (MME), a Serving Gateway (SGW), a Packet Data Network Gateway (PGW)-U, a PGW-C, a Policy and Charging Rules Function (PCRF), a Home Subscriber Server (HSS), and the like are deployed.

Furthermore, the core network_B corresponds to a 5G Core Network (5GC). In the 5GC, for example, an Access and Mobility Management Function (AMF), a User Plane Function (UPF), a Session Management Function (SMF), a Policy Control Function (PCF), a Unified Data Management (UDM), and the like are deployed.

Furthermore, in the following, the core network_A and/or the core network_B, an apparatus included in the core network_A, and/or an apparatus included in the core network_B may be referred to as a core network or a core network apparatus.

Each core network (the core network_A and/or the core network_B) may be an IP mobile communication network operated by a Mobile Network Operator (MNO) that connects to an access network (the access network_A and/or the access network B) and the PDN and/or DN, may be a core network for a mobile communication operator that operates and manages the mobile communication system 1, or may be a core network for a virtual mobile communication operator or a virtual mobile communication service provider such as a Mobile Virtual Network Operator (MVNO), a Mobile Virtual Network Enabler (MVNE), or the like.

In addition, although a case in which the PDN and the DN are the same is described in FIG. 1, they may be different. The PDN may be a Data Network (DN) for providing a communication service to the UE. Note that the DN may be configured as a packet data service network, or configured for each service. Furthermore, the PDN may include a connected communication terminal. Thus, connecting to the PDN may be connecting to a communication terminal or a server apparatus deployed in the PDN. Furthermore, the transmission and/or reception of user data to and/or from the PDN may be transmission and/or reception of user data to and/or from a communication terminal or a server apparatus deployed in the PDN. Note that the PDN may be represented by the DN, and the DN may be represented by the PDN.

In addition, in the following, at least a part of the access network_A, the core network_A, the PDN, the access network_B, the core network_B, and the DN and/or one or more apparatuses included therein may be referred to as a network or a network apparatus. That is, the expression "a network and/or a network apparatus transmits and/or receives a message and/or performs a procedure" signifies that "at least a part of the access network_A, the core network_A, the PDN, the access network_B, the core network_B, and the DN and/or one or more apparatuses included therein transmits and/or receives a message and/or performs a procedure."

Moreover, the UE can connect to the access network. In addition, the UE can connect to the core network via the access network. Furthermore, the UE can connect the PDN or the DN via the access network and the core network. That is, the UE can transmit and/or receive (communicate) user data with the PDN or the DN. In a case that user data is transmitted and/or received, not only Internet Protocol (IP) communication but also non-IP communication may be used.

Here, IP communication is data communication using an IP, in which data is transmitted and/or received in IP packets. An IP packet includes an IP header and a payload portion. The payload portion may include data transmitted and/or received by an apparatus or a function included in the EPS or an apparatus or a function included in the 5GS. In addition, non-IP communication is a data communication without using an IP, in which data is transmitted and/or received in a different format from the structure of the IP packet. For example, non-IP communication may be the data communication achieved through transmitting and/or receiving application data without IP header added, or transmitting and/or receiving user data transmitted and/or received by the UE with another header added such as a MAC header or an Ethernet (trade name) frame header.

2. Configuration of Each Apparatus

Next, a configuration of each apparatus (the UE, and/or an access network apparatus and/or a core network apparatus) used in each embodiment will be described with reference to the drawings. Note that each apparatus may be configured as physical hardware, may be configured as logical (virtual) hardware constructed on general purpose hardware, or may be configured as software. In addition, at least some of (including all) functions of each apparatus may be configured as physical hardware, logical hardware, or software.

Note that each of storage units (a storage unit_A 340, a storage unit_A 440, a storage unit_B 540, a storage unit_A 640, and a storage unit_B 740) in each of the apparatuses and functions appearing below is constituted by, for example, a semiconductor memory, a Solid State Drive (SSD), a Hard Disk Drive (HDD), and the like. Moreover, each of the storage units can store various types of information transmitted and/or received to and/or from apparatuses or functions other than those of the storage unit (e.g., the UE and/or the access network apparatus and/or the core network apparatus, and/or the PDN, and/or the DN) as well as information originally configured from the shipping stage. In addition, each of the storage units can store identification information, control information, a flag, a parameter, and the like included in a control message which is transmitted and/or received in various communication procedures which will be described below. Furthermore, each of the storage units may store the information for each piece of UE. Furthermore, in a case that the 5GS and the EPS interwork, each of the storage units can store control messages and user data transmitted and/or received to and from the apparatuses and functions included in the 5GS and/or the EPS. At this time, not only control messages and user data transmitted and/or received through N26 interface but also control messages and user data transmitted and/or received without passing through an N26 interface can be stored.

2.1. Apparatus Configuration of UE

Figure 3:
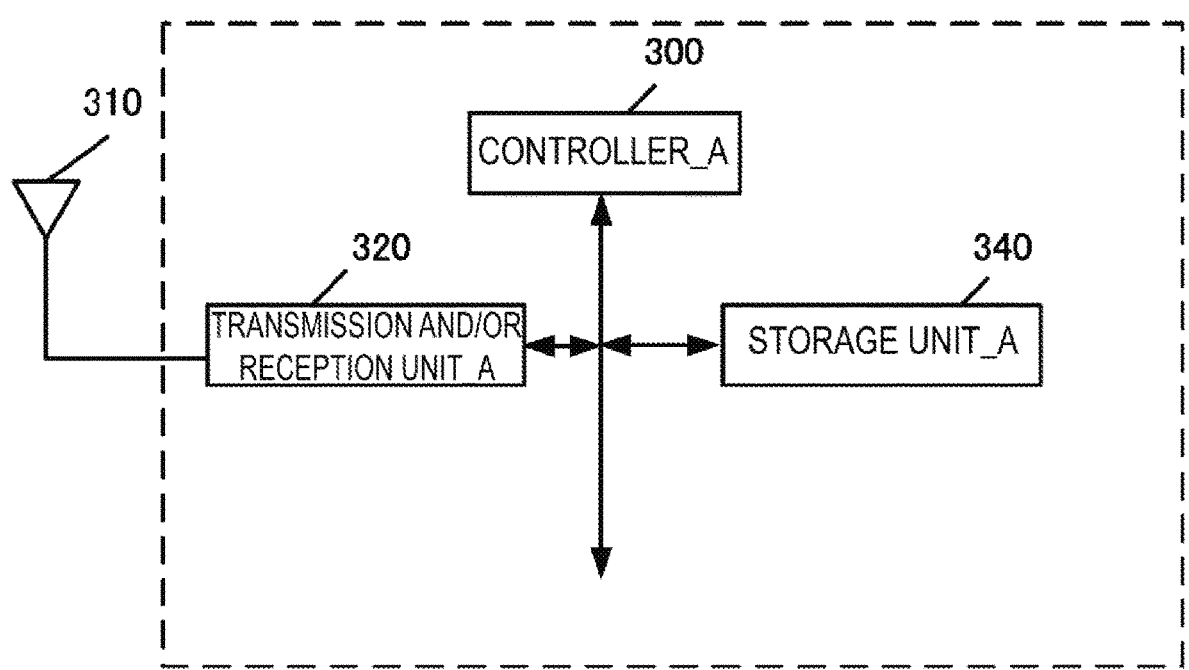
FIG. 3 is a diagram illustrating an apparatus configuration of UE.

First, an example of an apparatus configuration of the User Equipment (UE) will be described using FIG. 3. The UE includes a controller_A 300, an antenna 310, a transmission and/or reception unit_A 320, and a storage unit_A 340. The controller_A 300, the transmission and/or reception unit_A 320, and the storage unit_A 340 are connected via a bus. The transmission and/or reception unit_A 320 is connected to the antenna 310.

The controller_A 300 is a functional unit to control all operations and functions of the UE. The controller_A 300 implements various types of processing for the UE by reading out and executing various programs stored in the storage unit_A 340 when necessary.

The transmission and/or reception unit_A 320 is a functional unit for wirelessly communicating with a base station apparatus (eNB or gNB) on the access network via the antenna. That is, the UE can transmit and/or receive user data and/or control information between the access network apparatus and/or the core network apparatus and/or the PDN and/or the DN using the transmission and/or reception unit_A 320.

To describe in detail with reference to FIG. 2, the UE can communicate with the base station apparatus (eNB) in the E-UTRAN via an LTE-Uu interface by using the transmission and/or reception unit_A 320. In addition, the UE can communicate with the base station apparatus (gNB) in the 5G AN by using the transmission and/or reception unit_A 320. Furthermore, the UE can transmit and/or receive a Non-Access-Stratum (NAS) message to and/or from an AMF through the N1 interface by using the transmission and/or reception unit_A 320. However, because the N1 interface is a logical interface, communication between the UE and the AMF is actually performed via the 5G AN.

The storage unit_A 340 is a functional unit for storing programs, user data, control information, and the like necessary for each operation of the UE.

2.2. Apparatus Configuration of eNB

Figure 4:
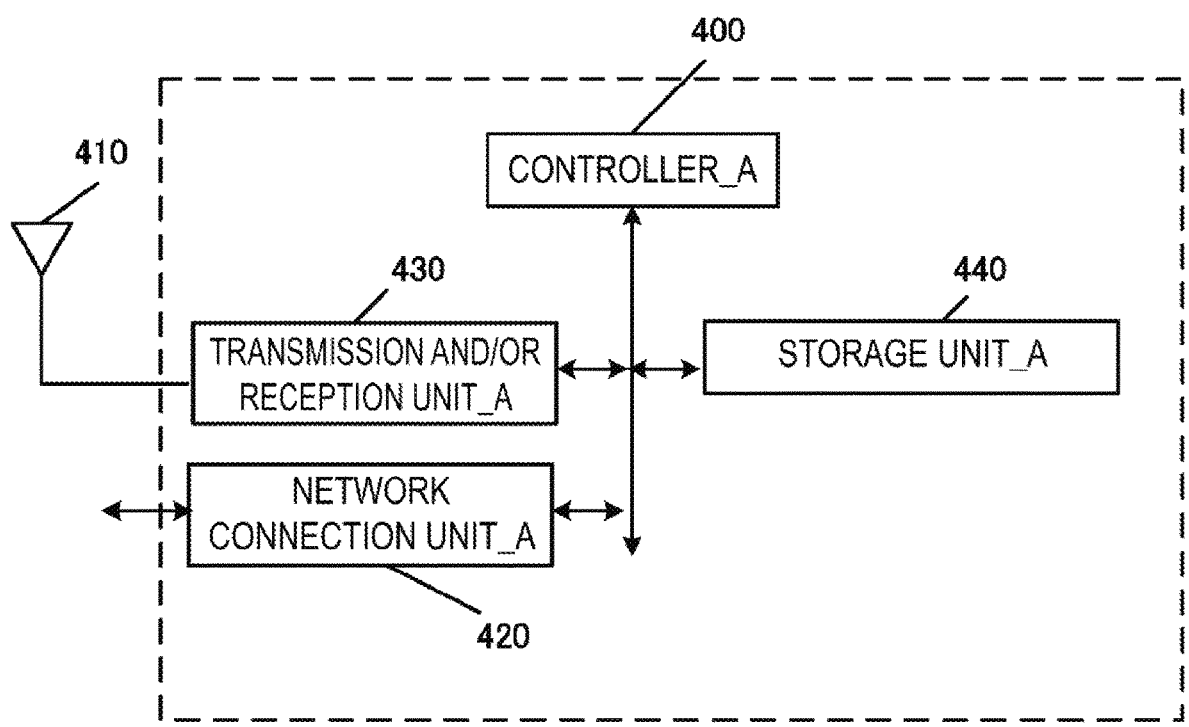
FIG. 4 is a diagram illustrating a configuration of an access network apparatus (eNB) in the EPS.

Next, an example of an apparatus configuration of the eNB will be described using FIG. 4. The eNB includes a controller_A 400, an antenna 410, a network connection unit_A 420, a transmission and/or reception unit_A 430, and a storage unit_A 440. The controller_A 400, the network connection unit_A 420, a transmission and/or reception unit_A 430, and a storage unit_A 440 are connected to each other via a bus. The transmission and/or reception unit_A 430 is connected to the antenna 410.

The controller_A 400 is a functional unit for controlling all operations and functions of the eNB. The controller_A 400 implements various types of processing for the eNB by reading out and executing various programs stored in the storage unit_A 440 if necessary.

The network connection unit_A 420 is a functional unit for the eNB to communicate with the MME and/or the SGW. That is, the eNB can transmit and/or receive user data and/or control information to and from the MME and/or the SGW using the network connection unit_A 420.

The transmission and/or reception unit_A 430 is a functional unit for wirelessly communicating with the UE via the antenna 410. In other words, the eNB can transmit and/or receive user data and/or control information to and/or from the UE using the transmission and/or reception unit_A 430.

To describe in detail with reference to FIG. 2, the eNB in the E-UTRAN can communicate with the MME over an S1-MME interface by using the network connection unit_A 420 and can communicate with the SGW over an S1-U interface. Furthermore, the eNB can communicate with the UE via the LTE-Uu interface by using the transmission and/or reception unit_A 430.

The storage unit_A 440 is a functional unit for storing programs, user data, control information, and the like necessary for various operations of the eNB.

2.3. Apparatus Configuration of gNB

Figure 5:
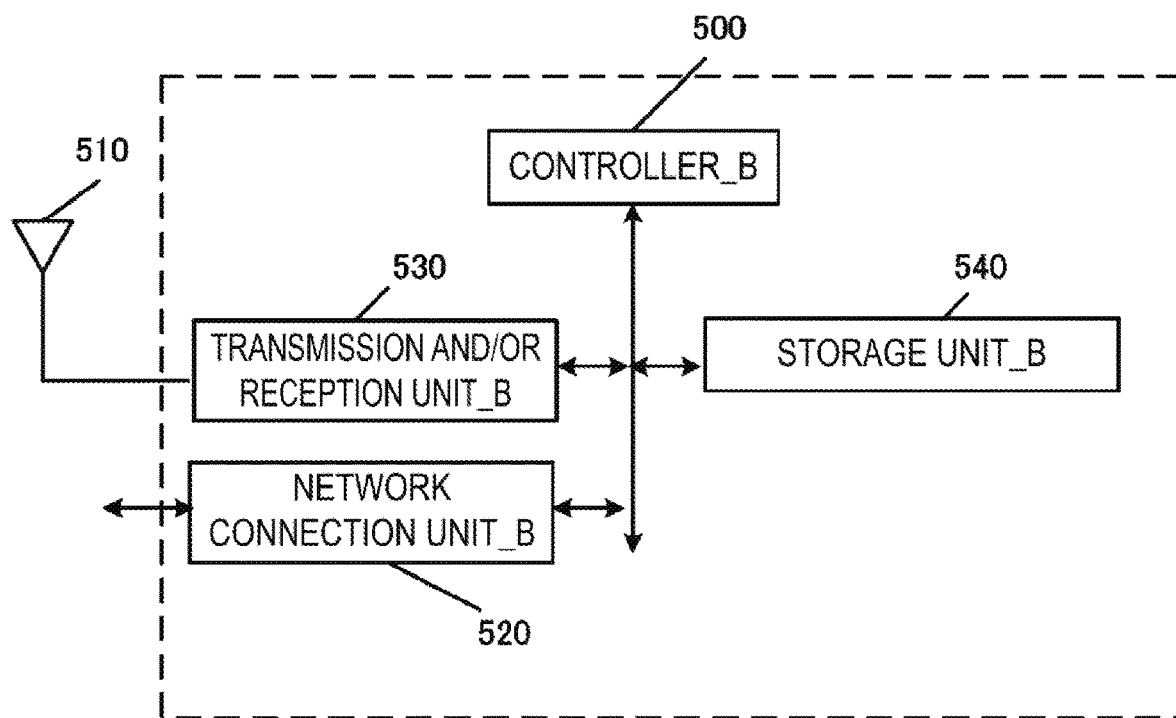
FIG. 5 is a diagram illustrating a configuration of an access network apparatus (gNB) in the 5GS.

Next, an example of an apparatus configuration of the gNB will be described using FIG. 5. The gNB includes a controller_B 500, an antenna 510, a network connection unit_B 520, a transmission and/or reception unit_B 530, and a storage unit_B 540. The controller_B 500, the network connection unit_B 520, the transmission and/or reception unit_B 530, and the storage unit_B 540 are connected to each other via a bus. The transmission and/or reception unit_B 530 is connected to the antenna 510.

The controller_B 500 is a functional unit for controlling all operations and functions of the gNB. The controller_B 500 implements various types of processing for the gNB by reading out and executing various programs stored in the storage unit_B 540 when necessary.

The network connection unit_B 520 is a functional unit for the gNB to communicate with the AMF and/or the UPF. That is, the gNB can transmit and/or receive user data and/or control information to and from the AMF and/or the UPF using the network connection unit_B 520.

The transmission and/or reception unit_B 530 is a functional unit for wireless communication with the UE via the antenna 510. In other words, the gNB can transmit and/or receive user data and/or control information to and/or from the UE using the transmission and/or reception unit_B 530.

To describe in detail with reference to FIG. 2, the gNB in the 5G AN can communicate with the AMF over N2 interface and can communicate with the UPF over the N3 interface by using the network connection unit_B 520. In addition, the gNB can communicate with the UE by using the transmission and/or reception unit_B 530.

The storage unit_B 540 is a functional unit for storing programs, user data, control information, and the like necessary for each operation of the gNB.

2.4. Apparatus Configuration of MME

Figure 6:
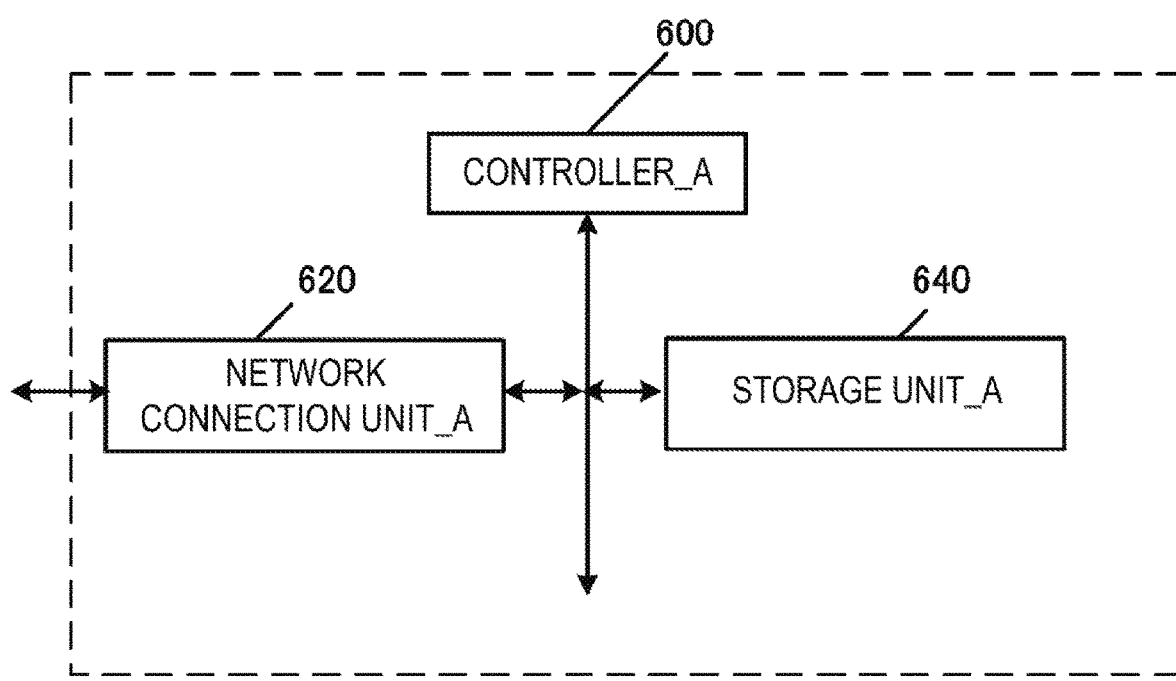
FIG. 6 is a diagram illustrating a configuration of a core network apparatus (MME/SGW/PGW) in the EPS.

Next, an example of an apparatus configuration of the MME will be described using FIG. 6. The MME includes a controller_A 600, a network connection unit_A 620, and a storage unit_A 640. The controller_A 600, the network connection unit_A 620 and the storage unit_A 640 are connected to each other via a bus.

The controller_A 600 is a functional unit for controlling all operations and functions of the MME. The controller_A 600 implements various types of processing for the MME by reading out and executing various programs stored in the storage unit_A 640 when necessary.

The network connection unit_A 620 is a functional unit for the MME to connect to a base station apparatus (eNB) in E-UTRAN, and/or the HSS and/or the SGW and/or the AMF and/or an SCEF. That is, the MME can use the network connection unit_A 620 to transmit and/or receive user data and/or control information to and from the base station apparatus (eNB) in the E-UTRAN, and/or the HSS and/or the SGW and/or the AMF and/or the SCEF.

To describe in detail with reference to FIG. 2, by using the network connection unit_A 620, the MME in the EPC can communicate with the eNB via an S1-MME interface, communicate with the HSS via an S6a interface, communicate with the SGW via the S11 interface, and communicate with the SCEF via a T6a interface. In addition, in a case that the N26 interface is supported, the MME can communicate with the AMF via the N26 interface by using the network connection unit_A 620.

The storage unit_A 640 is a functional unit for storing programs, user data, control information, and the like necessary for each operation of the MME.

The MME is a control apparatus or function that performs location information management including mobility management of the UE, connection state management of the UE, and access control via the access network_A, The MME may include a function as a session management apparatus to manage a session established by the UE.

In addition, in the location information management including mobility management of the UE, an EMM state is managed. The EMM state may be synchronized between the UE and the MME. The EMM state includes an EMM-DEREGISTERED state and an EMM-REGISTERED state. In the EMM-DEREGISTERED state, the UE is not registered in a network, thus a UE context in the MME does not have valid location information and routing information for the UE, and thus the MME does not reach the UE. In addition, in the EMM-REGISTERED state, the UE is registered in the network, and thus the UE can receive services that require registration with the network.

In other words, the EMM-REGISTERED may be a state in which each apparatus has established an EMM context or a state in which each apparatus has established a default EPS bearer context. Note that, in a case that each apparatus is in the EMM-REGISTERED state, the UE_A 10 may start transmission and/or reception of user data or a control message, or may respond to paging. Furthermore, in a case that each apparatus is in the EMM-REGISTERED state, the UE_A 10 may perform a tracking area update procedure.

Furthermore, EMM-DEREGISTERED may be a state in which each apparatus has not established the EMM context, a state in which location information of the UE_A 10 is not known to the network, or a state in which the network cannot reach the UE_A 10. Note that in a case that each apparatus is EMM-DEREGISTERED, the UE_A 10 may initiate an attach procedure, or may establish an EMM context by performing the attach procedure.

In addition, in the UE connection state management, an EMM mode is managed. The EMM mode may be synchronized between the UE and the MME. The EMM mode includes an EMM unconnected mode (EMM-IDLE mode) and an EMM connected mode (EMM-CONNECTED mode). In the EMM-IDLE mode, although the UE is in the EMM-REGISTERED state, it does not have a NAS signaling connection established between the UE and the MME.

Also, in the EMM-IDLE mode, the UE does not have a connection to the LTE-Uu interface. On the other hand, in the EMM-CONNECTED mode, the UE has the NAS signaling connection established between the MME and the UE. Also, in the EMM-CONNECTED mode, the UE may have a connection to the LTE-Uu interface. Note that the EMM unconnected mode may be expressed as an idle mode, and the EMM connected mode may be expressed as a connected mode.

Furthermore, in a case that a plurality of MMEs are included in the core network_A, the MMEs may be connected to each other. With this configuration, the context of the UE can be transmitted and/or received between the MMEs. In this way, the MME is a management apparatus that transmits and/or receives the control information related to the mobility management and the session management to and/or from the UE, and in other words, may be a control apparatus for a Control Plane (C-Plane; CP).

In addition, the MME may be a relay apparatus for transferring user data as a gateway between the core network_A and the access network. Note that the user data transmitted and/or received by the MME serving as a gateway may be small data.

2.5. Apparatus Configuration of SGW

Next, an example of an apparatus configuration of the SGW will be described using FIG. 6. The SGW includes a controller_A 600, a network connection unit_A 620, and a storage unit_A 640. The controller_A 600, the network connection unit_A 620 and the storage unit_A 640 are connected to each other via a bus.

The controller_A 600 is a functional unit for controlling all operations and functions of the SGW. The controller_A 600 implements various types of processing for the SGW by reading out and executing various programs stored in the storage unit_A 640 as necessary.

The network connection unit_A 620 is a functional unit through which the SGW connects to a base station apparatus (eNB) in the E-UTRAN and/or the MME and/or the PGW. That is, the SGW can use the network connection unit_A 620 to transmit and/or receive user data and/or control information to and from the base station apparatus (eNB) in the E-UTRAN, and/or the MME and/or the PGW.

To describe in detail with reference to FIG. 2, by using the network connection unit_A 620, the SGW in the EPC can communicate with the eNB via an S1-U interface, communicate with the MME via an S11 interface, and communicate with the PGW via an S5 interface. Note that FIG. 2 illustrates a case in which the PGW is divided into a PGW-C and a PGW-U. In a case that the MME communicates with the PGW-U, the MME can communicate with the PGW-U via an S5-U interface and, in a case that it communicates with the PGW-C, it communicates with the PGW-C via an S5-C interface.

The storage unit_A 640 is a functional unit for storing programs, user data, control information, and the like necessary for each operation of the SGW.

The SGW is a relay apparatus for transferring user data as a gateway between the core network_A and the 3GPP access network (E-UTRAN).

2.6. Apparatus Configuration of PGW (PGW-U and PGW-U) Next, an example of an apparatus configuration of the PGW (a PGW-U30 and a PGW-C32) will be described using FIG. 6. The PGW (a PGW-U and a PGW-C) includes a controller_A 600, a network connection unit_A 620, and a storage unit_A 640. The controller_A 600, the network connection unit_A 620 and the storage unit_A 640 are connected to each other via a bus.

The controller_A 600 is a functional unit for controlling all operations and functions of the PGW. The controller_A 600 implements various types of processing for the PGW by reading out and executing various programs stored in the storage unit_A 640 as necessary.

The network connection unit_A 620 is a functional unit through which the PGW connects to the SGW and/or the HSS and/or the PCRF and/or the PDN. That is, the PGW can use the network connection unit_A 620 to transmit and/or receive user data and/or control information to and/or from the SGW and/or the HSS and/or the PCRF and/or the PDN.

To describe in detail with reference to FIG. 2, the PGW in the EPC can communicate with the SGW over an S5 interface by using the network connection unit_A 620. Furthermore, the PGW can also communicate with the HSS, the PCRF, and the PDN by using the network connection unit_A 620.

Note that FIG. 2 illustrates a case in which the PGW is divided into a PGW-C and a PGW-U. The PGW-C can communicate with the SGW via the S5-C interface. In addition, the PGW-C can also communicate with the HSS and the PCRF. In addition, the PGW-U can communicate with the SGW via the S5-C interface. The PGW-C and the PGW-U can communicate with each other.

The storage unit_A 640 is a functional unit for storing programs, user data, control information, and the like necessary for each operation of the PGW.

Note that the PGW-U and the PGW-C may be elements with some separated functions of the PGW. For example, the PGW-U may be a node that handles a user plane among the functions of the PGW. The PGW-C may be a node that handles a control plane among the functions of the PGW. In addition, the PGW-C may be a node having a function for session control among the functions of the PGW. Furthermore, the PGW-U and the PGW-C are merely functionally separated and may be configured as one apparatus.

The PGW is a relay apparatus for transferring user data as a gateway between the PDN and the core network_A. Note that the PGW may serve as a gateway for IP communication and/or non-IP communication. Furthermore, the PGW may have a function to transfer IP communication, or may have a function to perform conversion between non-IP communication and IP communication. Note that a plurality of such gateways may be deployed in the core network_A. Furthermore, the plurality of gateways deployed may serve as gateways for connecting the core network_A to a single PDN.

Note that the user plane is user data transmitted and/or received to and/or from the UE and the network. The user plane may be transmitted and/or received using a PDN connection or a PDU session. Further, for the EPS, the user plane may be transmitted and/or received using the LTE-Uu interface and/or the S1-U interface, and/or the S5 interface, and/or an S8 interface, and/or an SGi interface. Further, for the 5GS, the user plane may be transmitted and/or received through an interface between the UE and the NG RAN and/or the N3 interface and/or an N9 interface and/or an N6 interface. The user plane may be represented as a U-Plane below.

Furthermore, the control plane is a control message transmitted and/or received to perform communication control of the UE and the like. The control plane may be transmitted and/or received using a Non-Access-Stratum (NAS) signaling connection between the UE and the MME. Further, in the case of the EPS, the control plane may be transmitted and/or received using the LTE-Uu interface and the S1-MME interface. Further, in the case of the 5GS, the control plane may be transmitted and/or received using an interface between the UE and the NG RAN and the N2 interface. Hereinafter, the control plane may be expressed as a control plane or a C-Plane.

Furthermore, a User Plane (U-Plane or UP) may be a communication path for transmitting and/or receiving user data, and may include a plurality of bearers. Furthermore, a Control Plane (C-Plane or CP) may be a communication path for transmitting and/or receiving a control message, and may include a plurality of bearers.

In addition, the PGW may be configured integrally with the UPF and/or the SMF. A PGW configured integrally with the SMF may be called a PGW-C, and A PGW configured integrally with the UPF may be called a PGW-U. In addition, the expression "PGW" may indicate a PGW-C and/or a PGW-U.

2.7. Apparatus Configuration of AMF

Figure 7:
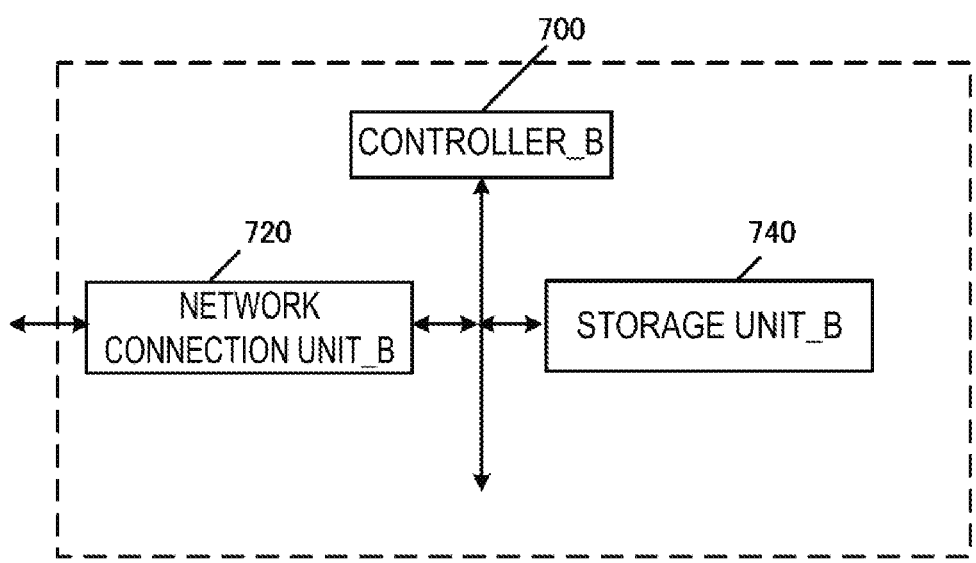
FIG. 7 is a diagram illustrating a configuration of a core network apparatus (AMF/SMF/UPF) in the 5GS.

Next, an example of an apparatus configuration of the AMF will be described using FIG. 7. The AMF includes a controller_B 700, a network connection unit_B 720, and a storage unit_B 740. The controller_B 700, the network connection unit_B 720 and the storage unit_B 740 are connected to each other via a bus.

The controller_B 700 is a functional unit for controlling all operations and functions of the AMF. The controller_B 700 implements various types of processing for the AMF by reading out and executing various programs stored in the storage unit_B 740 when necessary.

The network connection unit_B 720 is a functional unit for the AMF to connect to the base station apparatus (gNB) in the 5G AN, and/or the SMF and/or the PCF, and/or the UDM, and/or the SCEF. That is, the AMF can use the network connection unit_B 720 to transmit and/or receive user data and/or control information to and/or from the base station apparatus (gNB) in the 5G AN and/or the SMF and/or the PCF and/or the UDM and/or the SCEF.

To describe in detail with reference to FIG. 2, by using the network connection unit_A 620, the AMF in the 5GC can communicate with the gNB via the N2 interface, communicate with the UDM via the N8 interface, communicate with the SMF via an S11 interface, and communicate with the PCF via an N15 interface. Furthermore, the AMF can transmit and/or receive the NAS message to and/or from the UE over the N1 interface by using the network connection unit_A 620. However, because the N1 interface is a logical interface, communication between the UE and the AMF is actually performed via the 5G AN. Also, in a case that an N26 interface is supported, the AMF can communicate with the MME via the N26 interface by using the network connection unit_A 620.

The storage unit_B 740 is a functional unit to store programs, user data, control information, and the like necessary for each operation of the AMF.

Note that, the AMF has a function to exchange a control message with the RAN using the N2 interface, a function to exchange a NAS message with the UE using the N1 interface, a function to perform encryption and integrity protection of the NAS message, a Registration management (RM) function, a Connection management (CM) function, a Reachability management function, a Mobility management function for the UE or the like, a function to transfer a Session Management (SM) message between the UE and the SMF, an Access Authentication or Access Authorization function, a Security Anchor Function (SEA), a Security Context Management (SCM) function, a function to support the N2 interface for a Non-3GPP Interworking Function (N3IWF), a function to support transmission and/or reception of NAS signals to and/or from the UE via the N3IWF, a function to authenticate connected UE via the N3IWF, and the like.

In addition, in registration management, the RM state for each UE is managed. The RM state may be synchronized between the UE and the AMF. The RM state includes a deregistered state (RM-DEREGISTERED state) and a registered state (RM-REGISTERED state). In the RM-DEREGISTERED state, the UE is not registered in the network, and thus the AMF is not able to reach the UE because a UE context in the AMF does not have valid location information and routing information for the UE. In addition, in the RM-REGISTERED state, the UE is registered in the network, and thus the UE can receive services that requires registration with the network. Note that the RM state may be expressed as a 5GMM state. In this case, the RM-DEREGISTERED state may be expressed as a 5GMM-DEREGISTERED state, and the RM-REGISTERED state may be expressed as a 5GMM-REGISTERED state.

In other words, the 5GMM-REGISTERED may be a state in which each apparatus has established a 5GMM context or a state in which a PDU session context has been established. Note that, in a case that each apparatus is 5GMM-REGISTERED, the UE_A 10 may start transmission and/or reception of user data or a control message, or may respond to paging. Furthermore, in a case that each apparatus is 5GMM-REGISTERED, the UE_A 10 may perform a registration procedure other than the registration procedure for initial registration, and/or a service request procedure.

Furthermore, 5GMM-DEREGISTERED may be a state in which each apparatus has not established a 5GMM context, a state in which location information of the UE_A 10 is not known to the network, or a state in which the network cannot reach the UE_A 10. Note that, in a case that each apparatus is 5GMM-DEREGISTERED, the UE_A 10 may initiate the registration procedure, or may establish the 5GMM context by performing the registration procedure.

In addition, in connection management, a CM state for each UE is managed. The CM state may be synchronized between the UE and the AMF. Additionally, the CM state includes a disconnected state (CM-IDLE state) and a connected state (CM-CONNECTED state). In the CM-IDLE state, although the UE is in the RM-REGISTERED state, it does not have a NAS signaling connection established between the AMF and the UE via the N1 interface. Also, in the CM-IDLE state, the UE does not have an N2 interface connection (N2 connection) and an N3 interface connection (N3 connection). On the other hand, in the CM-CONNECTED state, the UE has an NAS signaling connection established between the AMF and the UE via the N1 interface. Also, in the CM-CONNECTED state, the UE may have the N2 interface connection (N2 connection) and/or the N3 interface connection (N3 connection).

Furthermore, the connection management may be performed separately for a CM state in a 3GPP access and a CM state in a non-3GPP access. In this case, the CM state in 3GPP access may include a disconnected state in a 3GPP access (CM-IDLE state over a 3GPP access) and a connected state in a 3GPP access (CM-CONNECTED state over a 3GPP access). Furthermore, the CM state in non-3GPP access may include a disconnected state in a non-3GPP access (CM-IDLE state over a non-3GPP access) and a connected state in a non-3GPP access (CM-CONNECTED state over a non-3GPP access). Note that the disconnected state may be expressed as an idle mode, and the connection state mode may be expressed as a connected mode.

Note that the CM state may be expressed as a 5GMM mode. In this case, the disconnected state may be expressed as a 5GMM disconnected mode (5GMM-IDLE mode), and the connected state may be expressed as a 5GMM connected mode (5GMM-CONNECTED mode). Further, the disconnected state in a 3GPP access may be expressed as a 5GMM disconnected mode in a 3GPP access (5GMM-IDLE mode over 3GPP access), and the connected state in a 3GPP access may be expressed as a 5GMM connected mode in a 3GPP access (5GMM-CONNECTED mode over 3GPP access). In addition, the disconnected state in a non-3GPP access may be expressed as a 5GMM disconnected mode in a non-3GPP access (5GMM-IDLE mode over non-3GPP access), and the connected state in a non-3GPP access may be expressed as a 5GMM connected mode in a non-3GPP access (5GMM-CONNECTED mode over non-3GPP access). Note that the 5GMM disconnected mode may be expressed as an idle mode, and the 5GMM connected mode may be expressed as a connected mode.

In addition, at least one AMF may be deployed within the core network_B. In addition, the AMF may be an NF that manages one or more Network Slice Instances (NSI). In addition, the AMF may also be a Common Control Plane Network Function (Common CPNF, or CCNF) shared by a plurality of NSIs.

Note that the N3IWF is an apparatus and/or a function deployed between the non-3GPP access and the 5GC in a case that the UE connects to the 5GS via the non-3GPP access.

2.8. Apparatus Configuration of SMF

Next, an example of an apparatus configuration of the SMF will be described using FIG. 7. The SMF includes a controller_B 700, a network connection unit_B 720, and a storage unit_B 740. The controller_B 700, the network connection unit_B 720 and the storage unit_B 740 are connected to each other via a bus.

The controller_B 700 is a functional unit for controlling all operations and functions of the entire SMF. The controller_B 700 implements various types of processing for the SMF by reading out and executing various programs stored in the storage unit_B 740 when necessary.

The network connection unit_B 720 is a functional unit for the SMF to connect to the AMF, and/or the UPF and/or the PCF, and/or the UDM. That is, the SMF can transmit and/or receive user data and/or control information to and from the AMF and/or the UPF and/or the PCF and/or the UDM by using the network connection unit_B 720.

To describe in detail with reference to FIG. 2, by using the network connection unit_A 620, the SMF in the 5GC can communicate with the AMF via the N11 interface, communicate with the UPF via the N4 interface, communicate with the PCF via the N7 interface, and communicate with the UDM via an N10 interface.

The storage unit_B 740 is a functional unit to store programs, user data, control information, and the like necessary for each operation of the SMF.

The SMF has a function of session management such as establishment, modification, cancellation, or the like of a PDU session, IP address allocation for the UE and a management function thereof, a UPF selection and control function, a UPF configuration function for routing traffic to an appropriate destination (transmission destination), a function of transmitting and/or receiving an SM portion of an NAS message, a function of reporting arrival of downlink data (Downlink Data Notification), a function of providing SM information unique to an AN (for each AN) to be transmitted to the AN over the N2 interface via the AMF, a function of determining a Session and Service Continuity mode (SSC mode) for a session, a roaming function, and the like.

2.9. Apparatus Configuration of UPF

Next, an example of an apparatus configuration of the UPF will be described using FIG. 7. The UPF includes a controller_B 700, a network connection unit_B 720, and a storage unit_B 740. The controller_B 700, the network connection unit_B 720 and the storage unit_B 740 are connected to each other via a bus.

The controller_B 700 is a functional unit for controlling all operations and functions of the UPF. The controller_B 700 implements various types of processing for the UPF by reading out and executing various programs stored in the storage unit_B 740 when necessary.

The network connection unit_B 720 is a functional unit for the UPF to connect to the base station apparatus (gNB) in the 5G AN, and/or the SMF and/or the DN. That is, the UPF can transmit and/or receive user data and/or control information to and/or from the base station apparatus (gNB) in the 5G AN and/or the SMF and/or the DN by using the network connection unit_B 720.

To describe in detail with reference to FIG. 2, by using the network connection unit_A 620, the UPF in the 5GC can communicate with the gNB via the N3 interface, communicate with the SMF via the N4 interface, communicate with the DN via N6 interface, and communicate with other UPF via the N9 interface.

The storage unit_B 740 is a functional unit to store programs, user data, control information, and the like necessary for each operation of the UPF.

The UPF has a function as an anchor point for intra-RAT mobility or inter-RAT mobility, a function as an external PDU session point for mutual connection to the DN (i.e., a function to transfer user data as a gateway between the DN and the core network_B), a packet routing & forwarding function, an Uplink Classifier (UL CL) function to support routing of a plurality of traffic flows for one DN, a Branching point function to support a multi-homed PDU session, a QoS processing function for a user plane, an uplink traffic verification function, buffering of downlink packets, a function of triggering Downlink Data Notification, and the like.

In addition, the UPF may serve as a gateway for IP communication and/or non-IP communication. Furthermore, the UPF may have a function to transfer IP communication or a function to perform conversion between non-IP communication and IP communication.

Furthermore, a plurality of gateways deployed may serve as gateways for connecting the core network_B to a single DN. Note that the UPF may have connectivity with another NF or may be connected to each apparatus via another NF.

2.10. Description of Other Apparatuses and/or Functions

Next, other apparatuses and/or functions will now be described.

The PCF has a function of providing a policy rule.

In addition, the UDM has an authentication information processing (authentication credential processing) function, a user identification processing function, an access authentication function, a registration/mobility management function, a subscription information management (subscription management) function, and the like.

In addition, the PCRF is connected to the PGW and/or the PDN and has a function to perform QoS management for data delivery. For example, the PCRF manages QoS of a communication path between the UE_A 10 and the PDN. Furthermore, the PCRF may be an apparatus that creates and/or manages a Policy and Charging Control (PCC) rule and/or a routing rule used by each apparatus for transmitting and/or receiving user data.

In addition, the HSS is connected to the MME and/or the SCEF, and has a function of managing subscription information, and the like. The subscription information of the HSS is referred to during access control of the MME, for example. Moreover, the HSS may be connected to a location management apparatus different from the MME.

In addition, the SCEF has a function serving as a relay apparatus that is connected to the DN and/or the PDN, the MME and the HSS and transfers user data as a gateway connecting the DN and/or the PDN to the core network_A. Note that the SCEF may serve as a gateway for non-IP communication. Furthermore, the SCEF may have a function to perform conversion between non-IP communication and IP communication. In addition, a plurality of such gateways may be deployed in the core network_A. The SCEF may be configured externally or internally to the core network.

3. Description of Terms, Identification Information, and Procedure Used in Each Embodiment At least one term and one piece of identification information, and procedure used in each embodiment will be described in advance.

3.1. Description of Terms and Identification Information Used in Each Embodiment First, terminology used in each embodiment and identification information used in a procedure will be described in advance.

A network refers to at least some of the access network_B, the core network_B, and the DN. In addition, one or more apparatuses included in at least some of the access network_B, the core network_B, and the DN may also be referred to as a network or a network apparatus. That is, the expression "a network transmits and/or receives a message and/or performs a procedure" signifies that "an apparatus in a network (network apparatus) transmits and/or receives a message and/or performs a procedure."

In addition, a session management (SM) message (also referred to as a Non-Access-Stratum (NAS) SM message) may be a NAS message used in a procedure for the SM, or may be a control message transmitted and/or received between the UE_A 10 and the SMF_A 230 via the AMF_A 240. Furthermore, the SM message may include a PDU session establishment request message, a PDU session establishment accept message, a PDU session complete message, a PDU session reject message, a PDU session modification request message, a PDU session modification accept message, a PDU session modification response message, and the like. In addition, the procedure for the SM may include a PDU session establishment procedure.

In addition, an EMM context is a context established by the UE and the MME in a case that an attach procedure is completed. In addition, a 5GMM context is a context established by the UE and the AMF in a case that a registration procedure is complete. In addition, an EPS bearer context is a context established by the UE and the network for managing an EPS bearer. Furthermore, a context of a default EPS bearer may be expressed as a default EPS bearer context. In addition, a PDU session context is also a context established by the UE and the network for managing a PDU session.

In addition, an Evolved Packet System (EPS) service may be a service provided by a PS domain, and may be a connection service provided using an EPC.

In addition, a non-EPS service may be a service provided by a CS domain, and may be a service other than an EPS service.

In addition, a 5G System (5GS) service may be a connection service provided using the core network_B 190. Furthermore, the 5GS service may be a service different from the EPS service, or the same service as the EPS service.

In addition, a non-5GS service may be a service other than the 5GS service, and may include an EPS service and/or a non-EPS service.

In addition, a single registration mode is a mode in which the UE_A 10 maintains a shared registration state for the 5GMM state and the EMM state in a case that an N1 mode and an S1 mode are available.

In addition, a dual registration mode is a mode in which the UE_A 10 maintains the registration state independently of the 5GMM state and the EMM state in a case that the N1 mode and the S1 mode are available. Note that, in the case of the dual registration mode, the UE_A 10 may be registered in the network only in the N1 mode (i.e., registered only in the 5GC), may be registered in the network only in the S1 mode (registered only in the EPC), or may be registered in the network in both the N1 mode and the S1 mode (registered in both the 5GC and the EPC).

In addition, in order to interwork with the 5GS and the EPC, the UE that supports both the 5GC and the EPC NAS can operate in the single registration mode or the dual registration mode.

In addition, the S1 mode is a mode in which the UE_A 10 is allowed to access the EPC via the E-UTRAN. In other words, the S1 mode may be a mode in which a message using the S1 interface is transmitted and/or received. Note that the S1 interface may be constituted by an S-MME interface and an S1-U interface.

In addition, the N1 mode is a mode in which the UE_A 10 is allowed to access the 5GC via the 5G access network. In other words, the N1 mode may be a mode in which a message is transmitted and/or received using the N1 interface.

Furthermore, although a Packet Data Network (PDN) connection can be defined as a connectivity between the PDN and the UE, it may be a connectivity established between the UE and an external gateway. In the EPS, the UE can establish a PDN connection via the access network_A and the core network_A and thus can transmit and/or receive user data to and/or from the PDN using the PDN connection. Here, the external gateway may be a PGW, a Service Capability Exposure Function (SCEF), or the like. The UE can transmit and/or receive the user data to and/or from an apparatus deployed in the PDN, such as an application server, by using the PDN connection.

Note that, each apparatus (the UE, and/or an access network apparatus, and/or a core network apparatus) may manage a PDN connection in association with one or more pieces of identification information. Note that the identification information may include one or more of an APN, a TFT, a PDN type, application identification information, and access network identification information, and may further include other information. Furthermore, in a case that a plurality of PDN connections are established, respective pieces of identification information associated with the PDN connections may have the same content or different contents.

In addition, the Access Point Name (APN) may be identification information for identifying a core network and/or an external network such as the PDN. Furthermore, the APN can also be used as information for selecting a gateway such as the PGW_A 30/UPF_A 235 to connect to the core network A_90.

In addition, the Traffic Flow Template (TFT) indicates all packet filters associated with an EPS bearer. The TFT is information for identifying some pieces of user data to be transmitted and/or received, and thus, the UE_A 10 uses the EPS bearer associated with the TFT to transmit and/or receive the user data identified by the TFT. In other words, the UE_A 10 uses a Radio Bearer (RB) associated with the TFT to transmit and/or receive the user data identified by the TFT. In addition, the TFT may associate the user data such as application data to be transmitted and/or received with an appropriate transfer path, and may be identification information for identifying the application data. In addition, the UE_A 10 may use a default bearer to transmit and/or receive user data that is hard to be identified by the TFT. In addition, the UE_A 10 may store in advance the TFT associated with the default bearer.

In addition, a Packet Data Network (PDN) type indicates the type of a PDN connection, and includes IPv4, IPv6, IPv4v6, and non-IP. In a case that IPv4 is specified, the IPv4 is used to transmit and/or receive data. In a case that IPv6 is specified, the IPv6 is used to transmit and/or receive data. In a case that IPv4v6 is specified, IPv4 or IPv6 is used to transmit and/or receive data. In a case that non-IP is specified, communication is performed using a communication method other than IPs, rather than communication using an IP.

In addition, the EPS bearer is a logical communication path established between the UE and the PGW, and a communication path constituting a PDN connection. The EPS bearer includes a default bearer (also referred to as a default EPS bearer) and a dedicated bearer (also referred to as a dedicated EPS bearer).

In addition, the default bearer is an EPS bearer first established during the PDN connection, and only one default bearer can be established during one PDN connection. The default bearer is an EPS bearer that can be used for communication of user data that is not associated with a Traffic Flow Template (TFT).

In addition, the dedicated bearer is an EPS bearer established after the default bearer is established during the PDN connection, and one or more dedicated bearers can be established in one PDN connection. The dedicated bearer is an EPS bearer that can be used for communication of user data associated with the TFT.

In addition, although a Protocol Data Unit/Packet Data Unit (PDU) session can be defined as association between the DN that provides a PDU connectivity service and the UE, it may be a connectivity established between the UE and an external gateway. In the 5GS, the UE can establish a PDU session via the access network_B and the core network_B and thus can transmit and/or receive user data to and/or from the DN using the PDU session. Here, the external gateway may be the UPF, the SCEF, or the like. The UE can transmit and/or receive the user data to and/or from an apparatus deployed in the DN, such as an application server, by using the PDU session.

Note that, each apparatus (the UE, and/or an access network apparatus, and/or a core network apparatus) may manage the PDU session in association with one or more pieces of identification information. Note that the identification information may include one or more of a DNN, a TFT, a PDU session type, application identification information, NSI identification information, access network identification information, and an SSC mode, and may further include other information. Furthermore, in a case that a plurality of PDU sessions are established, respective pieces of identification information associated with the PDU sessions may have the same content or different contents.

In addition, the Data Network Name (DNN) may be identification information for identifying a core network and/or an external network such as the DN. Furthermore, the DNN can also be used as information for selecting a gateway such as the PGW_A 30/UPF_A 235 to connect to the core network B190. Furthermore, the DNN may correspond to an Access Point Name (APN).

In addition, a Protocol Data Unit/Packet Data Unit (PDU) session type indicates the type of a PDU session, and there are IPv4, IPv6, Ethernet, and Unstructured. In a case that IPv4 is specified, the IPv4 is used to transmit and/or receive data. In a case that IPv6 is specified, the IPv6 is used to transmit and/or receive data. In a case that Ethernet is specified, an Ethernet frame is transmitted and/or received. In addition, Ethernet may indicate that communication using IPs is not performed. In a case that Unstructured is specified, data is transmitted and/or received to an application server or the like in the DN by using a Point-to-Point (P2P) tunneling technique. For the P2P Tunneling technique, for example, a UDP/IP encapsulation technique may be used. Note that the PDU session types may include IP in addition to the above. IP can be specified in a case that the UE is capable of using both IPv4 and IPv6.

In addition, a network slice (NS) is a logical network that provides specific network capabilities and network performance. The UE and/or the networks can support network slices (NW slices or NSs) in the 5GS.

Moreover, a Network Slice Instance (NSI) includes an instance (entity) of a network function (NF) and a set of required resources, and forms a deployed network slice. Here, the NF is a processing function in the network and is employed or defined by the 3GPP. The NSI is an entity of one or more NSs included in the core network_B. In addition, the NSI may include a virtual Network Function (NF) generated using a Network Slice Template (NST). Here, the NST is associated with a resource request for providing a required communication service or capability, and is a logical expression of one or more NFs. That is, the NSI may be an aggregation including a plurality of NFs in the core network_B 190. The NSI may also be a logical network configured to distribute user data delivered through a service or the like. A network slice may include one or more NFs. The NF included in the NS may be or may not be an apparatus shared by another NS. The UE and/or an apparatus in the network can be allocated to one or more NSs based on NSSAI and/or S-NSSAI and/or UE usage type and/or registration information such as one or more NSI IDs and/or APNs. Note that the UE usage type is a parameter value which is included in the registration information of the UE and used for identifying the NSI. The UE usage type may be stored in the HSS. The AMF may select the SMF and the UPF based on the UE usage type.

In addition, Single Network Slice Selection Assistance Information (S-NSSAI) is information for identifying an NS. The S-NSSAI may include only a Slice/Service type (SST), or may include both the SST and a Slice Differentiator (SD). Here, the SST is information indicating an operation of an NS expected in terms of function and service. Additionally, the SD may be information for interpolating the SST at a time when one NSI is selected from a plurality of NSIs indicated by the SST. The S-NSSAI may be unique information for each PLMN or may be standard information shared by PLMNs. In addition, the network may store one or more pieces of S-NSSAI in the registration information of the UE as default S-NSSAI. Note that, in a case that the S-NSSAI is default S-NSSAI, the network may provide an NS related to the UE in a case that the UE does not transmit valid S-NSSAI to the network in a registration request message.

Moreover, Network Slice Selection Assistance Information (NSSAI) is a group of pieces of S-NSSAI. Each piece of S-NSSAI included in the NSSAI is information for assisting the access network or the core network to select an NSI. The UE may store NSSAI allowed by the network for each PLMN. In addition, the NSSAI may also be information used to select the AMF.

In addition, a Session and Service Continuity (SSC) mode indicates a mode of Session and Service Continuity supported by a system and/or each apparatus in the 5G System (5GS). To be more specific, the SSC mode may be a mode indicating a type of session and service continuity supported by a PDU session established between the UE_A 10 and the UPF. Note that the SSC mode may be a mode indicating a type of session and service continuity configured for each PDU session. Furthermore, the SSC mode may include three modes of SSC mode 1, SSC mode 2, and SSC mode 3. Note that the SSC mode associated with the PDU session may not be changed as long as the PDU session continues.

In addition, the SSC mode 1 is a mode in which the network maintains a connectivity service provided to the UE_A 10. Note that in a case that a PDU session type associated with the PDU session is IPv4 or IPv6, the IP address may be maintained while the session service continues.

Furthermore, the SSC mode 1 may be a mode of the session and service continuity in which the same UPF is continuously maintained regardless of an access technology used by the UE_A 10 to connect to the network. To be more specific, the SSC mode 1 may be a mode in which, even in a case that mobility of the UE_A 10 occurs, the session and service continuity is implemented without changing the UPF used as a PDU session anchor of the established PDU session.

In addition, the SSC mode 2 is a mode in which the network releases the connectivity service provided to the UE_A 10 and the corresponding PDU session. Note that, in a case that a PDU session type associated with the PDU session is IPv4 or IPv6, the IP address allocated to the UE_A 10 may be released to continue the session service.

Furthermore, the SSC mode 2 may be a mode of the session and service continuity in which the same UPF is continuously maintained only in a serving area of the UPF. To be more specific, the SSC mode 2 may be a mode in which the session and service continuity is achieved without changing the UPF used by the established PDU session as long as the UE_A 10 is in the serving area of the UPF. Furthermore, the SSC mode 2 may be a mode in which the session and service continuity is achieved by changing the UPF used by the established PDU session in a case that mobility of the UE_A 10 that is likely to appear in the serving area of the UPF occurs.

Here, the serving area of the UPF may be an area in which one UPF can provide the session and service continuity function, or a subset of an access network such as a RAT or a cell used in a case that the UE_A 10 connects to a network. Furthermore, the subset of the access network may be a network including one or a plurality of RATs and/or cells.

In addition, the SSC mode 3 is a mode in which a modification to the user plane is apparent to the UE_A 10 while the network ensures that a connectivity will not be lost. Note that in the case of the SSC mode 3, a connection passing through a new PDU session anchor point may be established before a previous connection is disconnected to implement a better connectivity service. Furthermore, in a case that a PDU session type associated with the PDU session is IPv4 or IPv6, the IP address may not be maintained in the session and service continuity for transfer of the PDU session anchor.

Furthermore, the SSC mode 3 may be a mode of the session and service continuity that allows a new PDU session and/or communication path to be established via a new UPF with respect to the same DN before a PDU session and/or a communication path established between the UE_A 10 and the UPF is disconnected. Furthermore, the SSC mode 3 may be a mode of the session and service continuity that allows the UE_A 10 to be multi-homed. Furthermore, the SSC mode 3 may be a mode that allows the session and service continuity using a plurality of PDU sessions and/or the UPFs associated with the PDU sessions. In other words, in the case of the SSC mode 3, each apparatus may implement the session and service continuity by using the plurality of PDU sessions, or may implement the session and service continuity by using the plurality of UPFs.

Here, in the case in which a new PDU session and/or communication path is established, each apparatus may select a new UPF using the network, and the new UPF may be an optimal UPF for a place at which the UE_A 10 connects to the network. Furthermore, in a case that the plurality of PDU sessions and/or the UPFs used by the PDU sessions are valid, the UE_A 10 may associate the application and/or flow communication with a newly established PDU session immediately or based on the completion of the communication.

In addition, a default SSC mode is an SSC mode used by the UE_A 10 and/or a network in a case that a specific SSC mode is not determined. Specifically, the default SSC mode may be an SSC mode used by the UE_A 10 in a case that no SSC mode is requested from an application, and/or in a case that there is no policy of the UE_A 10 for determining an SSC mode for an application. In addition, the default SSC mode may be an SSC mode used by the network in a case that no SSC mode is requested from the UE_A 10.

Note that the default SSC mode may be configured for each PDN_A 5, or for the UE_A 10 and/or each subscriber based on subscription information and/or the operator policy and/or the policy of the UE_A 10. Furthermore, the default SSC mode may be information indicating the SSC mode 1, the SSC mode 2, or the SSC mode 3.

In addition, CIoT EPS optimization is a function for supporting efficient communication of small data and Short Message Service (SMS). Here, CIoT EPS optimization may be a function provided in the EPS which is a 4G system. CIoT EPS optimization may include control plane CIoT EPS optimization, user plane CIoT EPS optimization, and Header compression for control plane CIoT EPS optimization.

Note that support for CIoT EPS optimization may mean that one or more of control plane CIoT EPS optimization, user plane CIoT EPS optimization, Header compression for control plane CIoT EPS optimization, and 5GMM-CONNECTED mode with RRC inactive indication are supported. Furthermore, use of CIoT EPS optimization may mean that one or more of control plane CIoT EPS optimization, user plane CIoT EPS optimization, Header compression for control plane CIoT EPS optimization are used. Furthermore, the CIoT EPS optimization in the EPS and the CIoT 5GS optimization in the 5GS may support the same function or different functions.

Note that in the EPS and the 5GS, CIoT EPS optimization and CIoT 5GS optimization may be provided as the same function. In this case, CIoT EPS optimization and CIoT 5GS optimization described in each embodiment may be replaced with each other and provided in the same name. Here, the same name may be CIoT optimization, CIoT EPS optimization, or CIoT 5GS optimization.

In addition, control plane CIoT EPS optimization is a function for signaling optimization to enable efficient communication of user data over the control plane, via the MME or the AMF. Furthermore, in a case that IP data is communicated in control plane CIoT EPS optimization, a header compression function is also available. Here, control plane CIoT EPS optimization may be a function provided in the EPS which is a 4G system. In this case, the UE and the network may transmit and/or receive information indicating support for the header compression for control plane CIoT EPS optimization along with information indicating support for control plane CIoT EPS optimization. Furthermore, in a case that the UE is connected to a RAT for IoT, control plane CIoT EPS optimization may be an essential function.

Note that the support for control plane CIoT EPS optimization may mean that communication of user data via the control plane is supported, and may mean that transmission and/or reception of user data is supported without requiring establishment of a user plane radio bearer for the transmission and/or reception of the user data. Furthermore, use of control plane CIoT EPS optimization may mean that user data is communicated via the control plane, or may mean that user data is transmitted and/or received without establishing a user plane radio bearer. Here, the user plane radio bearer may be referred to as a data radio bearer.

Furthermore, control plane CIoT EPS optimization in the EPS and control plane 5GS EPS optimization in the 5GS may be the same function or different functions.

Note that, in the EPS and the 5GS, control plane CIoT EPS optimization and control plane CIoT 5GS optimization may be provided as the same function. In this case, control plane CIoT EPS optimization and control plane CIoT 5GS optimization described in each embodiment may be replaced with each other and provided in the same name. Here, the same name may be control plane CIoT optimization, control plane CIoT EPS optimization, or control plane CIoT 5GS optimization.

In addition, user plane CIoT EPS optimization is a function for signaling optimization to enable efficient communication of user data on the user plane. Here, user plane CIoT EPS optimization may be a function provided in the EPS which is a 4G system.

Note that support for user plane CIoT EPS optimization may mean that data communication using a user plane radio bearer and the S1U interface for transmitting and/or receiving user data is supported and further suspension and resumption of the Non-Access Stratum (NAS) signaling are supported. In other words, support for user plane CIoT EPS optimization may mean that a transition from an idle mode to a connected mode without requiring a Service request procedure is supported. Furthermore, use of user plane CIoT EPS optimization may mean that NAS signaling is suspended and resumed, and may mean that a transition from the idle mode to the connected mode without requiring the service request procedure is performed.

Furthermore, user plane CIoT EPS optimization in the EPS and user plane CIoT EPS optimization in the 5GS may be the same function or different functions.

Note that, in the EPS and the 5GS, user plane CIoT EPS optimization and user plane CIoT 5GS optimization may be provided as the same function. In this case, user plane CIoT EPS optimization and user plane CIoT 5GS optimization described in each embodiment may be replaced with each other and provided in the same name. Here, the same name may be user plane CIoT optimization, user plane CIoT EPS optimization, or user plane CIoT 5GS optimization.

In addition, Header compression for control plane CIoT EPS optimization is a header compression function. Here, the header compression function may be a function of compressing a size of the header of an IP protocol. Here, Header compression for control plane CIoT EPS optimization may be a function provided in the EPS which is a 4G system. Furthermore, the header compression function may be realized by a framework such as a RObust Header Compression (ROHC). Furthermore, configuration information of the header compression function may be configured in a PDN connectivity procedure, and may be configured again in a bearer resource modification procedure or an EPS bearer context modification procedure.

Note that Header compression for control plane CIoT EPS optimization may be a supported function in a case that control plane CIoT EPS optimization is supported. In addition, Header compression for control plane CIoT EPS optimization may be an available function in a case that the PDN type of the PDN connection associated with control plane CIoT EPS optimization is IPv4, IPv6, or IPv4v6.

Note that support for Header compression for control plane CIoT EPS optimization may mean that communication of user data using the header compression function is supported. Furthermore, use of Header compression for control plane CIoT EPS optimization may mean that user data is communicated using the header compression function.

Furthermore, Header compression for control plane CIoT EPS optimization in the EPS and Header compression for control plane CIoT 5GS optimization in the 5GS may be the same function or different functions.

Note that, in the EPS and the 5GS, Header compression for control plane CIoT EPS optimization and Header compression for control plane CIoT 5GS optimization may be provided as the same function. In this case, Header compression for control plane CIoT EPS optimization and Header compression for control plane CIoT 5GS optimization described in each embodiment may be replaced with each other and provided in the same name. Here, the same name may be Header compression for control plane CIoT optimization, Header compression for control plane CIoT EPS optimization, or Header compression for control plane CIoT 5GS optimization.

In addition, CIoT 5GS optimization is a function for supporting efficient communication of small data or a Short Message Service (SMS). Here, the CIoT EPS optimization may be a function provided in the 5GS which is a 5G system. CIoT 5GS optimization may be control plane CIoT 5GS optimization, user plane CIoT 5GS optimization, and Header compression for control plane CIoT 5GS optimization. Furthermore, the CIoT 5GS optimization may include 5GMM-CONNECTED mode with RRC inactive indication.

Note that support for CIoT 5GS optimization may mean that one or more of control plane CIoT 5GS optimization, user plane CIoT 5GS optimization, Header compression for control plane 5GS EPS optimization, and 5GMM-CON- NECTED mode with RRC inactive indication are supported. Further, use of CIoT 5GS optimization may mean one or more of control plane CIoT 5GS optimization, user plane CIoT 5GS optimization, Header compression for control plane CIoT 5GS optimization, and 5GMM-CONNECTED mode with RRC inactive indication are used. Furthermore, CIoT EPS optimization in the EPS and the CIoT 5GS optimization in the 5GS may support the same function or different functions. Furthermore, CIoT EPS optimization in the 5GS may include functions provided in 5GMM-CONNECTED mode with RRC inactive indication.

Note that, in the EPS and the 5GS, CIoT EPS optimization and CIoT 5GS optimization may be provided as the same function. In this case, CIoT EPS optimization and CIoT 5GS optimization described in each embodiment may be replaced with each other and provided in the same name. Here, the same name may be CIoT optimization, CIoT EPS optimization, or CIoT 5GS optimization.

In addition, control plane CIoT 5GS optimization is a function for signaling optimization to enable efficient communication of user data on the control plane, via the MME, or the AMF. Here, control plane CIoT 5GS optimization may be a function provided in the 5GS, which is a 5G system. Furthermore, in control plane CIoT 5GS optimization, a header compression function can also be used in a case that IP data communication is performed. In this case, the UE and the network may transmit and/or receive information indicating support for header compression for control plane CIoT 5GS optimization (Header compression for control plane CIoT EPS optimization) along with information indicating support for control plane CIoT 5GS optimization. Furthermore, in a case that the UE is connected to a RAT for IoT, control plane CIoT 5GS optimization may be an essential function.

Note that support for control plane CIoT 5GS optimization may mean that communication of user data via the control plane is supported, and may mean that transmission and/or reception of user data is supported without requiring establishment of a user plane radio bearer for the transmission and/or reception of the user data. Furthermore, use of control plane CIoT 5GS optimization may mean that user data is communicated via the control plane, and may mean that user data is transmitted and/or received without establishing a user plane radio bearer.

Furthermore, control plane CIoT EPS optimization in the EPS and control plane CIoT 5GS optimization in the 5GS may have the same function or different functions.

Note that, in the EPS and the 5GS, control plane CIoT EPS optimization and control plane CIoT 5GS optimization may be provided as the same function. In this case, control plane CIoT EPS optimization and control plane CIoT 5GS optimization described in each embodiment may be replaced with each other and provided in the same name. Here, the same name may be control plane CIoT optimization, control plane CIoT EPS optimization, or control plane CIoT 5GS optimization.

In addition, user plane CIoT 5GS optimization is also a function for signaling optimization to enable efficient communication of user data on the user plane. Here, user plane CIoT 5GS optimization may be a function provided in the 5GS, which is a 5G system.

Note that support for user plane CIoT 5GS optimization may mean that data communication using a user plane radio bearer and the N3 interface for transmitting and/or receiving user data is supported and further suspension and resumption of Non-Access Stratum (NAS) signaling are supported. In other words, support for user plane CIoT 5GS optimization may mean that a transition from the idle mode to the connected mode without requiring a Service request procedure is supported. Furthermore, use of user plane CIoT 5GS optimization may mean that NAS signaling is suspended and resumed, or may mean that a transition from the idle mode to the connected mode without requiring the service request procedure is performed.

Furthermore, user plane CIoT EPS optimization in the EPS and user plane CIoT 5GS optimization in the 5GS may be the same function or different functions. Furthermore, user plane CIoT 5GS optimization in the 5GS may include the same function as or a different function from the function provided in 5GMM-CONNECTED mode with RRC inactive indication.

Note that, in the EPS and the 5GS, user plane CIoT EPS optimization and user plane CIoT 5GS optimization may be provided as the same function. In this case, user plane CIoT EPS optimization and user plane CIoT 5GS optimization described in each embodiment may be replaced with each other and provided in the same name. Here, the same name may be user plane CIoT optimization, user plane CIoT EPS optimization, or user plane CIoT 5GS optimization.

In addition, Header compression for control plane CIoT 5GS optimization is a header compression function. Here, the header compression function may be a function of compressing a size of the header of an IP protocol. Here, Header compression for control plane CIoT 5GS optimization may be a function provided in the 5GS which is a 5G system. Furthermore, the header compression function may be implemented by a framework such as a RObust Header Compression (ROHC). Furthermore, configuration information of the header compression function may be configured in the PDU session establishment procedure, or may be reconfigured in the PDU session update procedure (PDU session modification procedure).

Note that Header compression for control plane CIoT 5GS optimization may be a function supported in a case that control plane CIoT 5GS optimization is supported. In addition, Header compression for control plane CIoT 5GS optimization may be an available function in a case that the PDU session type of a PDU session associated with control plane CIoT 5GS optimization is IPv4, IPv6, or IP.

Note that support for Header compression for control plane CIoT 5GS optimization may mean that communication of user data using the header compression function is supported. Furthermore, use of Header compression for control plane CIoT 5GS optimization may mean that user data is communicated using the header compression function.

Furthermore, Header compression for control plane CIoT EPS optimization in the EPS and Header compression for control plane CIoT 5GS optimization in the 5GS may be the same function or different functions.

Note that, in the EPS and the 5GS, Header compression for control plane CIoT EPS optimization and Header compression for control plane CIoT 5GS optimization may be provided as the same function. In this case, Header compression for control plane CIoT EPS optimization and Header compression for control plane CIoT 5GS optimization described in each embodiment may be replaced with each other and provided in the same name. Here, this same name may be Header compression for control plane CIoT optimization, Header compression for control plane CIoT EPS optimization, or Header compression for control plane CIoT 5GS optimization.

In addition, a Vehicle-to-Everything (V2X) service is a service that provides V2X communication for automobiles, such as vehicle-to-vehicle communication. Note that V2X communication may include V2X communication over a PC5 interface (V2X communication over PC5) and V2X communication over the LTE-Uu interface (V2X communication over LTE-Uu). Furthermore, V2X communication may include V2X communication over an NG RAN (V2X communication over NG RAN) and V2X communication over 5G (V2X communication over 5G). Furthermore, in V2X communication, IP data may be transmitted and received, and non-IP data may be transmitted and/or received.

In addition, the 5GMM-CONNECTED mode with RRC inactive indication is a state indicating that a NAS layer state is a connected state regardless of the state in which the RRC layer is inactive. In other words, the 5GMM-CONNECTED mode with the RRC inactive indication is a state in which a radio bearer is released while maintaining the context of the NAS signaling connection and/or the NAS signaling connection.

Note that support for the 5GMM-CONNECTED mode with the RRC inactive indication may mean that maintaining the state of the NAS layer in the connected state is supported even in a case that a notification indicating the RRC layer being inactive is received from a lower layer. Furthermore, the use of the 5GMM-CONNECTED mode with the RRC inactive indication may mean that the state of the NAS layer is maintained in the connected state even in a case that a notification indicating the RRC layer being inactive is received from a lower layer.

Furthermore, the support for the 5GMM-CONNECTED mode with the RRC inactive indication may mean that user plane CIoT 5GS optimization is supported. Furthermore, the use of the 5GMM-CONNECTED mode with the RRC inactive indication may mean that user plane CIoT 5GS optimization is used.

First identification information is information indicating a request for the CIoT EPS optimization of the UE. The first identification information may be a Preferred CIoT network behaviour (PNB)-CIoT bit. Note that the PNB-CIoT bit may be a bit indicating control plane CIoT EPS optimization, or a bit indicating a request for control plane CIoT EPS optimization.

Further, the PNB-CIoT bit may be a bit constituting an Additional update type information element.

Furthermore, the first identification information may be information selected and determined based on the configuration of the UE and/or the state of the UE and/or the user policy and/or the application request.

Second identification information is information indicating whether the UE supports the control plane CIoT EPS optimization. The second identification information may be a Control plane CIoT EPS optimization (CP CIoT Bit). Note that the CP CIoT bit may be a bit indicating that control plane CIoT EPS optimization is supported (Control plane CIoT EPS optimization supported). Furthermore, the CP CIoT bit may be a bit constituting a UE network capability information element.

Furthermore, the second identification information may be information selected and determined based on the configuration of the UE and/or the state of the UE and/or the user policy and/or the application request.

Third identification information is information indicating whether the UE supports user plane CIoT EPS optimization. The third identification information may be a UP CIoT bit (User plane CIoT EPS optimization). Note that the UP CIoT bit may be a bit indicating that user plane CIoT EPS optimization is supported (User plane CIoT EPS optimization supported). In addition, the UP CIoT bit may be a bit constituting a UE network capability information element.

Furthermore, the third identification information may be information selected and determined based on the configuration of the UE and/or the state of the UE and/or the user policy and/or the application request.

Fourth identification information is information indicating whether the UE supports data communication using a communication path of the user plane. The fourth identification information may be information indicating that the UE supports data communication using the S1-U interface that is an interface between the eNB and the SGW. Further, the fourth identification information may be an S1-U data bit (S1-u data transfer). Note that the S1-U data bit may be a bit indicating that data communication using the S1-U interface is supported (S1-U data transfer supported). In addition, the S1-U data bit may be a bit constituting a UE network capability information element.

Furthermore, the fourth identification information may be information selected and determined based on the configuration of the UE and/or the state of the UE and/or the user policy and/or the application request.

Fifth identification information is information indicating whether the UE supports Header compression for control plane CIoT EPS optimization. The fifth identification information may be an HC-CP CIoT bit (Header compression for control plane CIoT EPS optimization). Note that the HC-CP CIoT bit may be a bit indicating that Header compression for control plane CIoT EPS optimization is supported (Header compression for control plane CIoT EPS optimization supported). In addition, the HC-CP CIoT bit may be a bit constituting a UE network capability information element.

Furthermore, the fifth identification information may be information selected and determined based on the configuration of the UE and/or the state of the UE and/or the user policy and/or the application request.

Sixth identification information is information indicating whether the UE supports V2X communication over PC5. The sixth identification information may be a V2X PC5 bit (V2X communication over PC5). Furthermore, the sixth identification information may be capability information indicating whether the UE supports the V2X service. Note that the V2X PC5 bit may be a bit indicating that V2X communication over PC5 is supported (V2X communication over PC5 supported). Furthermore, the V2X PC5 bits may be a bit constituting a UE network capability information element.

Furthermore, the sixth identification information may be information selected and determined based on the configuration of the UE and/or the state of the UE and/or the user policy and/or the application request.

12th identification information is information indicating whether the network supports control plane CIoT EPS optimization. The 12th identification information may be a CP CIoT bit (Control plane CIoT EPS optimization). Note that the CP CIoT bit may be a bit indicating that control plane CIoT EPS optimization is supported (Control plane CIoT EPS optimization supported). Furthermore, the CP CIoT bit may be a bit constituting an EPS network function support information element (EPS network feature support information element).

Furthermore, the 12th identification information may be information selected and determined by the network based on one or more pieces of identification information of the received first to third identification information and/or information associated with an NSI and/or network capability information and/or an operator policy and/or a network status and/or user registration information, and the like.

13th identification information is information indicating whether the network supports user plane CIoT EPS optimization. The 13th identification information may be a UP CIoT Bit (User plane CIoT EPS optimization). Note that the UP CIoT bit may be a bit indicating that user plane CIoT EPS optimization is supported (User plane CIoT EPS optimization supported). Furthermore, the UP CIoT bit may be a bit constituting an EPS network function support information element (EPS network feature support information element).

Furthermore, the 13th identification information may be information selected and determined by the network based on one or more pieces of identification information of the received first to third identification information and/or information associated with an NSI and/or network capability information and/or an operator policy and/or a network status and/or user registration information, and the like.

14th identification information is information indicating whether the network supports data communication using a communication path of the user plane. The 14th identification information may be information indicating that the network supports data communication using the S1-U interface that is an interface between the eNB and the SGW. Further, the 14th identification information may be an S1-U data bit (S1-u data transfer). Note that the S1-U data bit may be a bit indicating that data communication using the S1-U interface is supported (S1-U data transfer supported). Furthermore, the S1-U data bit may be a bit constituting an EPS network function support information element (EPS network feature support information element). Furthermore, the 14th identification information may be information indicating that the network accepts data communication using the S1-U interface.

Further, the 13th identification information and/or the 14th identification information may be identification information indicating that a communication path of the user plane has been established or identification information indicating that establishment of a communication path of the user plane is executable in a case that the network uses user data communication using control plane CIoT EPS optimization.

Furthermore, the 14th identification information may be information selected and determined by the network based on the fourth identification information received by the network and/or information associated with an NSI and/or network capability information and/or an operator policy and/or a network status and/or user registration information, and the like.

15th identification information is information indicating whether the network supports Header compression for control plane CIoT EPS optimization. The 15th identification information may be an HC-CP CIoT bit (Header compression for control plane CIoT EPS optimization). Note that the HC-CP CIoT bit may be a bit indicating that Header compression for control plane CIoT EPS optimization is supported (Header compression for control plane CIoT EPS optimization supported). Furthermore, the HC-CP CIoT bit may be a bit constituting an EPS network function support information element (EPS network feature support information element). Furthermore, the 15th identification information may be information indicating whether the network has accepted use of Header compression for control plane CIoT EPS optimization.

Furthermore, the 15th identification information may be information selected and determined by the network based on the fifth identification information received by the network and/or information associated with an NSI and/or network capability information and/or an operator policy and/or a network status and/or user registration information, and the like.

16th identification information is information indicating whether the network supports V2X communication over PC5. Furthermore, the 16th identification information may be capability information indicating whether the network supports the V2X service. The 16th identification information may be a V2X PC5 bit (V2X communication over PC5). Note that the V2X PC5 bit may be a bit indicating that V2X communication over PC5 is supported (V2X communication over PC5 supported). Furthermore, the V2X PC5 bit may be a bit constituting an EPS network function support information element (EPS network feature support information element). Furthermore, the 16th identification information may be information indicating that the network has accepted the use of V2X communication over PC5.

Furthermore, the 16th identification information may be information selected and determined by the network based on the sixth identification information received by the network and/or information associated with an NSI and/or network capability information and/or an operator policy and/or a network status and/or user registration information, and the like.

21st identification information is information indicating that the communication path requesting establishment is a communication path available only for control plane CIoT EPS optimization. The 21st identification information may be information indicating that the communication path requesting establishment is a communication path that cannot be mapped to the communication path of the user plane. Furthermore, the 21st identification information may be information indicating that the communication path requesting establishment is a communication path to be released in a case that the use of the control plane CIoT EPS optimization is disabled. Furthermore, the 21st identification information may be information indicating that each apparatus is not able to map user data communication associated with the communication path requesting establishment to the communication path of the user plane. Note that the communication path may be a PDN connection.

Furthermore, the 21st identification information may be information selected and determined based on the configuration of the UE and/or the state of the UE and/or the user policy and/or the application request.

31st identification information is information indicating that the established communication path is a communication path available only for control plane CIoT EPS optimization. The 31st identification information may be information indicating that the established communication path is a communication path that cannot be mapped to the communication path of the user plane. Furthermore, the 31st identification information may be information indicating that the established communication path is a communication path to be released in a case that the control plane CIoT EPS optimization is not available. Furthermore, the 31st identification information may be information indicating that each apparatus is not able to map user data communication associated with the established communication path to the communication path of the user plane. Note that the communication path may be a PDN connection.

Furthermore, the 31st identification information may be information selected and determined by the network based on the 21st identification information received by the network and/or information associated with an NSI and/or network capability information and/or an operator policy and/or a network status and/or user registration information, and the like.

51st identification information is information indicating a request for CIoT 5GS optimization of the UE. The 51st identification information may be a PNB-CIoT bit (Preferred CIoT network behaviour). Note that the PNB-CIoT bit may be a bit indicating control plane CIoT 5GS optimization, or a bit indicating a request for control plane CIoT 5GS optimization. Further, the PNB-CIoT bit may be a bit constituting an Additional update type information element.

Furthermore, the 51st identification information may be information selected and determined based on the configuration of the UE and/or the state of the UE and/or the user policy and/or the application request.

52nd identification information is information indicating whether the UE supports the control plane CIoT 5GS optimization. The 52nd identification information may be a CP CIoT bit (Control plane CIoT 5GS optimization). Note that the CP CIoT bit may be a bit indicating that control plane CIoT 5GS optimization is supported (Control plane CIoT 5GS optimization supported). Furthermore, the CP CIoT bit may be a bit constituting a UE network capability information element. Furthermore, the CP CIoT bit may be a bit constituting a 5GMM capability information element indicating capabilities of the UE in 5G.

Furthermore, the 52nd identification information may be information selected and determined based on the configuration of the UE and/or the state of the UE and/or the user policy and/or the application request.

53rd identification information is information indicating whether the UE supports the user plane CIoT 5GS optimization. The 53rd identification information may be a UP CIoT bit (User plane CIoT 5GS optimization). Note that the UP CIoT bit may be a bit indicating that user plane CIoT 5GS optimization is supported (User plane CIoT 5GS optimization supported). In addition, the UP CIoT bit may be a bit constituting a UE network capability information element. Furthermore, the UP CIoT bit may be a bit constituting a 5GMM capability information element indicating the capabilities of the UE in 5G.

Furthermore, the 53rd identification information may be information selected and determined based on the configuration of the UE and/or the state of the UE and/or the user policy and/or the application request.

54th identification information is information indicating whether the UE supports data communication using a communication path of the user plane. The 54th identification information may be information indicating that the UE supports data communication using the N3 interface that is an interface between the gNB and the UPF. Further, the 54th identification information may be an N3 data bit (N3 data transfer). Note that the N3 data bit may be a bit indicating that data communication using the N3 interface is supported (N3 data transfer supported). Furthermore, the N3 data bit may be a bit constituting a 5GMM capability information element indicating the capabilities of the UE in 5G.

Furthermore, the 54th identification information may be information selected and determined based on the configuration of the UE and/or the state of the UE and/or the user policy and/or the application request.

55th identification information is information indicating whether the UE supports Header compression for control plane CIoT 5GS optimization. The fifth identification information may be an HC-CP CIoT bit (Header compression for control plane CIoT 5GS optimization). Note that the HC-CP CIoT bit may be a bit indicating that Header compression for control plane CIoT 5GS optimization is supported (Header compression for control plane CIoT 5GS optimization supported). In addition, the HC-CP CIoT bit may be a bit constituting a UE network capability information element. Furthermore, the HC-CP CIoT bit may be a bit constituting a 5GMM capability information element indicating the capabilities of the UE in 5G.

Furthermore, the 55th identification information may be information selected and determined based on the configuration of the UE and/or the state of the UE and/or the user policy and/or the application request.

56th identification information is information indicating whether the UE supports V2X communication over PC5. The 56th identification information may be a V2X PC5 bit (V2X communication over PC5). Furthermore, the 56th identification information may be capability information indicating whether the UE supports the V2X service. Note that the V2X PC5 bit may be a bit indicating that V2X communication over PC5 is supported (V2X communication over PC5 supported). Furthermore, the V2X PC5 bit may be a bit constituting a UE network capability information element. Furthermore, the V2X PC5 bit may be a bit constituting a 5GMM capability information element indicating the capabilities of the UE in 5G.

Furthermore, the 56th identification information may be information selected and determined based on the configuration of the UE and/or the state of the UE and/or the user policy and/or the application request.

57th identification information is information indicating whether the UE supports the 5GMM-CONNECTED mode with RRC inactive indication. The 57th identification information may be capability information indicating that the UE can transition between the 5GMM-CONNECTED mode with RRC inactive indication and the 5GMM-CONNECTED mode based on a notification from the lower layer.

Note that the 57th identification information may be identification information indicating the same meaning as the 53rd identification information. Furthermore, in the case in which the 53rd identification information and the 57th identification information indicate the same meaning, only one of the 53rd identification information and the 57th identification information may be transmitted and/or received.

Furthermore, the 57th identification information may be information selected and determined based on the configuration of the UE and/or the state of the UE and/or the user policy and/or the application request.

58th identification information is NSSAI requested by the UE. The 58th identification information may be information constituted by one or a plurality of pieces of S-NSSAI. Furthermore, the 58th identification information may be information including one or a plurality of pieces of S-NSSAI associated with the NSI supporting one or more functions among the functions indicated by the 51st to the 57th identification information.

Furthermore, the 58th identification information may include information for associating each piece of the S-NSSAI and each function indicated by the 51st to the 57th identification information. Furthermore, the 58th identification information may include information indicating which function each piece of NSI supports among the functions indicated by the 51st to the 57th identification information.

Furthermore, the 58th identification information may be information selected and determined based on the configuration of the UE and/or the state of the UE and/or the user policy and/or the application request.

62nd identification information is information indicating whether the network supports control plane CIoT 5GS optimization. The 62nd identification information may be a CP CIoT bit (Control plane CIoT 5GS optimization). Note that the CP CIoT bit may be a bit indicating that control plane CIoT 5GS optimization is supported (Control plane CIoT 5GS optimization supported). Furthermore, the CP CIoT bit may be a bit constituting a 5GS network function support information element (5GS network feature support information element). Furthermore, the CP CIoT bit may be a bit constituting the 5GMM network function support information element (5GMM network feature support information element) indicating network capability in 5G. Furthermore, the 62nd identification information may be information indicating that the network has accepted use of control plane CIoT 5GS optimization.

Furthermore, the 62nd identification information may be information selected and determined by the network based on one or more pieces of identification information of the received 51st to 53rd identification information and/or information associated with an NSI and/or network capability information and/or an operator policy and/or a network status and/or user registration information, and the like.

63rd identification information is information indicating whether the network supports user plane CIoT 5GS optimization. The 63rd identification information may be a UP CIoT bit (User plane CIoT 5GS optimization). Note that the UP CIoT bit may be a bit indicating that user plane CIoT 5GS optimization is supported (User plane CIoT 5GS optimization supported). Furthermore, the UP CIoT bit may be a bit constituting a 5GS network function support information element (5GS network feature support information element). Furthermore, the UP CIoT bit may be a bit constituting the 5GMM network function support information element (5GMM network feature support information element) indicating network capability in 5G. Furthermore, the 63rd identification information may be information indicating whether the network has accepted use of user plane CIoT 5GS optimization.

Furthermore, the 63rd identification information may be information selected and determined by the network based on one or more pieces of identification information of the received 51st to 53rd identification information and/or information associated with an NSI and/or network capability information and/or an operator policy and/or a network status and/or user registration information, and the like.

64th identification information is information indicating whether the network supports data communication using a communication path of the user plane. The 64th identification information may be information indicating that the network supports data communication using the N3 interface that is an interface between the gNB and the UPF. Further, the 64th identification information may be an N3 data bit (N3 data transfer). Note that the N3 data bit may be a bit indicating that data communication using the N3 interface is supported (N3 data transfer supported). Furthermore, the N3 data bit may be a bit constituting the 5GMM network function support information element (5GMM network feature support information element) indicating network capability in 5G. Furthermore, the 64th identification information may be information indicating that the network accepts data communication using the N3 interface.

Further, the 63rd identification information and/or the 64th identification information may be identification information indicating that the network has established a communication path of the user plane or identification information indicating that establishment of a communication path of the user plane is executable in a case of using user data communication using control plane CIoT 5GS optimization.

Furthermore, the 64th identification information may be information selected and determined by the network based on the 54th identification information received by the network and/or information associated with an NSI and/or network capability information and/or an operator policy and/or a network status and/or user registration information, and the like.

65th identification information is information indicating whether the network supports Header compression for control plane CIoT 5GS optimization. The 65th identification information may be an HC-CP CIoT bit (Header compression for control plane CIoT 5GS optimization). Note that the HC-CP CIoT bit may be a bit indicating that Header compression for control plane CIoT 5GS optimization is supported (Header compression for control plane CIoT 5GS optimization supported). Furthermore, the HC-CP CIoT bit may be a bit constituting a 5GS network function support information element (5GS network feature support information element). Furthermore, the HC-CP CIoT bit may be a bit constituting the 5GMM network function support information element (5GMM network feature support information element) indicating network capability in 5G. Furthermore, the 65th identification information may be information indicating whether the network has accepted use of Header compression for control plane CIoT 5GS optimization.

Furthermore, the 65th identification information may be information selected and determined by the network based on the 55th identification information received by the network and/or information associated with an NSI and/or network capability information and/or an operator policy and/or a network status and/or user registration information, and the like.

66th identification information is information indicating whether the network supports V2X communication over PC5. Furthermore, the 66th identification information may be capability information indicating whether the network supports the V2X service. The 66th identification information may be a V2X PC5 bit (V2X communication over PC5). Note that the V2X PC5 bit may be a bit indicating that V2X communication over PC5 is supported (V2X communication over PC5 supported). Furthermore, the V2X PC5 bit may be a bit constituting a 5GS network function support information element (5GS network feature support information element). Furthermore, the V2X PC5 bit may be a bit constituting the 5GMM network function support information element (5GMM network feature support information element) indicating network capability in 5G. Furthermore, the 66th identification information may be information indicating that the network accepts the use of the V2X communication over PC5.

Furthermore, the 66th identification information may be information selected and determined by the network based on the 56th identification information received by the network and/or information associated with an NSI and/or network capability information and/or an operator policy and/or a network status and/or user registration information, and the like.

67th identification information is information indicating whether the network supports the 5GMM-CONNECTED mode with RRC inactive indication. The 67th identification information may be capability information indicating that the network can manage transitions of the UE between the 5GMM-CONNECTED mode with RRC inactive indication and the 5GMM-CONNECTED mode based on a notification from the lower layer. Furthermore, the 67th identification information may be information indicating that the network has accepted the use of the 5GMM-CONNECTED mode with RRC inactive indication.

Note that the 67th identification information may be identification information indicating the same meaning as the 63rd identification information. Furthermore, in the case in which the 63rd identification information and the 67th identification information indicate the same meaning, only one of the 63rd identification information and the 67th identification information may be transmitted and/or received.

Furthermore, the 67th identification information may be information selected and determined by the network based on the 57th identification information and/or NSI-associated information and/or network capability information and/or the operator policy and/or a network status and/or user registration information, and the like.

The 68th identification information is NSSAI accepted by the network. The 68th identification information may be information constituted by one or a plurality of pieces of S-NSSA. Furthermore, the 68th identification information may be information including one or a plurality of pieces of S-NSSAI corresponding to an NSI supporting one or more functions among the functions indicated by the 62nd to 67th identification information. Furthermore, the 68th identification information may be information including one or a plurality of pieces of S-NSSAI associated with an NSI of which one or more functions has been accepted for use among the functions indicated by the 62nd to the 67th identification information.

Furthermore, the 68th identification information may include information for associating each piece of the S-NSSAI and each of the functions indicated by the 62nd to the 67th identification information. Furthermore, the 68th identification information may include information indicating which function each NSI supports among the functions indicated by the 62nd to 67th identification information, and may include information indicating which function has been accepted for use for each NSI.

Furthermore, the 68th identification information may be information selected and determined by the network based on the received 58th identification information and/or NSI-associated information and/or network capability information and/or the operator policy and/or a network status and/or user registration information, and the like.

Note that in a case that the UE is an IoT terminal, only one S-NSSAI may be included in the NSSAI indicated by the 68th identification information. In other words, in a case that the UE is an IoT terminal, the 68th identification information may include a single piece of S-NSSAI.

71st identification information is information indicating that the communication path requesting establishment is a communication path available only for control plane CIoT 5GS optimization. The 71th identification information may be information indicating that the communication path requesting establishment is a communication path that cannot be mapped to the communication path of the user plane. Furthermore, the 71st identification information may be information indicating that the communication path requesting establishment is a communication path to be released in a case that the use of control plane CIoT 5GS optimization is disabled. Furthermore, the 71st identification information may be information indicating that each apparatus is not able to map user data communication associated with the communication path requesting establishment to the communication path of the user plane. Note that the communication path may be a PDU session.

Furthermore, the 71st identification information may be information selected and determined based on the configuration of the UE and/or the state of the UE and/or the user policy and/or the application request.

72nd identification information is S-NSSAI requested by the UE. The 72nd identification information may be S-NSSAI associated with an NSI of which one or more functions has been accepted for use among the functions indicated by the 62nd to the 67th identification information.

Furthermore, the 72nd identification information may be information selected and determined based on the 62nd to the 68th identification information and/or the configuration of the UE and/or the state of the UE and/or the user policy and/or the application request.

81st identification information is information indicating that the established communication path is a communication path available only for control plane CIoT 5GS optimization. The 81st identification information may be information indicating that the established communication path is a communication path that cannot be mapped to the communication path of the user plane. Furthermore, the 81st identification information may be information indicating that the established communication path is a communication path that is released in a case that the control plane CIoT 5GS optimization is not available. Furthermore, the 81st identification information may be information indicating that each apparatus is not able to map user data communication associated with the established communication path to the communication path of the user plane. Note that the communication path may be a PDU session.

Furthermore, the 81st identification information may be information selected and determined by the network based on the 71st identification information received by the network and/or NSI-associated information and/or network capability information and/or the operator policy and/or a network status and/or user registration information, and the like.

82nd identification information is S-NSSAI selected by the network. The 82nd identification information may be S-NSSAI associated with an NSI that is allowed to be used by the network. Furthermore, the 82nd identification information may be S-NSSAI associated with an NSI of which one or more functions has been accepted for use among the functions indicated by the 62nd to the 67th identification information.

Furthermore, the 82nd identification information may be information selected and determined by the network based on the received 72nd identification information and/or NSI-associated information and/or network capability information and/or the operator policy and/or a network status and/or user registration information, and the like.

3.2. Description on Procedures Used in Each Embodiment

Next, procedures used in each embodiment will be described. Note that the procedures used in each embodiment include the Registration procedure and the PDU session establishment procedure. Furthermore, the procedures used in each embodiment include an Attach procedure, a Tracking Area Update procedure, and a PDN connectivity procedure. Each of the procedures will be described below.

3.2.1. Registration Procedure

First, the registration procedure will be described with reference to FIG. 8. The registration procedure is a procedure in the 5GS. The present procedure hereinafter refers to the registration procedure. The registration procedure is a procedure initiated by the UE for registration in the access network_B, and/or the core network_B and/or the DN. In a state in which the UE is not registered in the network, the UE can perform the present procedure at any timing, for example, in a case that power is turned on. In other words, the UE can initiate the present procedure at any timing in a non-registered state (RM-DEREGISTERED state). In addition, each apparatus (particularly, the UE and the AMF) can transition to a registered state (RM-REGISTERED state), based on the completion of the registration procedure.

Furthermore, the registration procedure may be a procedure for updating location registration information of the UE in the network, for regularly notifying, by the UE, the network of a state of the UE, and/or for updating particular parameters related to the UE in the network.

The UE may initiate the registration procedure in a case that the UE applies mobility across TAs. In other words, the UE may initiate the registration procedure in a case that the UE moves to a TA different from the TA indicated on a TA list that the UE is holding. Furthermore, the UE may initiate the present procedure in a case that a running timer expires. Furthermore, the UE may initiate the registration procedure in a case that a context of each apparatus needs to be updated due to disconnection or deactivation of a PDU session. Furthermore, the UE may initiate the registration procedure in a case that a change occurs in capability information and/or a preference concerning PDU session establishment of the UE. Furthermore, the UE may initiate the registration procedure regularly. Note that, the timing is not limited thereto, and the UE can perform the registration procedure at any timing.

First, the UE initiates the registration procedure by transmitting a registration request message to the AMF via the 5G AN (or gNB) (S800), (S802), and (S804). Specifically, the UE transmits an RRC message including the registration request message to the 5G AN (or gNB) (S800). Note that the registration request message is a NAS message. In addition, the RRC message may be a control message transmitted and/or received between the UE and the 5G AN (or gNB). Furthermore, the NAS message is processed in a NAS layer, and the RRC message is processed in an RRC layer. Note that the NAS layer is a higher layer than the RRC layer.

Here, although the UE can include, among the 51st to 58th identification information, at least one or more pieces of identification information in the registration request message and/or the RRC message and transmit them, the UE may include the information in a control message different from the above messages, for example, a control message of a layer lower than the RRC layer (e.g., an MAC layer, an RLC layer, and a PDCP layer) and transmit it. Note that the UE may indicate that the UE supports each function by transmitting the identification information, or may indicate a request of the UE. Furthermore, two or more pieces of identification information of the above identification information may be configured as one or more pieces of identification information. Note that the information indicating support of each function and information indicating a request for use of each function may be transmitted and/or received with the same identification information or may be transmitted and/or received as different identification information.

The UE may transmit the 51st identification information and/or the 52nd identification information to indicate a request for use of control plane CIoT 5GS optimization. In this case, the 51st identification information may be information indicating control plane CIoT 5GS optimization. Furthermore, the 52nd identification information may be information indicating support for control plane CIoT 5GS optimization.

Furthermore, the UE may transmit the 51st identification information and/or the 53rd identification information and/or the 54th identification information to indicate a request for use of user plane CIoT 5GS optimization. In this case, the 51st identification information may be information indicating user plane CIoT 5GS optimization. Furthermore, the 53rd identification information may be information indicating support for user plane CIoT 5GS optimization. Furthermore, the 54th identification information may be information indicating support for data communication using the communication path of the user plane.

Furthermore, the UE may transmit the 55th identification information to indicating a request for use of Header compression for control plane CIoT 5GS optimization. In this case, the 55th identification information may be information indicating support for Header compression for control plane CIoT 5GS optimization.

Furthermore, the UE may transmit the 56th identification information to indicate a request for use of the V2X service. In this case, the 56th identification information may be information indicating support for the V2X service.

Furthermore, the UE may transmit the 57th identification information to indicate a request for use of 5GMM-CONNECTED mode with RRC inactive indication. In this case, the 57th identification information may be information indicating support for 5GMM-CONNECTED mode with RRC inactive indication.

Furthermore, in addition to one or more pieces of identification information among the 51st to 57th identification information, the UE may further transmit the 58th identification information to indicate support for CIoT 5GS optimization and/or the V2X service and indicate a request for use in the S-NSSAI included in the 58th identification information.

Furthermore, the UE may transmit one or more pieces of identification information among 51st to 57th identification information for each piece of the S-NSSAI included in the 58th identification information. In this case, the UE may indicate support for CIoT 5GS optimization and/or the V2X service for each piece of S-NSSAI included in the 58th identification information, and may indicate a request for use thereof.

In addition, the UE may transmit an SM message (e.g., a PDU session establishment request message) included in the registration request message, or transmits the SM message (e.g., the PDU session establishment request message) along with the registration request message to initiate a PDU session establishment procedure during the registration procedure.

In a case that the RRC message including the registration request message is received, the 5G AN (or gNB) selects the AMF to which the registration request message is to be transferred (S802). Note that the 5G AN (or gNB) can select the AMF based on information included in the registration request message and/or the RRC message. The 5G AN (or gNB) retrieves the registration request message from the received RRC messages and transfers the registration request message to the selected AMF (S804).

The AMF can perform first condition determination in a case that the registration request message is received. The first condition determination is intended to determine whether the network (or the AMF) accepts a request from the UE. The AMF initiates the procedure (A) of FIG. 8 in a case that the first condition determination is true, and initiates the procedure (B) of FIG. 8 in a case that first condition determination is false.

Note that the first condition determination may be performed based on reception of the registration request message and/or each piece of identification information included in the registration request message, and/or subscription information, and/or network capability information and/or an operator policy and/or a network status and/or user registration information and/or context held by the AMF, and the like. For example, in a case that the network allows the request from the UE, the first condition determination may be true, and in a case that the network does not allow the request from the UE, the first condition determination may be false. In addition, in a case that the network serving as a registration destination of the UE and/or an apparatus in the network supports a function requested by the UE, the first condition determination may be true, and in a case that the network and/or the apparatus does not support the function requested by the UE, the first condition determination may be false. Furthermore, in a case that the identification information to be transmitted and/or received is allowed, the first condition determination may be true, and in a case that the identification information to be transmitted and/or received is not allowed, the first condition determination may be false. Note that conditions for determining whether the first condition determination is true or false may not be limited to the above-described conditions.

First, a case in which the first condition determination is true will be described. The AMF can first perform fourth condition determination in the procedure (A) of FIG. 8. The fourth condition determination is to determine whether the AMF transmits and/or receives the SM message to/from the SMF.

Note that the fourth condition determination may be performed based on whether the AMF has received the SM message. In addition, the fourth condition determination may also be performed based on whether the SM message is included in the registration request message. For example, the fourth condition determination may be true in a case that the AMF has received the SM message and/or the SM message is included in the registration request message, and the fourth condition determination may be false in a case that the AMF has not received the SM message and/or the SM message is not included in the registration request message. Note that conditions for determining whether the fourth condition determination is true or false may not be limited to the above-described conditions.

In a case that the fourth condition determination is true, the AMF selects the SMF and transmits and/receives the SM message to/from the selected SMF, and in a case that the fourth condition determination is false, the operations are not performed (S806). Furthermore, in a case that the AMF receives the SM message indicating rejection from the SMF even in a case that the fourth condition determination is true, the AMF may cease the procedure (A) of FIG. 8. At this time, the AMF can initiate the procedure (B) of FIG. 8.

Note that the AMF can notify the SMF of the identification information received in the registration request message in a case that the SM message is transmitted and/or received to and/or from the SMF in S806. The SMF can obtain identification information received from the AMF by transmitting and/or receiving SM messages to and/or from the AMF.

Next, the AMF transmits a registration accept message to the UE via the 5G AN (or gNB) as a response message to the registration request message based on the reception of the registration request message and/or the completion of the transmission and/or reception of the SM message to and/or from the SMF (S808). For example, in a case that the fourth condition determination is true, the AMF may transmit the registration accept message based on the reception of the registration request message from the UE. In addition, in a case that the fourth condition determination is false, the AMF may transmit the registration accept message based on the completion of transmission and/or reception of the SM message to and/or from the SMF. Note that the registration accept message is a NAS message to be transmitted and/or received on the N1 interface, and it is included in the RRC message and transmitted and/or received between the UE and the 5G AN (gNB).

The AMF may include at least one piece of identification information among the 62nd to the 68th identification information in the registration accept message, and transmit it. Note that the AMF may indicate that the network supports each function by transmitting the identification information, or may indicate that the request from the UE has been accepted. Furthermore, two or more pieces of identification information of the above identification information may be configured as one or more pieces of identification information. Note that the information indicating support for each function and information indicating a request for use of each function may be transmitted and/or received with the same identification information or may be transmitted and/or received as different identification information.

The AMF may indicate acceptance of the use of control plane CIoT 5GS optimization by transmitting the 62nd identification information. In this case, the 62nd identification information may be information indicating support for control plane CIoT 5GS optimization.

Furthermore, the AMF may transmit the 63rd identification information and/or the 64th identification information to indicate acceptance of use of user plane CIoT 5GS optimization. In this case, the 63rd identification information may be information indicating support for user plane CIoT 5GS optimization. Furthermore, the 64th identification information may be information indicating support for data communication using the communication path of the user plane.

Furthermore, the AMF may transmit the 65th identification information to indicate acceptance of use of Header compression for control plane CIoT 5GS optimization. In this case, the 65th identification information may be information indicating support for Header compression for control plane CIoT 5GS optimization.

Furthermore, the AMF may transmit the 66th identification information to indicate acceptance of use of the V2X service. In this case, the 66th identification information may be information indicating support for the V2X service.

Furthermore, the AMF may transmit the 67th identification information to indicate acceptance of use of 5GMM-CONNECTED mode with RRC inactive indication. In this case, the 67th identification information may be information indicating support for 5GMM-CONNECTED mode with RRC inactive indication.

Furthermore, in addition to one or more pieces of identification information among the 62nd to 67th identification information, the AMF may further transmit the 68th identification information to indicate support for CIoT 5GS optimization and/or the V2X service or indicate acceptance of use in the S-NSSAI included in the 68th identification information.

Furthermore, the AMF may transmit one or more pieces of identification information among 62nd to 67th identification information for each piece of the S-NSSAI included in the 68th identification information. In this case, the AMF may indicate support for CIoT 5GS optimization and/or the V2X service for each piece of S-NSSAI included in the 68th identification information, or may indicate acceptance of the use thereof.

Note that the AMF may select or determine which identification information among the 62nd to the 68th identification information is to be included in the registration accept message based on each piece of received identification information and/or subscription information and/or network capability information and/or an operator policy, and/or a network state, and/or user registration information and/or a context held by the AMF, and the like.

In addition, the AMF can include an SM message (e.g., a PDU session establishment accept message) in a registration accept message and transmit it, or transmit the SM message (e.g., the PDU session establishment accept message) along with the registration accept message. However, this transmission method may be performed in a case that the SM message (e.g., the PDU session establishment request message) is included in the registration request message and the fourth condition determination is true. Furthermore, the transmission method may be performed in a case that the registration request message and the SM message (e.g., the PDU session establishment request message) are included and the fourth condition determination is true. The AMF can indicate that the procedure for SM has been accepted in the registration procedure by performing such a transmission method.

In addition, the AMF may transmit the registration accept message to indicate the request from the UE has been accepted based on each piece of received identification information and/or subscription information and/or network capability information and/or an operator policy, and/or a network state, and/or user registration information and/or a context held by the AMF, and the like.

Furthermore, the AMF may include information indicating that a part of the request of the UE has been rejected in the registration accept message and transmit it, and indicate the cause of the rejection of the part of the request from the UE by transmitting the information indicating that the part of the request of the UE has been rejected. Furthermore, the UE may recognize the cause of the rejection of the part of the request from the UE by receiving the information indicating that the part of the request of the UE has been rejected. Note that the cause of rejection may be information indicating that the content indicated by the identification information received by the AMF is not allowed.

The UE receives the registration accept message via the 5G AN (gNB) (S808). The UE can recognize, by receiving the registration accept message, that the request of the UE made with the registration request message has been accepted and the contents of various types of identification information included in the registration accept message.

The UE can further transmit a registration complete message via the 5G AN (gNB) to the AMF as a response message to the registration accept message (S810). Note that, in a case that the UE has received an SM message such as a PDU session establishment accept message, the UE may include the SM message such as the PDU session establishment complete message in the registration complete message and transmit it, or may include the SM message therein to indicate that the procedure for SM has been completed. Note that, the registration complete message is a NAS message to be transmitted and/or received on the N1 interface, and it is included in the RRC message and transmitted and/or received between the UE and the 5G AN (gNB).

The AMF receives the registration complete message via the 5G AN (gNB) (S810). In addition, each apparatus completes the procedure (A) of FIG. 8 based on the transmission and/or reception of the registration accept message and/or the registration complete message. Next, a case in which the first condition determination is false will be described. In the procedure (B) of FIG. 8, the AMF transmits a registration reject message to the UE via the 5G AN (gNB) as a response message to the registration request message (S812). Here, the registration reject message is a NAS message to be transmitted and/or received on the N1 interface, and it is included in the RRC message and transmitted and/or received between the UE and the 5G AN (gNB).

Note that the AMF may indicate that the request of the UE through the registration request message has been rejected by transmitting the registration reject message. Furthermore, the AMF may include information indicating the cause of rejection in the registration reject message and transmit it, or may indicate the cause of rejection by transmitting the rejection cause. Furthermore, the UE may recognize the cause of the rejection of the request from the UE by receiving the information indicating that the request of the UE has been rejected. Note that the cause of rejection may be information indicating that the content indicated by the identification information received by the AMF is not allowed.

The UE receives the registration reject message via the 5G AN (gNB) (S812). The UE can recognize, by receiving the registration reject message, that the request of the UE made with the registration request message has been rejected and the contents of various types of identification information included in the registration reject message. In addition, in a case that a predetermined period elapses after the registration request message is transmitted and the UE has not received the registration reject message, the UE may recognize that the request of the UE has been rejected. Each apparatus completes the procedure (B) in the present procedure based on the transmission and/or reception of the registration reject message.

Figure 8:
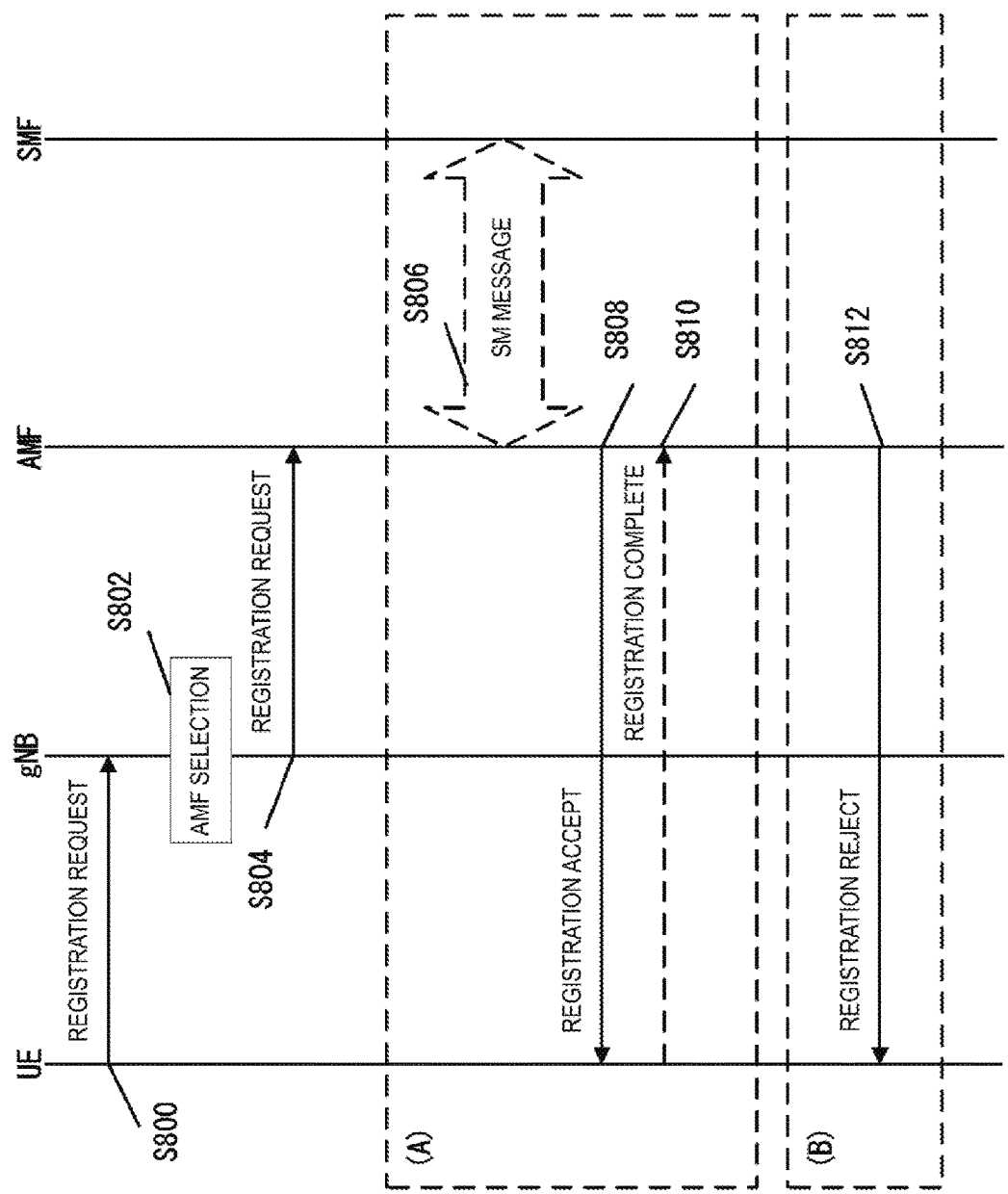
FIG. 8 is a diagram illustrating a registration procedure in the 5GS.

Note that the procedure (B) of FIG. 8 may be initiated in a case that the procedure (A) of FIG. 8 is ceased. Note that, in a case that the fourth condition determination is true in the procedure (A) of FIG. 8, the AMF may include an SM message indicating rejection such as a PDU session establishment reject message in the registration reject message and transmit it, or may include the SM message indicating rejection to indicate that the procedure for SM has been rejected. In that case, the UE may further receive the SM message indicating rejection, such as the PDU session establishment reject message, and may recognize that the procedure for SM has been rejected.

Each apparatus completes the registration procedure, based on the completion of the procedure (A) or (B) of FIG. 8. Note that, based on the completion of the procedure (A) of FIG. 8, each apparatus may transition to a state in which the UE is registered in the network (RM_REGISTERED state), may maintain a state in which the UE is not registered in the network (RM_DEREGISTERED state) based on the completion of the procedure (B) of FIG. 8, or may transition to a state in which the UE is not registered in the network. In addition, a transition of each apparatus to each state may be performed based on completion of the registration procedure, or may be performed based on establishment of a PDU session.

Furthermore, each apparatus may perform processing based on information transmitted and/or received in the registration procedure according to the completion of the registration procedure. In a case that the UE has transmitted and/or received information indicating the part of the request has been rejected, the UE may recognize the cause of rejection of the request. In addition, based on the cause of the reject of the request from the UE, each apparatus may perform the present procedure again, and may perform a registration procedure for the core network_B or another cell.

Furthermore, based on the completion of the registration procedure, the UE may store the registration accept message and/or the identification information received together with the registration reject message and may recognize the determination of the network.

For example, in a case that the 62nd identification information is received, the UE may recognize that use of control plane CIoT 5GS optimization has been accepted. In this case, the 62nd identification information may be information indicating support for control plane CIoT 5GS optimization.

Further, the UE may recognize that use of user plane CIoT 5GS optimization has been accepted in a case that the 63rd identification information and/or the 64th identification information are received. In this case, the 63rd identification information may be information indicating support for user plane CIoT 5GS optimization. Furthermore, the 64th identification information may be information indicating support for data communication using the communication path of the user plane.

Furthermore, the UE may recognize that use of Header compression for control plane CIoT 5GS optimization has been accepted in a case that the 65th identification information is received. In this case, the 65th identification information may be information indicating support for Header compression for control plane CIoT 5GS optimization.

Furthermore, the UE may recognize that use of the V2X service has been accepted in a case that the 66th identification information is received. In this case, the 66th identification information may be information indicating support for the V2X service.

Furthermore, the UE may recognize that use of 5GMM-CONNECTED mode with RRC inactive indication has been accepted in a case that the 67th identification information is received. In this case, the 67th identification information is information indicating support for 5GMM-CONNECTED mode with RRC inactive indication.

Furthermore, in a case that the 68th identification information is received in addition to one or more pieces of identification information among the 62nd to 67th identification information, the UE may recognize that CIoT 5GS optimization and/or the V2X service are supported in the S-NSSAI included in the 68th identification information or may recognize that the use of the function has been accepted. Furthermore, the UE may store the S-NSSAI included in the 68th identification information as S-NSSAI supporting a CIoT 5GS optimization and/or a V2X service or as S-NSSAI for which the use of the function has been accepted. Furthermore, the UE may store the one or more pieces of the received 62nd to 67th identification information in association with the S-NSSAI included in the 68th identification information.

Furthermore, in a case that one or more pieces of identification information among the 62nd to the 67th identification information have been received for each piece of S-NSSAI included in the 68th identification information, the UE may recognize that CIoT 5GS optimization and/or the V2X service are supported for each piece of S-NSSAI and/or NSI, or may recognize that the use of the function has been accepted. Furthermore, the UE may store the S-NSSAI included in the 68th identification information as S-NSSAI supporting a CIoT 5GS optimization and/or a V2X service or as S-NSSAI for which the use of the function has been accepted. Furthermore, the UE may store the one or more pieces of the received 62nd to 67th identification information in association with the S-NSSAI included in the 68th identification information.

Furthermore, in a case that the UE retains information indicating S-NSSAI supporting CIoT 5GS optimization and/or V2X service, the UE may recognize that CIoT 5GS optimization and/or V2X service are supported in one or more pieces of S-NSSAI indicated by the retained information, or may recognize that the use of the function has been accepted. Furthermore, the UE may store one or more pieces of S-NSSAI indicated by the retained information as S-NSSAI supporting CIoT 5GS optimization and/or V2X service or as S-NSSAI for which the use of the function has been accepted. Furthermore, the UE may store the one or more pieces of identification information among the received 62nd to 67th identification information in association with the one or more pieces of S-NSSAI indicated by the retained information. Note that the information, held by the UE, for indicating the S-NSSAI supporting the CIoT 5GS optimization and/or the V2X service may be preconfigured information, may be information received from the network previously, or may be information created by the UE itself.

Furthermore, the UE may recognize that CIoT 5GS optimization and/or the V2X service are supported in all the pieces of S-NSSAI or may recognize that the use of the function has been accepted. Furthermore, the UE may store all the pieces of S-NSSAI as S-NSSAI supporting CIoT 5GS optimization and/or V2X service or as S-NSSAI for which the use of the function has been accepted. Furthermore, the UE may store one or more pieces of identification information among the received 62nd to 67th identification information in association all the pieces of S-NSSAI or may store them without association with the S-NSSAI.

Note that selection and determination of S-NSSAI for which use of CIoT 5GS optimization and/or V2X service is allowed may not be limited thereto. Furthermore, association of the S-NSSAI with the received identification information may not be limited to the above.

Furthermore, in a case that the UE retains information indicating a DNN in which a CIoT 5GS optimization and/or a V2X service are supported, the UE may recognize that CIoT 5GS optimization and/or V2X service are supported in one or more DNNs indicated by the retained information, or may recognize that the use of the function has been accepted. Furthermore, the UE may store one or more DNNs indicated by the retained information as DNNs in which a CIoT 5GS optimization and/or a V2X service are supported or as DNNs for which the use of the function has been accepted. Furthermore, the UE may store the one or more pieces of identification information among the received 62nd to 67th identification information in association with the one or more DNNs indicated by the retained information. Note that the information, held by the UE, for indicating the DNN in which the CIoT 5GS optimization and/or the V2X service are supported may be preconfigured information, may be information received from the network previously, or may be information created by the UE itself.

3.2.2. PDU Session Establishment Procedure

Next, an overview of the PDU session establishment procedure performed to establish a PDU session with the DN will be described using FIG. 9. The PDU session establishment procedure is a procedure in the 5GS. The present procedure will refer to a PDU session establishment procedure below. The PDU session establishment procedure is a procedure for each apparatus to establish a PDU session. Note that each apparatus can initiate the PDU session establishment procedure at any timing in a case that the registration procedure has been completed and each apparatus has become in the registered state. In addition, each apparatus may perform the PDU session establishment procedure during the registration procedure. Each apparatus may establish the PDU session based on completion of the PDU session establishment procedure. Furthermore, each apparatus can perform the PDU session establishment procedure a plurality of times to establish a plurality of PDU sessions.

Furthermore, the UE may initiate the PDU session establishment procedure to establish a PDU session in which control plane CIoT 5GS optimization is available in a case that control plane CIoT 5GS optimization is available. Furthermore, in a case that S-NSSAI for which the control plane CIoT 5GS optimization is available is held, the UE may initiate the PDU session establishment procedure to establish, with an NSI identified by the S-NSSAI, a PDU session in which control plane CIoT 5GS optimization is available.

Furthermore, the UE may initiate the PDU session establishment procedure to establish a PDU session in which user plane CIoT 5GS optimization is available in a case that user plane CIoT 5GS optimization is available. Furthermore, in a case that S-NSSAI for which user plane CIoT 5GS optimization is available is held, the UE may initiate the PDU session establishment procedure to establish, with an NSI identified by the S-NSSAI, a PDU session in which user plane CIoT 5GS optimization is available.

Furthermore, in a case that control plane CIoT 5GS optimization is available, and further user plane CIoT 5GS optimization and/or data communication using a communication path of the user plane are available, the UE may initiate the PDU session establishment procedure to establish a PDU session in which a procedure for establishing a user plane radio bearer can be performed. Note that the procedure for establishing the user plane radio bearer may be a service request procedure. Furthermore, in a case that S-NSSAI for which control plane CIoT 5GS optimization is available and further user plane CIoT 5GS optimization and/or data communication using the communication path of the user plane are available is held, the UE may initiate the PDU session establishment procedure to establish, with an NSI identified the S-NSSAI, a PDU session in which a procedure for establishing a user plane radio bearer can be performed. Note that the procedure for establishing the user plane radio bearer may be a service request procedure.

Furthermore, in a case that control plane CIoT 5GS optimization and/or Header compression for control plane CIoT 5GS optimization are available, the UE may initiate the PDU session establishment procedure to establish a PDU session in which a header compression function is available. Furthermore, in a case that S-NSSAI for which control plane CIoT 5GS optimization and/or Header compression for control plane CIoT 5GS optimization are available is held, the UE may initiate the PDU session establishment procedure to establish, with an NSI identified the S-NSSAI, a PDU session in which the header compression function is available.

First, the UE initiates the PDU session establishment procedure by transmitting a NAS message including the PDU session establishment request message to the SMF via the 5G AN (gNB) and the AMF (S900) (S902) (S904).

Specifically, the UE transmits the NAS message including the PDU session establishment request message to the AMF via the 5G AN (gNB) using the N1 interface (S900).

Here, the UE can include the 71st identification information and/or the 72nd identification information in the PDU session establishment request message and/or the NAS message and transmit them, and the UE may include the information in a control message different from the above messages, for example, a control message of a layer lower than the RRC layer (e.g., an MAC layer, an RLC layer, and a PDCP layer) and transmit them. The identification information may be included in these messages to indicate a request of the UE. In addition, two or more pieces of identification information of the above identification information may be configured as one or more pieces of identification information.

The UE may transmit the 71st identification information to indicate a request for establishment of a PDU session in which only control plane CIoT 5GS optimization is available. The UE may transmit the 72nd identification information to indicate a request for establishment of a PDU session associated with S-NSSAI.

Here, the UE may select appropriate S-NSSAI from the retained S-NSSAI and configure the information in the 72nd identification information. Specifically, in a case that the UE requests establishment of a PDU session in which CIoT 5GS optimization is available, the UE may select S-NSSAI supporting CIoT 5GS optimization and/or S-NSSAI for which the use of the function is accepted, and configure the information in the 72nd identification information. Furthermore, in a case that the UE requests the establishment of a PDU session in which the V2X service is available, the UE may select S-NSSAI supporting V2X service and/or S-NSSAI for which the use of the function has been accepted, and configure the information in the 72nd identification information. Note that selection of S-NSSAI may not be limited to the above.

In addition, the UE can include a DNN corresponding to the DN to which the UE requests a connection. In a case that the UE requests the establishment of a PDU session in which CIoT 5GS optimization is available, the UE may select a DNN in which a CIoT 5GS optimization is supported and/or a DNN for which the use of the function has been accepted, and may include the selected DNN.

In addition, the UE can generate and include a PDU session ID. In addition, the UE can include a request type indicating the purpose of establishing a PDU session. The request type includes an initial request, an existing PDU session, and an initial emergency request. The initial request is specified in a case that establishment of a new non-emergency PDU session is requested. The existing PDU session is specified in a case that handover of a non-emergency PDU session between a 3GPP access and a non-3GPP access or a transfer of a PDN connection from the EPS to the 5GS is performed. The initial emergency request is specified in a case that establishment of a new-emergency PDU session is requested.

In addition, the UE can specify a PDU session type indicating the type of a PDU session for which establishment is requested. As the PDU session type, any of IPv4, IPv6, IP, Ethernet, Unstructured, and the like can be specified as described above. In addition, the UE can include an SSC mode of a PDU session of which establishment is requested.

Furthermore, the UE may include configuration information of the header compression function (Header compression configuration IE) in the PDU session establishment request message in a case that control plane CIoT 5GS optimization and/or Header compression for control plane CIoT 5GS optimization are supported. More specifically, the UE may include the configuration information of the header compression function in the PDU session establishment request message in a case that the PDU session type is any of IPv4, IPv6, and IP, and further control plane CIoT 5GS optimization and/or Header compression for control plane CIoT 5GS optimization are supported.

In other words, the UE may include the configuration information of the header compression function in the PDU session establishment request message in a case that the PDU session type is configured to any of IPv4, IPv6, and IP, and further the support for control plane CIoT 5GS optimization and/or Header compression for control plane CIoT 5GS optimization is indicated in an attach request message and/or a tracking area update request message.

Furthermore, the UE may include the configuration information of the header compression function (Header compression configuration IE) in addition to the 72nd identification information in the PDU session establishment request message in a case that the UE and/or S-NSSAI indicated by the 72nd identification information support control plane CIoT 5GS optimization and/or Header compression for control plane CIoT 5GS optimization. More specifically, the UE may include the configuration information of the header compression function in addition to the 72nd identification information in the PDU session establishment request message in a case that the PDU session type is any of IPv4, IPv6, and IP, and further the UE and/or the S-NSSAI indicated by the 72nd identification information support control plane CIoT 5GS optimization and/or Header compression for control plane CIoT 5GS optimization.

In other words, the UE may include the configuration information of the header compression function in addition to the 72nd identification information in the PDU session establishment request message in a case that the PDU session type is configured to any of IPv4, IPv6, and IP, and further the UE and/or the S-NSSAI indicated by the 72nd identification information indicate the support for control plane CIoT 5GS optimization and/or Header compression for control plane CIoT 5GS optimization in an attach request message and/or a tracking area update request message.

Conversely, the UE may include the configuration information of the header compression function in the PDU session establishment request message in a case that the PDU session type is none of IPv4, IPv6, and IP, or in a case that the UE and/or the S-NSSAI indicated by the 72nd identification information do not support control plane CIoT 5GS optimization and/or Header compression for control plane CIoT 5GS optimization.

In a case that the NAS message including the PDU session establishment request message is received (S900), the AMF retrieves the PDU session establishment request message from the NAS message and selects the SMF as a transfer destination of the PDU session establishment request message (S902). Note that the AMF may select the SMF as a transfer destination based on each piece of identification information included in the PDU session establishment request message and/or the NAS message, and/or subscription information, and/or network capability information, and/or an operator policy, and/or a network status and/or user registration information, and/or a context held by the AMF, and the like.

The AMF transfers the PDU session establishment request message to the selected SMF via the N11 interface (S904).

In a case that the PDU session establishment request message is received (S904), the SMF recognizes the various types of identification information included in the PDU session establishment request message. Then, the SMF performs third condition determination. The third condition determination is to determine whether the SMF accepts the request of the UE. In the third condition determination, the SMF determines whether the third condition determination is true or false. The SMF initiates the procedure (A) of FIG. 9 in a case that the third condition determination is true, and initiates the procedure (B) of FIG. 9 in a case that the third condition determination is false.

Note that the third condition determination may be performed based on he the PDU session establishment request message and/or each piece of identification information included in the PDU session establishment request message and/or subscription information, and/or network capability information, and/or an operator policy, and/or a network status and/or user registration information, and/or a context held by the SMF, and the like. For example, the third condition determination may be true in a case that the network allows the request of the UE. In addition, the third condition determination may be false in a case that the network does not allow the request of the UE. Furthermore, the third condition determination may be true in a case that the network serving as a connection destination of the UE and/or an apparatus in the network supports a function requested by the UE, and third the first condition determination may be false in a case that the network and/or the apparatus does not support the function requested by the UE. Furthermore, in a case that the identification information to be transmitted and/or received is allowed, the third condition determination may be true, and in a case that the identification information to be transmitted and/or received is not allowed, the third condition determination may be false. Note that conditions for determining whether the third condition determination is true or false may not be limited to the above-described conditions.

Next, steps performed in a case that the third condition determination is true, in other words, each step of the procedure (A) of FIG. 9, will be described. The SMF selects the UPF serving as an establishment destination of the PDU session, transmits a session establishment request message to the selected UPF via the N4 interface (S906), and initiates the procedure (A) of FIG. 9.

Here, the SMF may select one or more UPFs based on each piece of identification information acquired based on the reception of the PDU session establishment request message, and/or the subscription information, and/or the network capability information, and/or the operator policy, and/or a network status, and/or user registration information, and/or a context held by the SMF, and the like. Note that in a case that a plurality of UPFs are selected, the SMF may transmit the session establishment request message to each UPF.

The UPF receives the session establishment request message from the SMF (S906) via the N4 interface and creates a context for the PDU session. Furthermore, the UPF transmits a session establishment response message to the SMF via the N4 interface according to the reception of the session establishment request message and/or the creation of the context for the PDU session (S908).

The SMF receives the session establishment response message from the UPF via the N4 interface as a response message to the session establishment request message (S908). The SMF may assign an address to be assigned to the UE based on the reception of the PDU session establishment request message and/or the selection of the UPF and/or the reception of the session establishment response message.

The SMF transmits a PDU session establishment accept message to the UE via the AMF based on the reception of the PDU session establishment request message, and/or the selection of the UPF and/or the reception of the session establishment response message, and/or the completion of the address assignment of the address to be assigned to the UE (S910) (S912).

Specifically, in a case that the SMF transmits the PDU session establishment accept message to the AMF through the N11 interface (S910), the AMF that has received the PDU session establishment request message transmits the NAS message including the PDU session establishment accept message to the UE through the N1 interface (S912). Note that the PDU session establishment accept message may be a NAS message and a response message to the PDU session establishment request. In addition, the PDU session establishment accept message can indicate that the PDU session establishment has been accepted.

Here, the SMF and the AMF may transmit the PDU session establishment accept message to indicate that the request of the UE made using the PDU session establishment request has been accepted.

The SMF and the AMF may include 81st identification information and/or 82nd identification information in the PDU session establishment accept message and transmit them. Note that the SMF and the AMF may indicate that the network supports each function or that the UE request has been accepted by transmitting the identification information. Furthermore, two or more pieces of identification information of the above identification information may be configured as one or more pieces of identification information. Note that the information indicating support for each function and information indicating a request for use of each function may be transmitted and/or received as the same identification information or may be transmitted and/or received as different identification information.

The SMF and AMF may transmit the 81st identification information to indicate the acceptance of the establishment of the PDU session in which only control plane CIoT 5GS optimization is available. The SMF and the AMF may transmit the 82nd identification information to indicate the acceptance of the establishment of the PDU session associated with S-NSSAI.

Here, the SMF and the AMF may select appropriate S-NSSAI from S-NSSAI indicated by the received 72nd identification information or retained S-NSSAI and configure the information in the 82nd identification information. Specifically, in a case that the establishment of the PDU session in which CIoT 5GS optimization is available is accepted, the SMF and the AMF may select S-NSSAI supporting CIoT 5GS optimization and/or S-NSSAI for which the use of the function has been accepted, and configure the information in the 82nd identification information. Furthermore, in a case that the establishment of the PDU session in which the V2X service is available is accepted, the SMF and the AMF may select S-NSSAI supporting V2X service and/or S-NSSAI for which the use of the function has been accepted, and configure the information in the 82nd identification information. Note that selection of S-NSSAI may not be limited to the above.

Note that the SMF and the AMF may select and determine whether to include the 81st identification information and/or the 82nd identification information in the PDU session establishment accept message based on each piece of the received identification information, and/or the subscription information, and/or the network capability information, and/or the operator policy, and/or a network status, and/or the user registration information, and/or a context held by the AMF, and the like.

Also, the SMF and the AMF can include a DNN corresponding to a DN that has allowed connection of the UE. In addition, the SMF and the AMF can include a selected and/or allowed PDU session ID.

In addition, the SMF and the AMF can specify a PDU session type indicating the type of a selected and/or allowed PDU session type. As the PDU session type, any of IPv4, IPv6, IP, Ethernet, Unstructured, and the like can be specified as described above. In addition, the SMF and the AMF can include an SSC mode of the selected and/or allowed PDU session.

Furthermore, in a case that the configuration information of the header compression function is included in the PDU session establishment request message, the SMF and/or the AMF may include the configuration information of the header compression function in the PDU session establishment accept message and transmit the information.

Furthermore, the SMF may include information indicating that a part of the request of the UE has been rejected in the PDU session establishment accept message and transmit the information, and indicate the cause of the rejection of the part of the request from the UE by transmitting the information indicating that the part of the request of the UE has been rejected. Furthermore, the UE may recognize the cause of the rejection of the part of the request from the UE by receiving the information indicating that the part of the request of the UE has been rejected. Note that the cause of the rejection may be information indicating that the content indicated by the identification information received by the SMF is not allowed.

In a case that the UE receives the NAS message including the PDU session establishment accept message from the AMF via the N1 interface (S912), the UE transmits a PDU session establishment complete message to the SMF via the AMF (S914) (S916). The UE can receive the PDU session establishment accept message to detect that the UE request made by the PDU session establishment request has been accepted.

Specifically, the UE transmits a PDU session establishment complete message to the AMF through the N1 interface (S914). In a case that the AMF receives the PDU session establishment complete message from the UE, the AMF transmits the PDU session establishment complete message to the SMF through the N11 interface (S916).

Note that the PDU session establishment complete message transmitted by the AMF to the SMF may be a response message to the PDU session establishment accept message transmitted from the SMF to the AMF in S910. Furthermore, the PDU session establishment complete message may be a NAS message. In addition, the PDU session establishment complete message needs to be a message indicating that the PDU session establishment procedure has been complete.

The SMF can perform second condition determination in a case that the PDU session establishment complete message is received from the AMF through the N11 interface (S916). The second condition determination is to determine a type of the message on the N4 interface to be transmitted and/or received. In a case that the second condition determination is true, in a case that the SMF transmits a session modification request message to the UPF through the N4 interface (S918), the SMF receives a session modification accept message transmitted from the UPF as a response message (S920). In a case that the second condition determination is false, in a case that the SMF transmits a session establishment request message to the UPF through the N4 interface (S918), the SMF receives a session modification accept message transmitted from the UPF as a response message (S920).

Note that the second condition determination may be performed based on whether the session on the N4 interface for the PDU session has been established. For example, in a case that the session on the N4 interface for the PDU session has been established, the second condition determination may be true, and in a case that the session on the N4 interface for the PDU session is not established, the second condition determination may be false. Conditions for determining true or false of the second condition determination need not be limited to the above-described conditions.

Each apparatus completes the procedure (A) in the PDU session establishment procedure based on the transmission and/or reception of the PDU session establishment complete message, and/or the transmission and/or reception of the session modification response message, and/or the transmission and/or reception of the session establishment response message. In a case that the procedure (A) in the present procedure is completed, the UE is in a state in which the PDU session for the DN is established.

Next, each step of the procedure (B) in the PDU session establishment procedure will be described. The SMF transmits a PDU session establishment reject message to the UE via the AMF (S922) (S924). Specifically, the SMF transmits a PDU session establishment reject message to the AMF through the N11 interface (S922). Specifically, in a case that the AMF receives the PDU session establishment request message from the SMF using the N11 interface (S922), the AMF transmits the PDU session establishment reject message to the UE using the N1 interface (S924).

Note that the PDU session establishment reject message may be a NAS message. In addition, the PDU session establishment reject message needs to be a message indicating that the PDU session establishment has been rejected.

Here, the SMF may indicate that the request of the UE made by the PDU session establishment request has been rejected by transmitting the PDU session establishment reject message. Furthermore, the SMF may transmit information indicating the cause of rejection in the PDU session establishment reject message, or may indicate the cause of rejection by transmitting the rejection cause. Furthermore, the UE may recognize the cause of the rejection of the request from the UE by receiving the information indicating that the request of the UE has been rejected. Note that the cause of the rejection may be information indicating that the content indicated by the identification information received by the SMF is not allowed.

The UE can receive the PDU session establishment reject message to recognize that the request of the UE made using the PDU session establishment request has been rejected and recognize the content of various kinds of identification information included in the PDU session establishment reject message.

Figure 9:
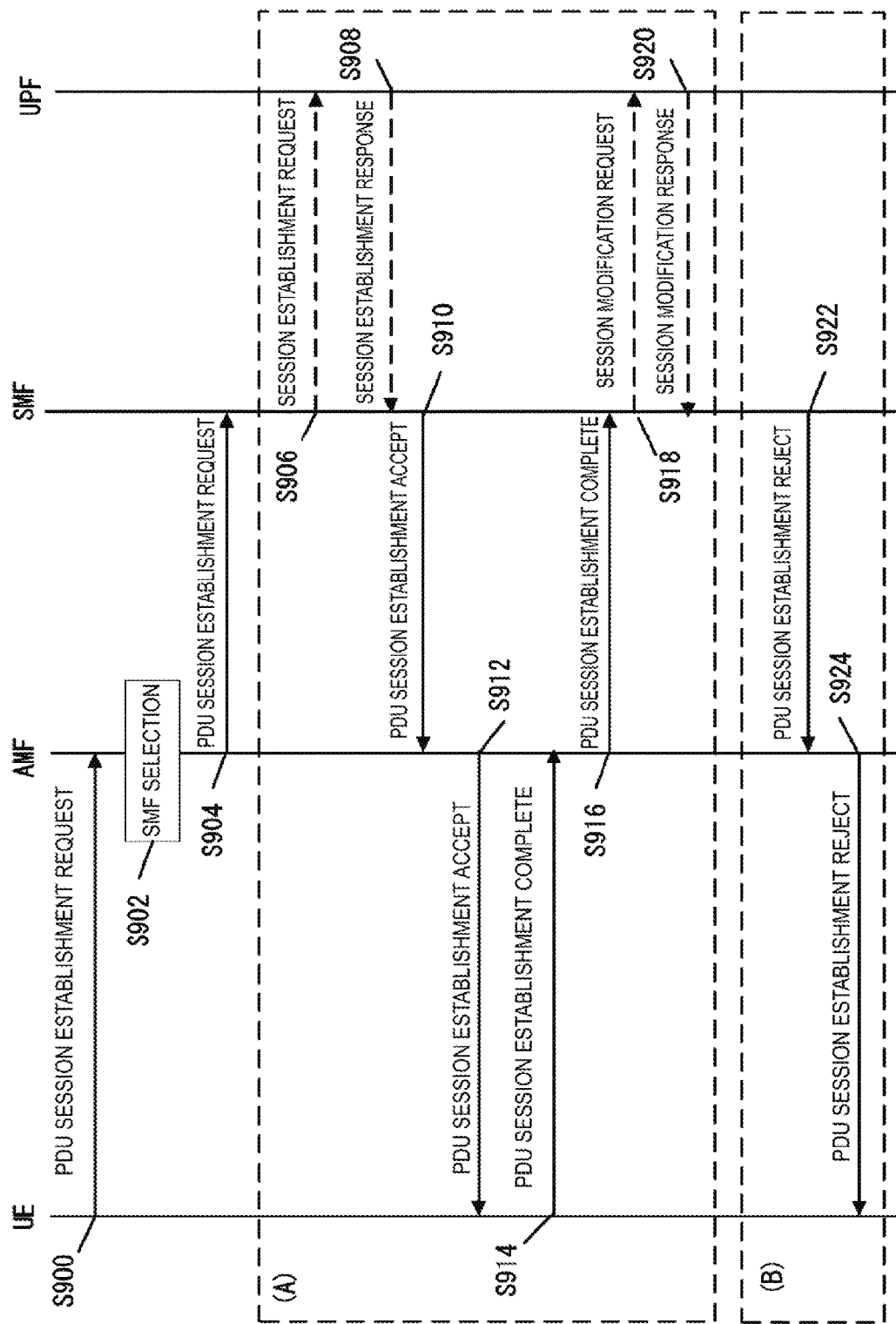
FIG. 9 is a diagram illustrating a PDU session establishment procedure in the 5GS.

Each apparatus completes the PDU session establishment procedure based on completion of the procedure (A) or (B) of FIG. 9. Note that, based on the completion of the procedure (A) of FIG. 9, each apparatus may transition to a state in which the PDU session is established, may recognize that the PDU session establishment procedure has been rejected based on the completion of the procedure (B) of FIG. 9, and may transition to a state in which the PDU session is not established, In addition, the procedure (A) of FIG. 9 is completed, and the UE can communicate with the DN by using the established PDU session.

Furthermore, each apparatus may perform processing based on information transmitted and/or received in the PDU session establishment procedure according to the completion of the PDU session establishment procedure. For example, in a case that the UE transmits and/or receives the information indicating the part of the request of the UE has been rejected, the UE may recognize the cause of rejection of the request from the UE. In addition, each apparatus may perform the present procedure again, based on the cause of the rejection of the request from the UE, or may perform the PDU session establishment procedure for another cell.

Furthermore, based on the completion of the PDU session establishment procedure, the UE may store identification information received together with the PDU session establishment accept message and/or the PDU session establishment reject message, and may recognize the determination of the network.

For example, in a case that the 81st identification information is received, the UE may recognize that the establishment of the PDU session in which control plane CIoT 5GS optimization is available has been accepted. Furthermore, in a case that the 82nd identification information is received, the UE may recognize that the establishment of the PDU session associated with the S-NSSAI has been accepted.

Here, in a case that the S-NSSAI indicated by the 82nd identification information is S-NSSAI supporting CIoT 5GS optimization and/or S-NSSAI for which the use of the function has been accepted, the UE may recognize that the establishment of the PDU session in which CIoT 5GS optimization is available has been accepted. Furthermore, in a case that the S-NSSAI indicated by the 82nd identification information is S-NSSAI supporting V2X service and/or S-NSSAI for which the use of the function has been accepted, the UE may recognize that the establishment of the PDU session in which V2X service is available for use has been accepted.

In addition, in a case that the 82nd identification information indicating S-NSSAI that is different from the S-NSSAI indicated by the 72nd identification information is received, the UE may transmit a PDU session establishment request message not including the 71st identification information to the network, and may transmit the PDU session establishment request message including the 72nd identification information indicating the S-NSSAI that is different from the S-NSSAI indicated by the received 82nd identification information to the network.

Furthermore, in a case that the PDU session establishment reject message is received in response to the PDU session establishment request message including the 71st identification information, the UE may recognize that the establishment of the PDU session in which only control plane CIoT 5GS optimization is available has been rejected and is disabled.

Furthermore, in a case that the PDU session establishment reject message is received as a response to the PDU session establishment request message including the 72nd identification information, the UE may recognize that the establishment of the PDU session associated with the S-NSSAI indicated by the 72nd identification information has been rejected and disabled.

Furthermore, in a case that the S-NSSAI indicated by the transmitted 72nd identification information is stored as S-NSSAI supporting CIoT 5GS optimization and/or S-NSSAI for which the use of the function has been accepted, the UE may delete capability information for CIoT 5GS optimization stored in association with the S-NSSAI, or may delete the information on the association of the S-NSSAI with CIoT 5GS optimization. Furthermore, the UE may store the S-NSSAI indicated by the transmitted 72nd identification information as S-NSSAI supporting the CIoT 5GS optimization and/or S-NSSAI for which the use of the function has been accepted.

Further, in a case that the S-NSSAI indicated by the transmitted 72nd identification information is stored as S-NSSAI supporting V2X service and/or S-NSSAI for which the use of the function has been accepted, the UE may delete the capability information for the V2X service stored in association with the S-NSSAI, or may delete information on the association of the S-NSSAI with the V2X service. Furthermore, the UE may store the S-NSSAI indicated by the transmitted 72nd identification information as S-NSSAI supporting no V2X service and/or S-NSSAI for which the use of the function has not been accepted.

In addition, in a case that the PDU session establishment reject message is received, the UE may transmit a PDU session establishment request message not including the 71st identification information to the network, and may transmit the PDU session establishment request message including the 72nd identification information indicating S-NSSAI that is different from the S-NSSAI indicated by the previously transmitted 72nd identification information to the network.

Furthermore, in a case that the UE establishes a PDU session in which a procedure for establishing a user plane radio bearer is executable, the UE may initiate a service request procedure to establish the user plane radio bearer of the PDU session.

3.2.3. Attach Procedure

Figure 10:
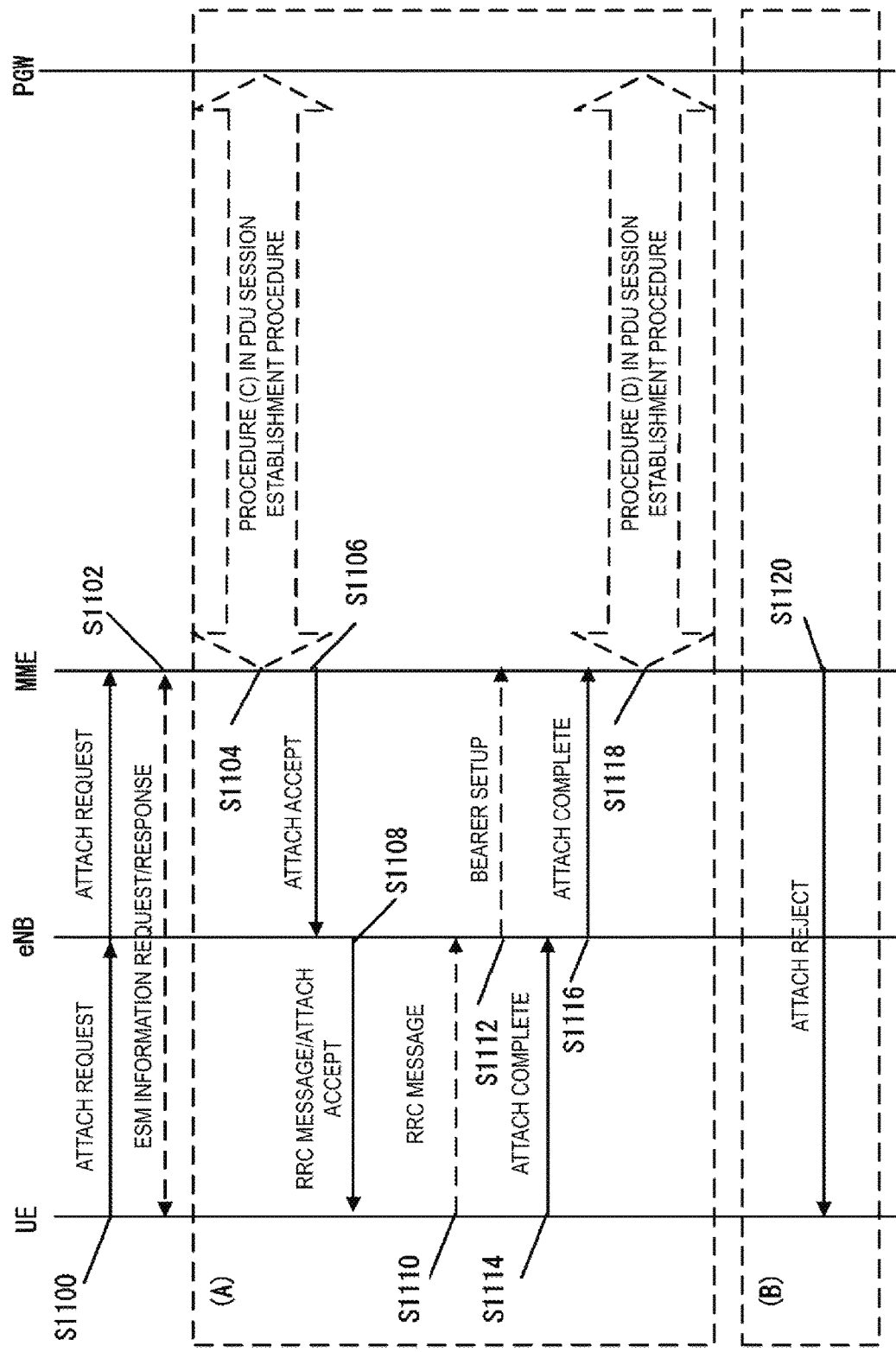
FIG. 10 is a diagram illustrating an attach procedure in the EPS.

First, the Attach procedure will be described with reference to FIG. 10. The attach procedure is a procedure in the EPS. The present procedure hereinafter refers to an attach procedure. The present procedure is a procedure for the UE to be registered in the core network_A. Each step of the present procedure will be described below.

First, the UE transmits an attach request message to the MME through the eNB (S1100) and initiates the attach procedure. The UE may include a PDN connectivity request message in an attach request message and transmit the message or may request to perform a PDN connectivity procedure during the attach procedure by including the PDN connectivity request message.

Here, the UE may include at least one or more pieces of identification information among the first to sixth identification information in the attach request message. Note that, by transmitting the identification information, the UE may indicate that the UE supports each function and may indicate a request of the UE. Furthermore, two or more pieces of identification information of the above identification information may be configured as one or more pieces of identification information. Note that the information indicating support for each function and information indicating a request for use of each function may be transmitted and/or received with the same identification information or may be transmitted and/or received as different identification information.

The UE may transmit the first identification information and/or the second identification information to indicate a request for use of control plane CIoT EPS optimization. In this case, the first identification information may be information indicating control plane CIoT EPS optimization. Furthermore, the second identification information may be information indicating support for control plane CIoT EPS optimization.

Furthermore, the UE may transmit the first identification information and/or the third identification information and/or the fourth identification information to indicate a request for use of user plane CIoT EPS optimization. In this case, the first identification information may be information indicating user plane CIoT EPS optimization. Furthermore, the third identification information may be information indicating support for user plane CIoT EPS optimization.

Furthermore, the fourth identification information may be information indicating support for data communication using the communication path of the user plane.

Furthermore, the UE may transmit the fifth identification information to indicate a request for use of Header compression for control plane CIoT EPS optimization. In this case, the fifth identification information may be information indicating support for Header compression for control plane CIoT EPS optimization.

Furthermore, the UE may transmit the sixth identification information to indicate a request for use of the V2X service. In this case, the sixth identification information may be information indicating support for the V2X service.

Note that the UE may include the identification information in a control message (e.g., an ESM information request/response message, or the like) different from an attach request message and transmit the information (S1102).

The MME receives the attach request message and/or the control message different from the attach request message, and performs the first condition determination. The MME initiates the procedure (A) in the present procedure in a case that the first condition is true, and initiates the procedure (B) in the present procedure in a case that the first condition is false.

Note that the first condition determination may be performed based on the reception of the attach request message and/or each piece of identification information included in the attach request message, and/or subscription information, and/or network capability information and/or an operator policy and/or a network status and/or user registration information and/or a context held by the MME, and the like. For example, in a case that the network allows the request from the UE, the first condition determination is true, and in a case that the network does not allow the request from the UE, the first condition determination may be false. In addition, the first condition determination may be true in a case that the network serving as a registration destination of the UE and/or an apparatus in the network supports a function requested by the UE, and the first condition determination may be false in a case that the network and/or the apparatus does not support the function requested by the UE. Furthermore, in a case that the identification information to be transmitted and/or received is allowed, the first condition determination may be true, and in a case that the identification information to be transmitted and/or received is not allowed, the first condition determination may be false. Note that conditions for determining whether the first condition determination is true or false may not be limited to the above-described conditions.

Each step of the procedure (A) in the present procedure will be described below. The MME performs the fourth condition determination, and initiates the procedure (A) in the present procedure. In the fourth condition determination, the MME determines whether the fourth condition is true or false. The MME initiates a procedure (C) in a PDN connectivity procedure in a case that the fourth condition is true, and omits the procedure in a case that the fourth condition is false (S1104).

Note that, in a case that the MME performs the procedure (C) in the PDN connectivity procedure between the MME and the PGW (PGW-C) in S1104, the MME can notify the PGW (PGW-C) of the identification information received in the attach request message. The PGW (PGW-C) can acquire identification information received from the AMF.

Furthermore, the MME transmits an attach accept message to the eNB based on the reception of the attach request message and/or Create Session response message, and/or the completion of the procedure (C) in the PDN connectivity procedure (S1106). Note that, in a case that the MME receives a Create Session reject message, the MME may not continue the procedure (A) in the present procedure and may initiate the procedure (B) in the present procedure.

The eNB receives the attach accept message, and transmits an RRC message (e.g., which may be an RRC message such as an RRC Connection Reconfiguration message, an RRC Connection Setup message, or an RRC Direct Transfer message) and/or the attach accept message to the UE (S1108). Note that the attach accept message may be included in the RRC message and transmitted and/or received. In addition, in a case that the fourth condition is true, the MME may include the previously described PDN connectivity accept message in the attach accept message and transmit the message, or may indicate that the PDN connectivity procedure has been accepted by including a PDN connectivity accept message.

Here, the AMF may include at least one piece of identification information among the 12th to the 16th identification information in the attach accept message, and transmit it. Note that, by transmitting the identification information, the MME may indicate that the network supports each function, or may indicate that the request of the UE has been accepted. Furthermore, two or more pieces of identification information of the above identification information may be configured as one or more pieces of identification information. Note that the information indicating support for each function and information indicating a request for use of each function may be transmitted and/or received with the same identification information or may be transmitted and/or received as different identification information.

The MME may indicate acceptance of the use of control plane CIoT EPS optimization by transmitting the 12th identification information. In this case, the 12th identification information may be information indicating support for control plane CIoT EPS optimization.

Furthermore, the MME may indicate acceptance of use of user plane CIoT EPS optimization by transmitting the 13th identification information and/or the 14th identification information. In this case, the 13th identification information may be information indicating support for user plane CIoT EPS optimization. Furthermore, the 14th identification information may be information indicating support for data communication using the communication path of the user plane.

Furthermore, the MME may indicate acceptance of use of Header compression for control plane CIoT EPS optimization by transmitting the 15th identification information. In this case, the 15th identification information may be information indicating support for Header compression for control plane CIoT EPS optimization.

Furthermore, the MME may indicate acceptance of use of the V2X service by transmitting the 16th identification information. In this case, the 16th identification information may be information indicating support for the V2X service.

Note that the MME may select or determine which identification information among the 12th to the 16th identification information is to be included in the attach accept message based on each piece of received identification information and/or subscription information and/or network capability information and/or an operator policy, and/or a network status, and/or user attach information and/or a context held by the MME, and the like.

Furthermore, the MME may indicate that the request of the UE notified using the attach request message has been accepted by transmitting the attach accept message. Furthermore, the MME may include information indicating that a part of the request of the UE has been rejected in the attach accept message and transmit the information, and indicate the cause of the rejection of the part of the request from the UE by transmitting the information indicating that the part of the request of the UE has been rejected. Furthermore, the UE may recognize the cause of the rejection of the part of the request from the UE by receiving the information indicating that the part of the request of the UE has been rejected. Note that the cause of rejection may be information indicating that the content indicated by the identification information received by the MME is not allowed.

Here, the fourth condition determination is intended by the MME to determine whether to perform the PDN connectivity procedure. The fourth condition being true may correspond to a case in which a PDN connectivity request message is received, or to a case in which the PDN connectivity procedure is also performed in the present procedure. In addition, the fourth condition being false may correspond to a case in which a PDN connectivity request message has not been received, a case in which the PDN connectivity procedure is not performed in the present procedure, or a case in which the fourth condition is not determined to be true.

Then, in a case that the UE receives the RRC message from the eNB, the UE transmits an RRC connection message (e.g., which may be an RRC message such as an RRC Connection Reconfiguration Complete message, an RRC Connection Setup Complete message, and an RRC Direct Transfer message) to the eNB (S1110). The eNB receives the RRC message and transmits a bearer configuration message to the MME (S1112). Then, the MME receives the bearer configuration message.

In a case that the UE receives the attach accept message, the UE transmits an attach complete message to the MME through the eNB (S1114) (S1116). The MME further receives the attach complete message.

Note that the UE can detect that the request of the UE notified in the attach request message has been accepted by receiving the attach accept message.

Furthermore, in a case that the fourth condition is true, the MME performs the second condition determination. The second condition determination is intended to determine whether the MME needs to request modification of a bearer to the SGW. In a case that the second condition is true, the MME initiates and performs a procedure (D) in the PDN connectivity procedure (S1118). Each apparatus completes the procedure (A) in the present procedure based on transmission and/or reception of an attach complete message and/or completion of the procedure (D) in the PDN connectivity procedure.

Note that, in a case that the UE receives the PDN connectivity accept message, the UE may include the previously described PDN connectivity complete message in the attach complete message and transmit the message, or may indicate the PDN connectivity procedure has been completed by including the PDN connectivity complete message.

Next, each step of the procedure (B) in the present procedure will be described. The MME transmits an attach reject message to the UE through eNB and initiates the procedure (B) in the present procedure (S1120). Furthermore, the UE receives the attach reject message, and recognizes that the request of the UE has been rejected. Each apparatus completes the procedure (B) in the present procedure based on transmission and/or reception of the attach reject message. Note that, if the fourth condition is true, the MME may include the previously described PDN connectivity reject message in the attach reject message and transmit the message, or may indicate that the PDN connectivity procedure has been rejected by including the PDN connectivity reject message. In that case, the UE may further receive the PDN connectivity reject message, or may authenticate that the PDN connectivity procedure has been rejected.

Note, the MME may indicate that the request of the UE notified using the attach request message has been rejected by transmitting the attach reject message. Furthermore, the MME may include information indicating the cause of rejection in the attach reject message and transmit the information, or may indicate the cause of rejection by transmitting the rejection cause. Furthermore, the UE may recognize the cause of the rejection of the request from the UE by receiving the information indicating that the request of the UE has been rejected. Note that the cause of rejection may be information indicating that the content indicated by the identification information received by the MME is not allowed.

Each apparatus completes the present procedure based on the completion of the procedure (A) or (B) in the present procedure. Note that that each apparatus may transition to a state in which the UE is connected to the network and/or a registered state, based on the completion of the procedure (A) in the present procedure, and may recognize that the present procedure has been rejected and transition to a state in which each apparatus cannot be connected to the network based on the completion of the procedure (B) in the present procedure. In addition, transition of each apparatus to each state may be performed based on the completion of the present procedure or based on the establishment of the PDU session.

Furthermore, each apparatus may perform processing based on the identification information transmitted and/or received in the present procedure according to the completion of the present procedure. For example, in a case that the UE transmits and/or receives the information indicating the part of the request of the UE has been rejected, the UE may recognize the cause of rejection of the request from the UE. In addition, based on the cause of the rejection of the request from the UE, each apparatus may perform the present procedure again, and may perform an attach procedure for the core network_A or another cell.

Furthermore, based on the completion of the attach procedure, the UE may store the identification information received along with the attach accept message and/or the attach reject message, and may recognize the determination of the network.

For example, the UE may recognize that the use of control plane CIoT EPS optimization has been accepted in a case that the 12th identification information is received. In this case, the 12th identification information may be information indicating support for control plane CIoT EPS optimization.

Further, the UE may recognize that use of user plane CIoT EPS optimization has been accepted in a case that the 13th identification information and/or the 14th identification information are received. In this case, the 13th identification information may be information indicating support for user plane CIoT EPS optimization. Furthermore, the 14th identification information may be information indicating support for data communication using the communication path of the user plane.

Furthermore, the UE may recognize that use of Header compression for control plane CIoT EPS optimization has been accepted in a case that the 15th identification information is received. In this case, the 15th identification information may be information indicating support for Header compression for control plane CIoT EPS optimization.

Furthermore, the UE may recognize that use of the V2X service has been accepted in a case that the 16th identification information is received. In this case, the 16th identification information may be information indicating support for the V2X service.

3.2.4. Tracking Area Update Procedure Next, an overview of a tracking area update procedure will be described. The present procedure hereinafter refers to the tracking area update procedure. The present procedure is a procedure to update location registration information of the UE in the network (the access network, and/or the core network_A), and/or for the UE to regularly notify the network of a state of the UE, and/or to update particular parameters related to the UE on the network. In an established PDN connection, the UE can perform the present procedure at any timing. The tracking area update procedure can be performed in a case that the UE is in a 31st state. In addition, the UE can periodically perform the present procedure. Note that the UE may initiate the present procedure based on a transition to the 31st state, or may initiate the procedure based on a movement of the UE.

Note that an order of the tracking area update procedure may be similar to that of the attach procedure. Thus, only differences between the tracking area procedure and the attach procedure will be described here.

In the procedure of the tracking area update procedure, a control message transmitted and/or received in the attach procedure can be replaced with a control message for the tracking area update procedure. For example, the attach request message transmitted and/or received in the attach procedure may be replaced with a Tracking Area Update request message, and the attach accept message may be replaced with a Tracking Area Update accept message.

Furthermore, the attach reject message may be replaced with a Tracking Area Update reject message, and the attach complete message may be replaced with a Tracking Area Update complete message.

Furthermore, the identification information included in the control message and transmitted and/or received during the attach procedure may be included in the control message in the tracking area update procedure and transmitted and/or received. Furthermore, a behavior of each apparatus performed based on the reception of the control message during the attach procedure and/or the reception of the identification information included in the control message during the attach procedure may be performed based on reception of the control message during the tracking area update procedure and/or reception of identification information included in the control message during the tracking area update procedure. Furthermore, a behavior of each apparatus performed based on the completion of the attach procedure may be performed based on completion of the tracking area update procedure.

3.2.5. PDN Connectivity Procedure

Figure 11:
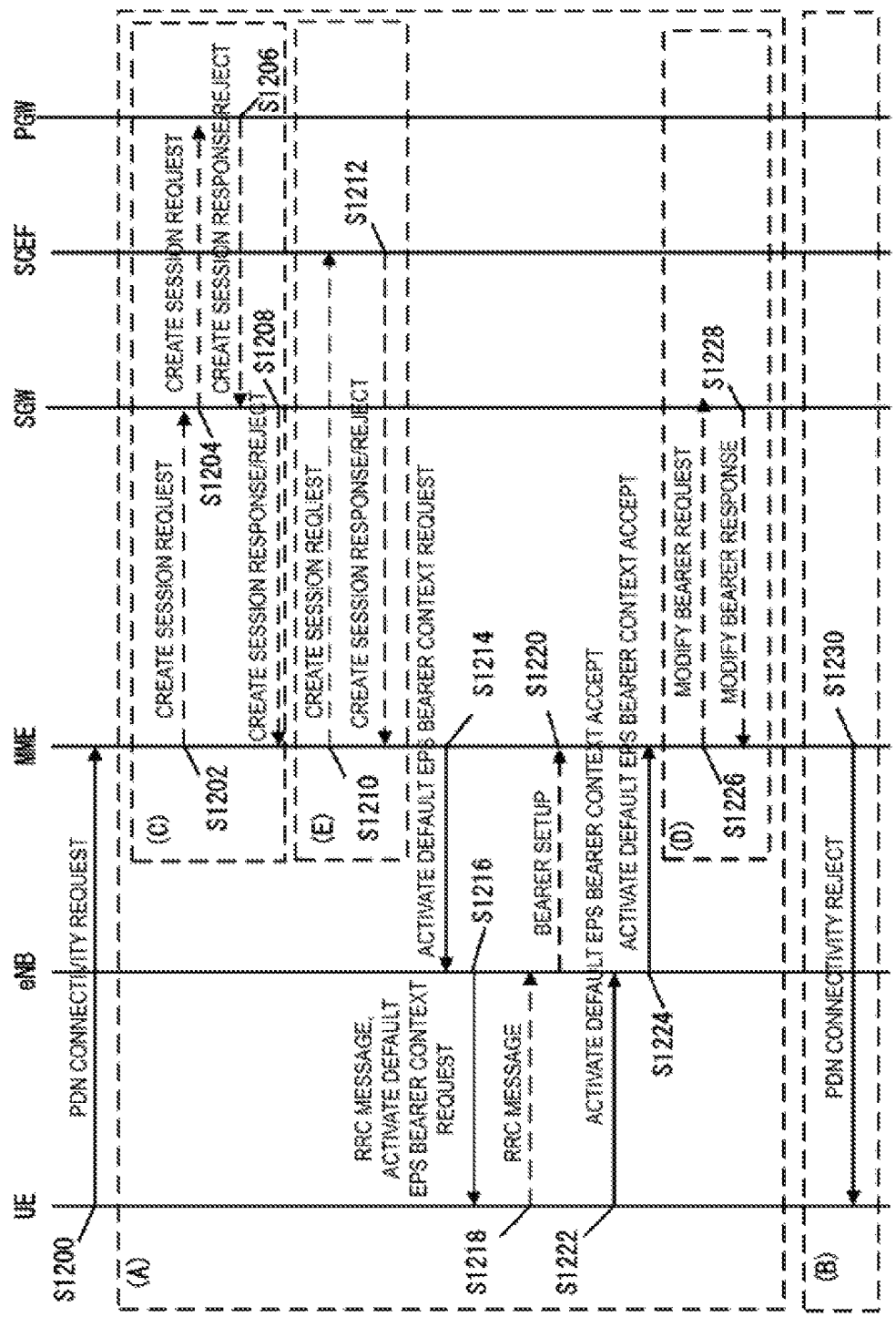
FIG. 11 is a diagram illustrating a PDN connectivity procedure in the EPS.

First, the PDN connectivity procedure will be described with reference to FIG. 11. The attach procedure is a procedure in the EPS. The present procedure hereinafter refers to the PDN connectivity procedure. The present procedure is a procedure for each apparatus to establish a PDN connection. Note that each apparatus may perform the present procedure in a state of the completed the attach procedure, or may perform the present procedure during the attach procedure. In addition, each apparatus may initiate the present procedure at any timing after the attach procedure. In addition, each apparatus may establish a PDN connection based on completion of the PDN connectivity procedure. Furthermore, each apparatus may perform the present procedure a plurality of times to establish a plurality of PDN connections.

Furthermore, in a case that control plane CIoT EPS optimization is available, the UE may initiate the PDN connectivity procedure in order to establish a PDN connection in which control plane CIoT EPS optimization is available.

Furthermore, in a case that user plane CIoT EPS optimization is available, the UE may initiate the PDN connectivity procedure in order to establish a PDN connection in which user plane CIoT EPS optimization is available.

In addition, in a case that control plane CIoT EPS optimization is available and further user plane CIoT EPS optimization and/or data communication using a communication path of the user plane is available, the UE may initiate the PDN connectivity procedure to establish a PDN connection in which a procedure for establishing a user plane radio bearer can be performed. Note that the procedure for establishing the user plane radio bearer may be a service request procedure.

Furthermore, the UE may initiate the PDN Connectivity procedure to establish a PDN connection in which the header compression function is available in a case that control plane CIoT EPS optimization and/or Header compression for control plane CIoT 5GS optimization are available.

First, the UE transmits a PDN connectivity request message to the MME via the eNB (S1200) to initiate the PDN connectivity procedure. Note that the PDN connectivity request message is not limited to the above, and needs to be a message for requesting establishment of a PDN connection.

Here, the UE may include the 21st identification information in the PDN connectivity request message. The UE may indicate the request of the UE by including the identification information in the PDN connectivity request message.

The UE may transmit the 21st identification information to indicate the request for establishment of a PDN connection in which only control plane CIoT EPS optimization is available.

In addition, the UE can include an APN corresponding to the PDN to which the UE requests a connection. In addition, the UE can include a request type indicating the purpose of establishing the PDN connection. The request type includes an initial request, a handover, and an emergency. The initial request is specified in a case that establishment of a new non-emergency PDN connection is requested. The Handover request is specified in a case that a handover of the non-emergency PDN connection between a 3GPP access and a non-3GPP access or a transfer of a PDU session from the 5GS to the EPS is performed. The emergency request is specified in a case that establishment of an emergency PDN connection is requested.

In addition, the UE can specify a PDN type indicating the type of a PDN connection for which establishment is requested. As described above, any of IPv4, IPv6, IPv4v6, and non-IP can be specified as a PDN type.

Furthermore, the UE may include configuration information of the header compression function (Header compression configuration IE) in the PDN connectivity request message in a case that control plane CIoT EPS optimization and/or Header compression for control plane CIoT EPS optimization are supported. More specifically, the UE may include the configuration information of the header compression function in the PDN connectivity request message in a case that the PDN type is any of IPv4, IPv6, and Iv4v6, and further control plane CIoT EPS optimization and/or Header compression for control plane CIoT EPS optimization are supported.

In other words, the UE may include the configuration information of the header compression function in the PDN connectivity request message in a case that the PDN type is configured to any of IPv4, IPv6, and IPv4v6, and further the support for control plane CIoT EPS optimization and/or Header compression for control plane CIoT EPS optimization is indicated in an attach request message and/or a tracking area update request message.

Conversely, the UE may not include the configuration information of the header compression function in the PDN connectivity request message in a case that the PDN type is none of IPv4, IPv6, and IPv4v6, and further control plane CIoT EPS optimization and/or Header compression for control plane CIoT EPS optimization are not supported.

The MME receives the PDN connectivity request message, and performs the first condition determination. The first condition determination is intended to determine whether the MME accepts the request of the UE. In the first condition determination, the MME determines whether the first condition is true or false. The MME initiates the procedure (A) in the present procedure in a case that the first condition is true, and initiates the procedure (B) in the present procedure in a case that the first condition is false. Note that steps in the case in which the first condition is false will be described later.

Note that the first condition determination may be performed based on reception of the PDN connectivity request message and/or each piece of identification information included in the PDN connectivity request message, and/or subscription information, and/or network capability information and/or an operator policy and/or a network status and/or user registration information and/or a context held by the SMF, and the like. For example, in a case that the network allows the request from the UE, the first condition determination is true, and in a case that the network does not allow the request from the UE, the first condition determination may be false. In addition, the first condition determination may be true in a case that the network serving as a registration destination of the UE and/or an apparatus in the network supports a function requested by the UE, and the first condition determination may be false in a case that the network and/or the apparatus does not support the function requested by the UE.

Furthermore, in a case that the identification information to be transmitted and/or received is allowed, the first condition determination may be true, and in a case that the identification information to be transmitted and/or received is not allowed, the first condition determination may be false. Note that conditions for determining whether the first condition determination is true or false may not be limited to the above-described conditions.

Steps performed in a case that the first condition is true, i.e., each step of the procedure (A) in the present procedure, will be described below. The MME performs the procedure (C) or (E) in the present procedure, and initiates the procedure (A) in the present procedure. In a case that the PGW is selected as an external gateway, the MME may perform the procedure (C) in the present procedure and initiate the procedure (A) in the present procedure, and in a case that the SCEF is selected as an external gateway, the MME may perform the procedure (E) in the present procedure and initiate the procedure (A) in the present procedure. First, each step of the procedure (C) in the present procedure will be described. The MME transmits a Create Session request message to the SGW and initiates the procedure (C) in the present procedure (S1202). Further, the SGW that has received the Create Session request message transmits the Create Session request message to the PGW (S1204).

Here, the MME and the SGW may include the 21st identification information in the Create Session request message (S1202) (S1204) and transfer the request of the UE made by the PDN connectivity request message to the PGW (PGW-C) by including the above identification information.

Then, the PGW receives the Create Session request message and performs third condition determination. Note that the third condition determination is intended to determine whether the PGW accepts the request of the UE. The third condition being true may correspond to a case in which the request of the UE is accepted and a case in which the request of the UE is allowed. In addition, the third condition being false may correspond to a case in which the request of the UE is rejected and a case in which the third condition is not determined to be true.

In addition, the third condition determination may be performed by another apparatus (e.g., a PCRF) rather than the PGW. In that case, the PGW performs an IP-CAN session establishment procedure with the PCRF. More specifically, the PGW transmits a request message to the PCRF in an IP-CAN session establishment procedure. Furthermore, the PCRF receives the request message in the IP-CAN session establishment procedure, determines the third condition, and transmits a response message to the PGW in the IP-CAN session establishment procedure. Furthermore, the PGW receives the response message in the IP-CAN session establishment procedure and recognizes the result of the third condition determination.

Note that, in a case that the PCRF has performed the third condition determination, the PGW may perform the third condition determination based on the result of the third condition determination received from the PCRF. For example, in a case that the PCRF accepts the request of the UE, the PCRF and the PGW may regard the third condition as true, and in a case that the PCRF rejects the request of the UE, the PCRF and the PGW may regard the third condition as false.

In the third condition determination, the PGW determines whether the third condition is true or false. In a case that the third condition is true, the PGW transmits a Create Session response message to the SGW (S1206).

Further, the SGW that has received the Create Session response message transmits the Create Session response message the MME (S1208). Then, the MME receives the Create Session response message.

In addition, the PGW and the SGW may transmit the Create Session response message to indicate that the request of the UE has been allowed.

In addition, in a case that the third condition is false, the PGW transmits a Create Session reject message to the SGW (S1206). Further, the SGW that has received the Create Session reject message transmits the Create Session reject message to the MME (S1208). Note that the Create Session reject message may be a Create Session response message including the cause of rejection (Reject cause).

In addition, the PGW may transmit the Create Session reject message to indicate that the request of the UE has been rejected.

Each apparatus completes the procedure (C) in the present procedure based on transmission and/or reception of the Create Session response message and/or the Create Session reject message.

Next, each step of the procedure (E) in the present procedure will be described. The MME transmits a Create Session request message to the SCEF and initiates the procedure (E) in the present procedure (S1210).

Here, the MME may transmit the Create Session request message to transfer the request of the UE made using the PDN connectivity request message.

In addition, the SCEF receives the Create Session request message and performs the fourth condition determination. Note that the fourth condition determination is intended to determine whether the SCEF accepts the request of the UE. The fourth condition being true may correspond to a case in which the request of the UE is accepted and a case in which the request of the UE is allowed. In addition, the fourth condition being false may correspond to a case in which the request of the UE is rejected and a case in which the fourth condition is not determined to be true.

In the fourth condition determination, the SCEF determines whether the fourth condition is true or false. In a case that the fourth condition is true, the SCEF transmits a Create Session response message to the MME (S1212). Then, the MME receives the Create Session response message.

In addition, the SCEF may transmit the Create Session response message to indicate that the request of the UE has been allowed.

In addition, in a case that the fourth condition is false, the SCEF transmits a Create Session reject message to the MME (S1212). Note that the Create Session reject message may be a Create Session response message including the cause of rejection (Reject cause).

In addition, the SCEF may transmit the Create Session reject message to indicate that the request of the UE has been rejected.

Each apparatus completes the procedure (E) in the present procedure based on the transmission and/or reception of the Create Session response message and/or the Create Session reject message.

The MME transmits a PDN connectivity accept message to the eNB (S1214) based on the reception of the Create Session response message and/or the completion of the procedure (C) or (E) in the present procedure. Note that, in a case that the MME receives a Create Session reject message, the MME may not continue the procedure (A) in the present procedure and may initiate the procedure (B) in the present procedure. In addition, the PDN connectivity accept message may be an Activate default EPS bearer context request message. In addition, the PDN connectivity accept message needs to be a response message to the PDN connectivity request message but is not limited to this, and needs to be a message to accept the PDN connectivity request message.

Here, the MME may include the 31st identification information in the PDN connectivity accept message, or may indicate that the request of the UE made using the PDN connectivity request message has been accepted by including the identification information. Note that, by transmitting the identification information, the MME and/or the PGW may indicate that the network supports each function, and may indicate that the request of the UE has been accepted. Furthermore, the information indicating support for each function and information indicating a request for use of each function may be transmitted and/or received with the same identification information or may be transmitted and/or received as different identification information.

The eNB receives the PDN connectivity accept message and transmits an RRC message (e.g., which may be an RRC message such as an RRC Connection Reconfiguration message, an RRC Connection Setup message, an RRC Direct Transfer message, or the like) and/or the PDN connectivity accept message to the UE (S1216). Note that the PDN connectivity accept message may be included in the RRC message and transmitted and/or received.

The MME and/or the PGW may transmit the 31st identification information to indicate the acceptance of the establishment of the PDN connection in which only control plane CIoT EPS optimization is available.

Note that the MME and/or the PGW may select and determine whether the 31st identification information is to be included in the PDN connectivity accept message based on each piece of the received identification information, and/or subscription information and/or network capability information and/or the operator policy, and/or a network state, and/or user registration information and/or a context held by the AMF, and the like.

In addition, the MME and/or the PGW can include an APN corresponding to the PDN that allows connection of the UE. In addition, the MME and/or the PGW can include a selected and/or allowed EPS bearer ID.

In addition, the MME and/or the PGW can specify a PDN type indicating the type of the selected and/or allowed PDN connection. As described above, any of IPv4, IPv6, IPv4v6, and non-IP can be specified as a PDN type.

Furthermore, in a case that the configuration information of the header compression function is included in the PDN connectivity request message, the MME and/or the PGW may include the configuration information of the header compression function in the PDN connectivity accept message and transmit the information.

Furthermore, the MME may include information indicating that a part of the request of the UE has been rejected in the PDN connectivity accept message and transmit the information, and indicate the cause of rejection of the part of the request from the UE by transmitting the information indicating that the part of the request of the UE has been rejected. Furthermore, the UE may recognize the cause of the rejection of the part of the request of the UE by receiving the information indicating that the part of the request of the UE has been rejected. Note that the cause of the rejection may be information indicating that the content indicated by the identification information received by the MME and/or the PGW-C is not allowed.

In a case that the RRC message is received, the UE transmits the RRC message (e.g., which may be an RRC message such as an RRC Connection Reconfiguration Complete message, an RRC Connection Setup Complete message, and an RRC Direct Transfer message) to the eNB (S1218). The eNB receives the RRC message and transmits a bearer configuration message to the MME (S1220). Then, the MME receives the bearer configuration message.

In a case that the PDN connectivity accept message is received, the UE transmits a PDN Connectivity complete message to the MME via the eNB (S1222) (S1224). Furthermore, the MME receives the PDN connectivity complete message and performs the second condition determination. Note that the PDN connectivity complete message may be an Activate default EPS bearer context accept message. In addition, the PDN connectivity complete message may be a response message to the PDN connectivity accept message, but is not limited to this, and may be a message indicating that the PDN connectivity procedure is completed.

The second condition determination is intended to determine whether the MME needs to request modification of a bearer with respect to the SGW. In a case that the second condition is true, the MME initiates the procedure (D) in the present procedure. In addition, in a case that the second condition determination is false, the MME does not perform the procedure (D) in the present procedure.

Each step of the procedure (D) in the present procedure will be described below. The MME transmits a modify bearer request message to the SGW (S1226) and initiates the procedure (D) in the present procedure. Further, the SGW receives a modify bearer request message, and transmits a modify bearer response message to the MME (S1228). In addition, the MME receives the modify bearer response message and completes the procedure (D) of the present procedure. Furthermore, each apparatus completes the procedure (A) in the present procedure based on transmission and/or reception of the PDN connectivity complete message in a case that the second condition determination is false, or based on completion of the procedure (D) in the present procedure in a case that the second condition determination is true.

Next, each step of the procedure (B) in the present procedure will be described. The MME transmits a PDN connectivity reject message to the UE through eNB (S1230) and initiates the procedure (B) in the present procedure. In addition, the UE receives the PDN connectivity reject message and recognizes that the request of the UE has been rejected. Each apparatus completes the procedure (B) in the present procedure based on transmission and/or reception of the PDN connectivity reject message. The PDN connectivity reject message may include an appropriate Reject cause. In addition, the PDN connectivity reject message needs to be a response message to the PDN connectivity request message but is not limited to this, and needs to be a message to reject the PDN connectivity request message.

In addition, the MME may transmit the PDN connectivity reject message to indicate that the request of the UE has been rejected. Furthermore, the MME may include information indicating the cause of rejection in the PDN connectivity reject message and transmit the information, or may indicate the cause of the rejection by transmitting the rejection cause. Furthermore, the UE may recognize the cause of the rejection of the part of the request from the UE by receiving the information indicating that the request of the UE has been rejected. Note that the cause of rejection may be information indicating that the content indicated by the identification information received by the MME and/or the PGW-C is not allowed.

Furthermore, by receiving the PDN connectivity reject message, the UE can recognize that the request of the UE made using the PDN connectivity request has been rejected, and the content of various kinds of identification information included in the PDN connectivity reject message.

Each apparatus completes the present procedure based on completion of the procedure (A) or (B) in the present procedure. Note that each apparatus may transition to a state in which the PDU session is established based on the completion of the procedure (A) in the present procedure, and may recognize that the present procedure has been rejected and transition to a state in which the PDU session is not established based on the completion of the procedure (B) in the present procedure.

Furthermore, each apparatus may perform processing based on identification information transmitted and/or received in the present procedure, based on completion of the present procedure. For example, in a case that the UE transmits and/or receives the information indicating the part of the request of the UE has been rejected, the UE may recognize the cause of rejection of the request from the UE. In addition, based on the cause of the rejection of the request from the UE, each apparatus may perform the present procedure again, and may perform the PDN connectivity procedure for another cell.

Furthermore, based on the completion of the PDN connectivity procedure, the UE may store the PDN connectivity accept message and/or the identification information received together with the PDN connectivity establishment reject message, and may recognize the determination of the network. For example, in a case that the 31st identification information is received, the UE may recognize that the establishment of the PDN connection in which only control plane CIoT EPS optimization is available has been accepted.

Furthermore, in a case that the PDN connection establishment reject message is received in response to the PDN connection establishment request message including the 21st identification information, the UE may recognize that the establishment of the PDN connection in which only control plane CIoT EPS optimization is available has been rejected and is disabled. Furthermore, in a case that the PDN connectivity reject message is received, the UE may transmit the PDN connectivity request message not including the 21st identification information to the network.

Furthermore, in a case that a PDN connection in which a procedure for establishing a user plane radio bearer is executable is established, the UE may initiate a service request procedure to establish the user plane radio bearer of the PDN connection.

Note that the previously described first condition determination to the fourth condition determination may be performed based on identification information included in the PDN connectivity request message, and/or subscription information, and/or operator policies. Conditions that true or false of the first condition to the fourth condition is determined may not be limited to the previously described conditions.

For example, the first condition and/or the third condition and/or the fourth condition may be true in a case that the UE requests establishment of a session and the network allows the request. In addition, the first condition and/or the third condition and/or the fourth condition may be false in a case that the UE requests establishment of a session and the network does not allow the request. Furthermore, the first condition and/or the third condition and/or the fourth condition may be false in a case that the network serving as a connection destination of the UE and/or an apparatus in the network do not support the establishment of a session that the UE requests.

4. First Embodiment

Next, a first embodiment will be described using drawings. In the first embodiment, the UE first performs a registration procedure in the 5GS. Next, the UE establishes a PDU session by performing a PDU session establishment procedure in the 5GS and transitions to a state in which communication using the PDU session can be performed with the DN. Next, the UE performs a handover from the 5GS to the EPS and transitions to a state in which communication with the PDN is possible using the PDN connection. The present procedure is then completed.

Note that, in the present embodiment, a case in which the PDN and the DN are configured as the same network as illustrated in FIG. 1 will be described. However, the content described in the present embodiment can also be applied in a case that the PDN and the DN are configured as different networks.

Furthermore, in the present embodiment, a case in which the HSS and the UDM, the PCF and the PCRF, the SMF and the PGW-C, and the UPF and the PGW-U are configured as the same apparatus (i.e., the same physical hardware, or the same logical hardware, or the same software) respectively as described in FIG. 2 will be described. However, the content described in the present embodiment can also be applied in a case that they are configured as different apparatuses (i.e., different physical hardware, or different logical hardware, or different software). For example, data may be transmitted and/or received directly to and/or from the apparatuses, or data may be transmitted and/or received via an N26 interface between the AMF and the MME, or data may be transmitted and/or received via the UE.

Furthermore, the UE may perform an attach procedure, a tracking area update procedure, and/or a PDN connectivity procedure in the handover of the UE from the 5GS to the EPS. Furthermore, in a case that there is a PDU session established in the 5GS in the handover of the UE from the 5GS to the EPS, the UE can store information associated with the PDU session in association with information associated with the PDN connection (hereinafter, also referred to as mapping). Note that the information associated with the PDU session may be one or more pieces of information out of information for identifying an NS (such as S-NSSAI, NSSAI, NSI, or the like) and information indicating a DNN, an SSC mode, a PDU session type, CIoT 5GS optimization, or a combination of the information. Furthermore, the information associated with the PDN connection may be one or more pieces of information out of information for identifying a Dedicated Core Network (DCN), and information indicating the APN, the PDN type, CIoT EPS optimization, and the V2X service, or a combination of the information.

Furthermore, the UE may convert the information associated with the PDU session into information associated with the corresponding PDN connection and then perform mapping. For example, the UE may convert the information for identifying an NS into information for identifying the corresponding DCN, and then perform mapping. Furthermore, the UE may convert the DNN to the corresponding APN, and then perform mapping. Furthermore, the UE may convert the PDU session type into the corresponding PDN type and then perform mapping. Furthermore, the UE may convert CIoT 5GS optimization associated with the PDU session into CIoT EPS optimization associated with the corresponding PDN connection and then perform mapping.

In addition, the UE can perform the mapping according to identification information acquired in the registration procedure and/or the PDU session establishment procedure.

That is, mapping between the PDU session and the PDN connection may be performed, the PDU session being associated with particular S-NSSAI and/or particular NSSAI and/or a particular DNN and/or a particular SSC mode and/or a particular PDU session type and/or a particular CIoT 5GS optimization. That is, the PDU session associated with particular S-NSSAI and/or particular NSSAI and/or a particular DNN and/or a particular SSC mode and/or a particular PDU session type and/or a particular CIoT 5GS optimization may not be mapped to the PDN connection.

For example, in a case that a network serving as a handover destination of the UE supports control plane CIoT EPS optimization and user plane CIoT EPS optimization, the UE may map a PDU session corresponding to control plane CIoT 5GS optimization to a PDN connection associated with control plane CIoT EPS optimization. Furthermore, in this case, the UE may map the PDU session associated with user plane CIoT 5GS optimization to the PDN connection associated with user plane CIoT EPS optimization. In addition, in this case, the UE may map a PDU session that supports 5GMM-CONNECTED mode with RRC inactive indication to the PDN connection associated with user plane CIoT EPS optimization, or to a normal PDN connection.

Furthermore, in a case that the network serving as a handover destination of the UE supports control plane CIoT EPS optimization and does not support user plane CIoT EPS optimization, the UE may map a PDU session associated with control plane CIoT 5GS optimization to a PDN connection associated with control plane CIoT EPS optimization. Furthermore, in this case, the UE may map the PDU session associated with user plane CIoT 5GS optimization to the normal PDN connection, may release the PDU session, or may maintain the PDU session in the network to which the UE has been connected before the handover. Furthermore, the UE may map the PDU session supporting the 5GMM-CONNECTED mode with RRC inactive indication to the normal PDN connection.

Furthermore, in a case that the network serving as a handover destination of the UE supports user plane CIoT EPS optimization and does not support control plane CIoT EPS optimization, the UE may release a PDU session in which only control plane CIoT 5GS optimization is available or maintain the PDU session in the network to which the UE has been connected before the handover. Furthermore, in this case, the UE may map the PDU session associated with control plane CIoT 5GS optimization to the normal PDN connection, may release the PDU session, or may maintain the PDU session in the network to which the UE has been connected before the handover. Furthermore, in this case, the UE may map the PDU session associated with user plane CIoT 5GS optimization to the PDN connection associated with user plane CIoT EPS optimization. In addition, in this case, the UE may map a PDU session that supports 5GMM-CONNECTED mode with RRC inactive indication to the PDN connection associated with user plane CIoT EPS optimization, or to a normal PDN connection.

Furthermore, in a case that the network serving as a handover destination of the UE supports neither control plane CIoT EPS optimization nor user plane CIoT EPS optimization, the UE may release the PDU session in which only control plane CIoT 5GS optimization is available or maintain the PDU session in the network to which the UE has been connected before the handover. Furthermore, in this case, the UE may map the PDU session associated with control plane CIoT 5GS optimization to the normal PDN connection, may release the PDU session, or may maintain the PDU session in the network to which the UE has been connected before the handover. Furthermore, in this case, the UE may map the PDU session associated with user plane CIoT 5GS optimization to the normal PDN connection, may release the PDU session, or may maintain the PDU session in the network to which the UE has been connected before the handover. Furthermore, the UE may map the PDU session supporting the 5GMM-CONNECTED mode with RRC inactive indication to the normal PDN connection.

Furthermore, even in a case that the network serving as a handover destination supports control plane CIoT EPS optimization and/or user plane CIoT EPS optimization, the UE may maintain a part of the established PDU session in the network to which the UE has been connected before the handover. Furthermore, the PDU session maintained in the network to which the UE has been connected before the handover may be a PDU session associated with control plane CIoT 5GS optimization or a PDU session associated with user plane CIoT 5GS optimization. Moreover, the PDU session maintained in the network to which the UE has been connected before the handover may be a PDU session in which only control plane CIoT 5GS optimization is available, or a PDU session supporting 5GMM_CONNECTED mode with RRC inactive indication. Furthermore, the PDU session maintained in the network to which the UE has been connected before the handover may be a normal PDU session.

Note that the network serving as a handover destination of the UE may be an EPS, and/or an EPC, and/or an E-UTRAN. Further, the network to which the UE has been connected before the handover may be 5GS and/or 5GC and/or NG RAN. Furthermore, the normal PDN connection may refer to a PDN connection not associated with CIoT EPS optimization. Furthermore, the normal PDU session may refer to a PDU session not associated with CIoT 5GS optimization.

Further, the determination of whether the network serving as a handover destination supports control plane CIoT EPS optimization and/or user plane CIoT EPS optimization may be performed based on a control message and/or identification information transmitted and/or received in the attach procedure and/or the tracking area update procedure, and/or the PDN connectivity procedure. For example, in a case that the 12th identification information is transmitted and/or received, the UE may determine that the network serving as a handover destination supports control plane CIoT EPS optimization. Further, in a case that the 13th identification information and/or the 14th identification information are transmitted and/or received, the UE may determine that the network serving as a handover destination supports user plane CIoT EPS optimization. Note that the determination of the UE is not limited thereto.

Note that, even in a case that mapping between the PDU session and the PDN connection has been performed, information indicating the S-NSSAI and/or the DNNs and/or the SSC mode and/or the PDU session type and/or the CIoT 5GS optimization associated with the PDU session may be continuously stored.

Furthermore, in the case in which such mapping is performed, the UE may map default information as information associated with the PDN connection, rather than information associated with the PDU session. For example, information for identifying a DCN associated with the PDN connection may be information for identifying a default DCN, and the APN may be a default APN. Furthermore, the PDN type associated with the PDN connection may be a default PDN type, and the information indicating CIoT EPS optimization may be information indicating default CIoT EPS optimization.

Note that the selection and determination of information associated with the PDN connection and/or selection and determination of whether the PDU session is to be mapped to the PDN connection may be performed based on the identification information, subscription information, or network capability information. Further, the selection and determination of the matter described above may be performed based on an operator policy, a network status, or user registration information. Further, the selection and determination of the matter described above may be performed based on the context held by the UE or the context held by the network. Note that selection and determination of the matter described above may not be limited thereto.

In addition, in the case in which such mapping is performed, the UE may configure a validity period of the mapping (a period in which the mapping is maintained). For the validity period of the mapping, a timer may be used. In a case that the validity period of the mapping is configured, the UE can start (e.g., count down) the timer at the same time as the time in a case that the mapping is performed. In addition, the UE can clear the mapping in a case that the timer expires. In addition, in a case that the UE transmits and/or receives a notification that a handover from the EPS to the 5GS has succeeded before the timer expires, the mapping can be cleared after a handover complete message of the UE is transmitted and/or received. In addition, in a case other than the above, the UE can maintain this mapping. Note that the UE may not perform the mapping in a case that a validity period indicated by the identification information acquired in the registration procedure and/or the PDU session establishment procedure is not allowed at a time when the mapping is performed. In addition, in a case that the validity period indicated by the acquired identification information is allowed at a time when the mapping is performed, the UE can configure a value of the timer to a value indicated by the identification information.

By setting the above-described configuration, the PDU session can be mapped to the PDN connection and the validity period of the mapping can be configured. Here, a method for implementing the mapping between the PDU session and the PDN connection may be a method for mapping the PDU session to an existing PDN connection, or a method for newly establishing a PDN connection for mapping the PDU session and mapping the PDU session to the established PDN connection.

For example, the UE may map the PDU session to the existing PDN connection in the attach procedure and/or the tracking area update procedure. Furthermore, the UE may newly establish a PDN connection for mapping the PDU session and map the PDU session to the established PDN connection in the attach procedure and/or the tracking area update procedure.

In addition, the UE may establish a PDN connection for mapping the PDU session and map the PDU session to the established PDN connection in the PDN connectivity procedure, rather than establishing a PDN connection in the attach procedure and/or the tracking area update procedure.

Furthermore, the UE may not establish a PDN connection for mapping a particular PDU session in the attach procedure and/or the tracking area update procedure, but may establish a PDN connection for mapping a particular PDU session and map the PDU session to the established PDN connection in the PDN connectivity procedure. More specifically, the UE may transmit and/or receive the identification information in the attach procedure and/or the tracking area update procedure, and establish a PDN connection for mapping a particular PDU session in the PDN connectivity procedure based on the transmitted and/or received identification information. In this case, the UE may establish the normal PDN connection in the attach procedure and/or the tracking area update procedure.

Note that a particular PDU session may be a PDU session associated with CIoT 5GS optimization or a PDU session associated with control plane CIoT 5GS optimization. In addition, the particular PDU session may be a PDU session associated with user plane CIoT 5GS optimization or a PDU session associated with Header compression for control plane CIoT 5GS optimization. Moreover, the particular PDU session may be a PDU session in which only control plane CIoT 5GS optimization is available, or a PDU session supporting 5GMM-CONNECTED mode with RRC inactive indication.

Furthermore, in a case that the PDN connection for mapping the PDU session is established, the UE may configure, for a handover, a request type included in the PDN connectivity request message transmitted and/or received in the PDN connectivity procedure, and may include a PDU session ID associated with the PDU session in the PDN connectivity request message.

In addition, in a case that a particular PDU session is a PDU session associated with control plane CIoT 5GS optimization and/or a PDU session in which only control plane CIoT 5GS optimization is available, the IP address may not be maintained. In this case, the UE may not configure the request type included in the PDN connectivity request message for the handover, or may not include the PDU session ID associated with the PDU session in the PDN connectivity request message.

According to the above, the PDU session may be mapped to the PDN connection. Note that a method for mapping the PDU session to the PDN connection may not be limited thereto.

With the above configuration, the UE may implement the handover from the 5GS to the EPS. Note that each apparatus may perform the same behavior as the behavior of the UE described above in the handover of the UE from the 5GS to the EPS. For example, each apparatus may perform a mapping of a PDU session to a PDN connection, similarly to the UE in the handover of the UE from the 5GS to the EPS.

5. Second Embodiment

Next, a second embodiment will be described using drawings. In the second embodiment, the UE first performs an attach procedure in the EPS. Next, the UE establishes a PDN connection by performing a PDN connectivity procedure in the EPS and transitions to a state in which communication using the PDN connection can be performed with a PDN. Next, the UE performs a handover from the EPS to the 5GS and transitions to a state in which communication with the DN is possible using the PDU session. The present procedure is then completed.

Note that, in the present embodiment, a case in which the PDN and the DN are configured as the same network as illustrated in FIG. 1 will be described. However, the content described in the present embodiment can also be applied in a case that the PDN and the DN are configured as different networks.

Furthermore, in the present embodiment, a case in which the HSS and the UDM, the PCF and the PCRF, the SMF and the PGW-C, and the UPF and the PGW-U are configured as the same apparatus (i.e., the same physical hardware, or the same logical hardware, or the same software) respectively as described in FIG. 2 will be described. However, the content described in the present embodiment can also be applied in a case that they are configured as different apparatuses (i.e., different physical hardware, or different logical hardware, or different software). For example, data may be transmitted and/or received directly to and/or from the apparatuses, or data may be transmitted and/or received via an N26 interface between the AMF and the MME, or data may be transmitted and/or received via the UE.

Furthermore, the UE may perform a registration procedure and/or a PDU session establishment procedure in the handover of the UE from the EPS to the 5GS. Furthermore, in a case that there is a PDN connection established in the EPS in the handover of the UE from the EPS to the 5GS, the UE can store information associated with the PDN connection in association with information associated with the PDU session (hereinafter, also referred to as mapping). Note, the information associated with the PDN connection may be one or more pieces of information out of information for identifying a Dedicated Core Network (DCN) and information indicating an APN, a PDN type, and CIoT EPS optimization, or a combination of the information. Furthermore, the information associated with the PDU session may be one or more pieces of information out of information for identifying an NS (such as S-NSSAI, NSSAI, NSI, or the like) and information indicating a DNN, an SSC mode, a PDU session type, CIoT 5GS optimization, and the V2X service, or a combination of the information.

Furthermore, the UE may convert the information associated with the PDN connection into information associated with a corresponding PDU session and then perform mapping. For example, the UE may convert the information for identifying a DCN into information for identifying a corresponding NS (such as S-NSSAI, NSSAI, NSI, or the like), and then perform mapping. Furthermore, the UE may convert the APN into a corresponding DNN, and then perform mapping. Furthermore, the UE may convert the PDN type into a corresponding PDU session type and then perform mapping. Furthermore, the UE may convert CIoT EPS optimization associated with the PDN connection into CIoT 5GS optimization associated with a corresponding PDU session and then perform mapping.

In addition, the UE can perform mapping according to the identification information acquired in the attach procedure and/or the tracking area update procedure and/or the PDN connectivity procedure. That is, mapping between the PDN connection and the PDU session may be performed, the PDN connection being associated with a particular DCN and/or a particular APN and/or a particular PDN type and/or particular CIoT EPS optimization. In other words, the PDN connection associated with a particular DCN and/or a particular APN and/or a particular PDN type and/or particular CIoT EPS optimization may not be mapped to the PDU session.

For example, in a case that a network serving as a handover destination of the UE supports control plane CIoT 5GS optimization and user plane CIoT 5GS optimization, and/or 5GMM-CONNECTED mode with RRC inactive indication, the UE may map a PDN connection associated with control plane CIoT EPS optimization to a PDU session associated with control plane CIoT 5GS optimization. Furthermore, in this case, the UE may map the PDN connection associated with user plane CIoT EPS optimization to a PDU session associated with user plane CIoT 5GS optimization, or to a PDU session supporting 5GMM-CONNECTED mode with RRC inactive indication. Furthermore, in this case, the UE may map a normal PDN connection to the PDU session supporting 5GMM-CONNECTED mode with RRC inactive indication.

Furthermore, in a case that a network serving as a handover destination of the UE supports control plane CIoT 5GS optimization but does not support user plane CIoT 5GS optimization, and/or 5GMM-CONNECTED mode with RRC inactive indication, the UE may map a PDN connection associated with control plane CIoT EPS optimization to a PDU session associated with control plane CIoT 5GS optimization. Furthermore, in this case, the UE may map the PDN connection associated with user plane CIoT EPS optimization to the normal PDU session, may release the PDN connection, or may maintain the PDN connection in the network to which the UE has been connected before the handover.

Furthermore, in a case that the network serving as a handover destination of the UE supports user plane CIoT 5GS optimization and/or 5GMM-CONNECTED mode with RRC inactive indication but does not support control plane CIoT 5GS optimization, the UE may release a PDN connection in which only control plane CIoT EPS optimization is available or maintain the PDN connection in the network to which the UE has been connected before the handover. Furthermore, in this case, the UE may map the PDN connection associated with control plane CIoT EPS optimization to the normal PDU session, may release the PDN connection, or may maintain the PDN connection in the network to which the UE has been connected before the handover. Furthermore, in this case, the UE may map the PDN connection associated with user plane CIoT EPS optimization to a PDU session associated with user plane CIoT 5GS optimization, or to a PDU session supporting 5GMM-CONNECTED mode with RRC inactive indication. Furthermore, in this case, the UE may map a normal PDN connection to the PDU session supporting 5GMM-CONNECTED mode with RRC inactive indication.

Furthermore, in a case that the network serving as a handover destination of the UE does not support control plane CIoT 5GS optimization, user plane CIoT 5GS optimization, and/or 5GMM-CONNECTED mode with RRC inactive indication, the UE may release a PDN connection in which only control plane CIoT EPS optimization is available or maintain the PDN connection in the network to which the UE has been connected before the handover. Furthermore, in this case, the UE may map the PDN connection associated with control plane CIoT EPS optimization to the normal PDU session, may release the PDN connection, or may maintain the PDN connection in the network to which the UE has been connected before the handover. Furthermore, in this case, the UE may map the PDN connection associated with user plane CIoT EPS optimization to the normal PDU session, may release the PDN connection, or may maintain the PDN connection in the network to which the UE has been connected before the handover.

Furthermore, even in a case that the network serving as a handover destination supports control plane CIoT 5GS optimization, and/or user plane CIoT 5GS optimization, and/or 5GMM-CONNECTED mode with RRC inactive indication, the UE may maintain part of the established PDN connection in the network to which the UE has been connected before the handover. Furthermore, the PDN connection maintained on the network prior to the handover of the UE may be a PDN connection associated with control plane CIoT EPS optimization or a PDN connection associated with user plane CIoT EPS optimization. Furthermore, the PDN connection maintained in the network before handover of the UE may be a PDN connection in which only control plane CIoT EPS optimization is available. Furthermore, the PDN connection maintained on the network prior to the handover of the UE may be a normal PDN connection.

Note that the network serving as a handover destination of the UE may be a 5GS and/or 5GC and/or an NG RAN. Furthermore, the network to which the UE has been connected before the handover may be an EPS, and/or an EPC, and/or an E-UTRAN. Furthermore, the normal PDN connection may refer to a PDN connection not associated with CIoT EPS optimization. Furthermore, the normal PDU session may refer to a PDU session not associated with CIoT 5GS optimization.

Further, whether the network serving as a handover destination supports control plane CIoT 5GS optimization, and/or user plane CIoT 5GS optimization, and/or 5GMM-CONNECTED mode with RRC inactive indication may be determined based on a control message and/or identification information transmitted and/or received in the registration procedure and/or the PDU session establishment procedure. For example, in a case that the 12th identification information is transmitted and/or received, the UE may determine that the network serving as a handover destination supports control plane CIoT 5GS optimization. Further, in a case that the 13th identification information and/or the 14th identification information and/or the 18th identification information are transmitted and/or received, the UE may determine that the network serving as a handover destination supports user plane CIoT 5GS optimization and/or 5GMM-CONNECTED mode with RRC inactive indication. Note that determination of the UE is not limited thereto.

Note that, even in a case that mapping between the PDN connection and the PDU session is performed, the information for identifying the DCN associated with the PDN connection and/or the information of the APN, the/or the PDN type, and/or the CIoT optimization may be continuously stored.

Furthermore, in the case in which such mapping is performed, the UE may map default information as information associated with the PDU session, rather than information associated with the PDN connection. For example, the information for identifying an NS associated with the PDU session may be information for identifying the default NS, the DNN may be the default DNN, and the SSC mode may be a default SSC mode (SSC mode 1, SSC mode 2, or SSC mode 3). Furthermore, the PDU session type associated with the PDU session may be a default PDU session type, and the information indicating CIoT 5GS optimization may be information indicating default CIoT 5GS optimization.

Note that the selection and determination of information associated with the PDU session and/or selection and determination of whether the PDU session is to be mapped to the PDN connection may be performed based on the identification information, subscription information, or network capability information. Further, the selection and determination of the matter described above may be performed based on an operator policy, a network status, or user registration information. Further, the selection and determination of the matter described above may be performed based on the context held by the UE or the context held by the network. Note that selection and determination of the matter described above may not be limited thereto.

In addition, in the case in which such mapping is performed, the UE may configure a validity period of the mapping (a period in which the mapping is maintained). For the validity period of the mapping, a timer may be used. In a case that the validity period of the mapping is configured, the UE can start (e.g., count down) the timer at the same time as the time in a case that the mapping is performed. In addition, the UE can clear the mapping in a case that the timer expires. In addition, in a case that the UE transmits and/or receives a notification that a handover of the UE from the 5GS to the EPS has succeeded before the timer expires, for example, after an S bearer modification request message is transmitted and/or received, the mapping can be cleared. In addition, in a case other than the above, the UE may maintain this mapping. Note that the UE may not perform the mapping in a case that the validity period indicated by the acquired identification information is not allowed at a time when the mapping is to be performed. In addition, in a case that the validity period indicated by the acquired identification information is allowed at a time when the mapping is performed, the UE can configure a value of the timer to a value indicated by the identification information.

With the configuration described above, the PDN connection can be mapped to the PDU session, and the validity period of this mapping can be configured. Here, a method for implementing the mapping between the PDN connection and the PDU session may be a method for mapping the PDN connection to an existing PDU session, or a method for newly establishing a PDU session for mapping the PDN connection and mapping the PDN connection to the established PDU session.

For example, in the registration procedure, the UE may map the PDN connection to an existing PDU session. Furthermore, in the registration procedure, the UE may newly establish a PDU session for mapping the PDN connection and map the PDN connection to the established PDU session.

In addition, the UE may establish a PDU session for mapping a PDN connection and map the PDN connection to the established PDU session in the PDU session establishment procedure, rather than establishing a PDU session in the registration procedure.

Furthermore, the UE may establish a PDU session for mapping a particular PDN connection and map the PDN connection to the established PDU session in the PDU session establishment procedure, without establishing a PDU session for mapping a particular PDN connection in the registration procedure. More specifically, the UE may transmit and/or receive identification information in the registration procedure, and establish a PDU session for mapping a particular PDN connection in the PDU session establishment procedure based on the transmitted and/or received identification information. In this case, the UE may establish a normal PDU session in the registration procedure.

Note that the particular PDN connection may be a PDN connection associated with CIoT EPS optimization, or may be a PDN connection associated with control plane CIoT EPS optimization. Furthermore, the particular PDN connection may be a PDN connection associated with user plane CIoT EPS optimization, or may be a PDN connection associated with Header compression for control plane CIoT EPS optimization. Furthermore, the particular PDN connection may be a PDN connection in which only control plane CIoT EPS optimization is available.

Furthermore, in a case that the PDU session for mapping the PDN connection is established, the UE may configure a request type included in the PDU session establishment request message transmitted and/or received in PDU session establishment procedure to the existing PDU session, or may include a PDN connection ID associated with the PDN connection in the PDU session establishment request message.

In addition, in a case that a particular PDN connection is a PDN connection associated with control plane CIoT EPS optimization and/or a PDN connection in which only control plane CIoT EPS optimization is available, the IP address may not be maintained. In this case, the UE may not configure the request type included in the PDU session establishment request message to the existing PDU session, or may not include the PDN connection ID associated with the PDN connection in the PDU session establishment request message.

According to the above, the PDN connection and the PDU session may be mapped. Note that a method for mapping the PDN connection to the PDU session may not be limited thereto.

With the above configuration, the UE may implement a handover from the EPS to the 5GS. Note that each apparatus may perform the same behavior as the behavior of the UE described above in the handover of the UE from the EPS to the 5GS. For example, each apparatus may perform a mapping of the PDN connection and the PDU session, similarly to the UE in the handover of the UE from the EPS to the 5GS.

6. Modified Examples

A program running on an apparatus according to the present invention may serve as a program that controls a Central Processing Unit (CPU) and the like to cause a computer to operate in such a manner as to implement the functions of the above-described embodiment according to the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing such functions of the embodiment according to the present invention may be recorded on a computer-readable recording medium. The functions may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment can be implemented or performed on an electric circuit, for example, an integrated circuit or a plurality of integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may be a processor of a known type, a controller, a micro-controller, or a state machine instead. The above-mentioned electric circuit may include a digital circuit, or may include an analog circuit. In a case that with advances in semiconductor technology, a circuit integration technology appears that replaces the present integrated circuits, one or more aspects of the present invention are also possible to use a new integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

The invention claimed is:

1. A User Equipment (UE) comprising:
transmission and/or reception circuitry configured to receive first information in a Protocol Data Unit (PDU) session establishment accept message in a procedure to establish a PDU session,
wherein the first information indicates that the PDU session is only for control plane Cellular Internet of Things (CIoT) 5G System (5GS) optimization; and
a controller,
wherein
after inter-system change from N1 mode to S1 mode, the controller associates Evolved Packet System (EPS) bearer contexts corresponding to the PDU session with the first information.

2. A communication control method performed by a User Equipment (UE), the method comprising:
receiving first information in a Protocol Data Unit (PDU) session establishment accept message in a procedure to establish a PDU session,
wherein
the first information indicates that the PDU session is only for control plane Cellular Internet of Things (CIoT) 5G System (5GS) optimization; and
after inter-system change from N1 mode to S1 mode, associating Evolved Packet System (EPS) bearer contexts corresponding to the PDU session with the first information.

* * * * *